(12) United States Patent
Hu et al.

(10) Patent No.: US 11,977,209 B2
(45) Date of Patent: May 7, 2024

(54) OPTICAL IMAGING LENS INCLUDING EIGHT LENSES OF +-++--+-, +-+---+- OR +-++-++- REFRACTIVE POWERS

(71) Applicant: GENIUS ELECTRONIC OPTICAL (XIAMEN) CO., LTD., Fujian (CN)

(72) Inventors: Run Hu, Fujian (CN); Ming Yang, Fujian (CN)

(73) Assignee: GENIUS ELECTRONIC OPTICAL (XIAMEN) CO., LTD., Fujian (CN)

( * ) Notice: Subject to any disclaimer, the term of this patent is extended or adjusted under 35 U.S.C. 154(b) by 605 days.

(21) Appl. No.: 17/179,415

(22) Filed: Feb. 19, 2021

(65) Prior Publication Data

US 2022/0179174 A1    Jun. 9, 2022

(30) Foreign Application Priority Data

Dec. 9, 2020    (CN) .......................... 202011428427.3

(51) Int. Cl.
G02B 13/00    (2006.01)
G02B 9/64    (2006.01)

(52) U.S. Cl.
CPC ........... *G02B 13/0045* (2013.01); *G02B 9/64* (2013.01)

(58) Field of Classification Search
CPC ............................ G02B 13/0045; G02B 9/64
See application file for complete search history.

(56) References Cited

U.S. PATENT DOCUMENTS

2019/0204558 A1    7/2019    Jhang et al.

FOREIGN PATENT DOCUMENTS

| CN | 108445610 | 8/2018 |
|---|---|---|
| CN | 108519660 | 9/2018 |
| CN | 211786316 | 10/2020 |
| TW | 201723571 | 7/2017 |

OTHER PUBLICATIONS

CN 108445610, translation (Year: 2018).*
"Office Action of China Counterpart Application", dated Oct. 27, 2022, p. 1-p. 7.

* cited by examiner

*Primary Examiner* — Wen Huang
(74) *Attorney, Agent, or Firm* — JCIPRNET

(57) ABSTRACT

An optical imaging lens is provided. The optical imaging lens includes a first lens element, a second lens element, a third lens element, a fourth lens element, a fifth lens element, a sixth lens element, a seventh lens element and an eighth lens element sequentially arranged along an optical axis from an object side to an image side. Each of the first lens element to the eighth lens element includes an object-side surface facing the object side and allowing imaging rays to pass through and an image-side surface facing the image side and allowing the imaging rays to pass through. Lens elements of the optical imaging lens are only the eight lens elements described above, and satisfy the conditions $|V4-V5| \geq 30.000$ and $(G67+T7)/(G56+T6) \geq 1.500$.

20 Claims, 39 Drawing Sheets

| First embodiment | | | | | | |
|---|---|---|---|---|---|---|
| EFL=5.842 mm, HFOV=40.428°, System length=7.559 mm, Fno=1.650, Image height=5.800 mm | | | | | | |
| Device | Surface | Radius of curvature (mm) | Thickness (mm) | Refractive index | Abbe number | Focal length (mm) |
| Object | | Infinity | Infinity | | | |
| Aperture 0 | | Infinity | -0.663 | | | |
| First lens element 1 | Object-side surface 15 | 2.660 | 0.989 | 1.545 | 55.987 | 6.583 |
| | Image-side surface 16 | 8.877 | 0.082 | | | |
| Second lens element 2 | Object-side surface 25 | 13.679 | 0.357 | 1.671 | 19.243 | -18.877 |
| | Image-side surface 26 | 6.540 | 0.144 | | | |
| Third lens element 3 | Object-side surface 35 | 7.405 | 0.523 | 1.545 | 55.987 | 28.372 |
| | Image-side surface 36 | 13.825 | 0.422 | | | |
| Fourth lens element 4 | Object-side surface 45 | -18.346 | 0.478 | 1.532 | 55.982 | 39.488 |
| | Image-side surface 46 | -9.896 | 0.267 | | | |
| Fifth lens element 5 | Object-side surface 55 | 238.875 | 0.381 | 1.615 | 25.920 | -49.613 |
| | Image-side surface 56 | 27.206 | 0.302 | | | |
| Sixth lens element 6 | Object-side surface 65 | 44.151 | 0.360 | 1.671 | 19.243 | -32.936 |
| | Image-side surface 66 | 14.775 | 0.444 | | | |
| Seventh lens element 7 | Object-side surface 75 | 20.537 | 0.550 | 1.545 | 55.987 | 4.846 |
| | Image-side surface 76 | -3.010 | 0.850 | | | |
| Eighth lens element 8 | Object-side surface 85 | -14.888 | 0.399 | 1.535 | 55.690 | -4.127 |
| | Image-side surface 86 | 2.629 | 0.600 | | | |
| Filter 9 | Object-side surface 95 | Infinity | 0.210 | 1.517 | 64.167 | |
| | Image-side surface 96 | Infinity | 0.202 | | | |
| | Image plane 99 | Infinity | | | | |

Figure 8

| Surface | K | $a_4$ | $a_6$ | $a_8$ | $a_{10}$ |
|---|---|---|---|---|---|
| 15 | 9.149462E-02 | -1.906834E-03 | 3.463719E-03 | -2.938723E-03 | 1.709015E-03 |
| 16 | 0.000000E+00 | -3.719488E-03 | -1.524478E-03 | -1.668506E-03 | 2.229426E-03 |
| 25 | 0.000000E+00 | 1.279545E-03 | -1.418519E-02 | 8.802801E-03 | -1.352461E-03 |
| 26 | 1.158731E+01 | 7.866626E-03 | -2.202718E-02 | 7.634115E-03 | 3.689792E-03 |
| 35 | 0.000000E+00 | 4.262653E-03 | -7.449133E-03 | -1.407251E-02 | 1.668970E-02 |
| 36 | 0.000000E+00 | 8.254505E-04 | -6.931864E-04 | -9.649920E-03 | 6.780596E-03 |
| 45 | 0.000000E+00 | -2.280370E-03 | -1.812675E-02 | 1.632166E-02 | -1.602333E-02 |
| 46 | 0.000000E+00 | 1.191028E-02 | -5.452541E-02 | 5.280190E-02 | -3.397945E-02 |
| 55 | 0.000000E+00 | 9.066105E-03 | -7.792238E-02 | 7.309781E-02 | -4.358085E-02 |
| 56 | 0.000000E+00 | 1.727409E-02 | -6.934186E-02 | 5.749833E-02 | -2.998002E-02 |
| 65 | 0.000000E+00 | 4.751284E-03 | -4.740050E-02 | 4.905219E-02 | -2.755124E-02 |
| 66 | 0.000000E+00 | -2.227918E-02 | -2.134889E-02 | 2.360716E-02 | -1.104174E-02 |
| 75 | 0.000000E+00 | 1.756463E-03 | -1.071564E-02 | 3.907852E-03 | -9.213115E-04 |
| 76 | -1.095413E+01 | -3.351385E-03 | 5.805263E-03 | -3.983125E-03 | 1.131478E-03 |
| 85 | 5.026323E+00 | -3.064864E-02 | 6.556369E-03 | -1.893675E-03 | 3.796296E-04 |
| 86 | -6.558566E+00 | -1.754624E-02 | 3.372002E-03 | -5.586090E-04 | 6.958584E-05 |
| Surface | $a_{12}$ | $a_{14}$ | $a_{16}$ | $a_{18}$ | $a_{20}$ |
| 15 | -6.247086E-04 | 1.332312E-04 | -1.370620E-05 | | |
| 16 | -9.940433E-04 | 1.979517E-04 | -1.512175E-05 | | |
| 25 | -4.113527E-04 | 1.878555E-04 | -1.871591E-05 | | |
| 26 | -3.393324E-03 | 9.581032E-04 | -8.827329E-05 | | |
| 35 | -7.826636E-03 | 1.799884E-03 | -1.613554E-04 | | |
| 36 | -1.740047E-03 | 5.141988E-05 | 3.736716E-05 | | |
| 45 | 8.637560E-03 | -2.354213E-03 | 2.646577E-04 | | |
| 46 | 1.289399E-02 | -2.592081E-03 | 2.114515E-04 | | |
| 55 | 1.577828E-02 | -3.070524E-03 | 2.408741E-04 | | |
| 56 | 9.224153E-03 | -1.403938E-03 | 3.200793E-05 | 1.600218E-05 | -1.305096E-06 |
| 65 | 9.048941E-03 | -1.778836E-03 | 2.052049E-04 | -1.277807E-05 | 3.295024E-07 |
| 66 | 2.909048E-03 | -4.557494E-04 | 4.197064E-05 | -2.093934E-06 | 4.347910E-08 |
| 75 | 1.668927E-04 | -2.472919E-05 | 2.495548E-06 | -1.363288E-07 | 2.962392E-09 |
| 76 | -1.613496E-04 | 1.000750E-05 | 8.649203E-08 | -4.001869E-08 | 1.352621E-09 |
| 85 | -4.277497E-05 | 2.820335E-06 | -1.100203E-07 | 2.383607E-09 | -2.240300E-11 |
| 86 | -6.274505E-06 | 3.938086E-07 | -1.629763E-08 | 3.953610E-10 | -4.202000E-12 |

Figure 9

| Second embodiment | | | | | | |
|---|---|---|---|---|---|---|
| EFL=7.386 mm, HFOV=40.825°, System length=9.146 mm, Fno=1.650, Image height=6.700 mm | | | | | | |
| Device | Surface | Radius of curvature (mm) | Thickness (mm) | Refractive index | Abbe number | Focal length (mm) |
| Object | | Infinity | Infinity | | | |
| Aperture 0 | | Infinity | -0.919 | | | |
| First lens element 1 | Object-side surface 15 | 3.081 | 1.139 | 1.545 | 55.987 | 6.929 |
| | Image-side surface 16 | 14.389 | 0.042 | | | |
| Second lens element 2 | Object-side surface 25 | 13.214 | 0.393 | 1.671 | 19.243 | -13.996 |
| | Image-side surface 26 | 5.455 | 0.388 | | | |
| Third lens element 3 | Object-side surface 35 | 9.777 | 0.668 | 1.671 | 19.243 | 48.390 |
| | Image-side surface 36 | 13.548 | 0.393 | | | |
| Fourth lens element 4 | Object-side surface 45 | -40.731 | 0.722 | 1.545 | 55.987 | 17.775 |
| | Image-side surface 46 | -7.890 | 0.371 | | | |
| Fifth lens element 5 | Object-side surface 55 | -11.124 | 0.456 | 1.615 | 25.920 | -148.324 |
| | Image-side surface 56 | -12.856 | 0.437 | | | |
| Sixth lens element 6 | Object-side surface 65 | 9.370 | 0.426 | 1.671 | 19.243 | -45.031 |
| | Image-side surface 66 | 7.037 | 0.719 | | | |
| Seventh lens element 7 | Object-side surface 75 | -30.031 | 0.577 | 1.545 | 55.987 | 9.698 |
| | Image-side surface 76 | -4.534 | 1.058 | | | |
| Eighth lens element 8 | Object-side surface 85 | -13.724 | 0.496 | 1.545 | 55.987 | -4.965 |
| | Image-side surface 86 | 3.424 | 0.550 | | | |
| Filter 9 | Object-side surface 95 | Infinity | 0.210 | 1.517 | 64.167 | |
| | Image-side surface 96 | Infinity | 0.102 | | | |
| | Image plane 99 | Infinity | | | | |

Figure 12

| Surface | K | $a_4$ | $a_6$ | $a_8$ | $a_{10}$ |
|---|---|---|---|---|---|
| 15 | 1.191976E-02 | 1.425219E-04 | 5.973399E-04 | -6.068804E-04 | 3.420248E-04 |
| 16 | 0.000000E+00 | -5.399421E-03 | 4.060055E-03 | -1.923750E-03 | 4.962132E-04 |
| 25 | 0.000000E+00 | -6.640991E-03 | 5.644190E-03 | -2.557558E-03 | 7.702802E-04 |
| 26 | 5.306192E+00 | -6.053844E-03 | 3.229702E-03 | -2.087988E-03 | 1.027810E-03 |
| 35 | 0.000000E+00 | -7.302869E-03 | -2.761314E-04 | 4.191972E-04 | -4.106987E-04 |
| 36 | 0.000000E+00 | -6.900347E-03 | 1.118983E-05 | -6.571051E-04 | 4.905018E-04 |
| 45 | 0.000000E+00 | -9.069840E-03 | -1.488839E-03 | 4.012482E-04 | -3.229311E-04 |
| 46 | 0.000000E+00 | -1.312046E-02 | -7.324399E-04 | -8.435507E-04 | 7.073397E-04 |
| 55 | 0.000000E+00 | -8.472622E-03 | -3.981875E-03 | 3.701597E-06 | 2.614421E-04 |
| 56 | 0.000000E+00 | -2.441099E-04 | -2.487844E-03 | -6.839467E-04 | 5.950104E-04 |
| 65 | 0.000000E+00 | -1.227446E-02 | -1.370314E-03 | 1.265023E-03 | -3.994164E-04 |
| 66 | 0.000000E+00 | -1.116945E-02 | -3.360023E-03 | 1.996072E-03 | -5.492321E-04 |
| 75 | 0.000000E+00 | 1.868513E-02 | -3.674595E-03 | 1.808174E-04 | 1.371118E-05 |
| 76 | -1.896141E+01 | 4.461518E-03 | 4.638892E-03 | -1.912828E-03 | 3.298435E-04 |
| 85 | -3.890151E+00 | -1.722147E-02 | 3.919205E-03 | -6.376557E-04 | 6.539105E-05 |
| 86 | -9.160740E+00 | -9.929708E-03 | 1.764146E-03 | -2.123590E-04 | 1.628916E-05 |
| Surface | $a_{12}$ | $a_{14}$ | $a_{16}$ | $a_{18}$ | $a_{20}$ |
| 15 | -1.072649E-04 | 1.741884E-05 | -1.228663E-06 | | |
| 16 | -6.992153E-05 | 5.225025E-06 | -2.611273E-07 | | |
| 25 | -1.423336E-04 | 1.751561E-05 | -1.124162E-06 | | |
| 26 | -3.261615E-04 | 5.788184E-05 | -3.615388E-06 | | |
| 35 | 1.894005E-04 | -4.019617E-05 | 4.344204E-06 | | |
| 36 | -1.853022E-04 | 3.880879E-05 | -2.605987E-06 | | |
| 45 | 1.070641E-04 | -1.823850E-05 | 1.524952E-06 | | |
| 46 | -2.489706E-04 | 4.177245E-05 | -2.933695E-06 | | |
| 55 | -3.482211E-05 | -6.154953E-06 | 1.024934E-06 | | |
| 56 | -2.058006E-04 | 4.562019E-05 | -6.770249E-06 | 5.957181E-07 | -2.259409E-08 |
| 65 | 5.127533E-05 | -4.090827E-07 | -6.585843E-07 | 7.118187E-08 | -2.440269E-09 |
| 66 | 8.798433E-05 | -8.654812E-06 | 5.179016E-07 | -1.742115E-08 | 2.546720E-10 |
| 75 | -4.852530E-06 | 7.802042E-07 | -6.717940E-08 | 2.830124E-09 | -4.617000E-11 |
| 76 | -3.452005E-05 | 2.420842E-06 | -1.125406E-07 | 3.108635E-09 | -3.809700E-11 |
| 85 | -4.094266E-06 | 1.584641E-07 | -3.725619E-09 | 4.896100E-11 | -2.770000E-13 |
| 86 | -7.885797E-07 | 2.346564E-08 | -4.078960E-10 | 3.712000E-12 | -1.300000E-14 |

Figure 13

| Third Embodiment | | | | | | |
|---|---|---|---|---|---|---|
| EFL=7.256 mm, HFOV=41.329°, System length=9.222 mm, Fno=1.650, Image height=6.700 mm | | | | | | |
| Device | Surface | Radius of curvature (mm) | Thickness (mm) | Refractive index | Abbe number | Focal length (mm) |
| Object | | Infinity | Infinity | | | |
| Aperture 0 | | Infinity | -0.819 | | | |
| First lens element 1 | Object-side surface 15 | 3.209 | 1.001 | 1.545 | 55.987 | 7.665 |
| | Image-side surface 16 | 12.219 | 0.040 | | | |
| Second lens element 2 | Object-side surface 25 | 7.741 | 0.347 | 1.671 | 19.243 | -18.502 |
| | Image-side surface 26 | 4.699 | 0.286 | | | |
| Third lens element 3 | Object-side surface 35 | 6.478 | 0.320 | 1.545 | 55.987 | 66.318 |
| | Image-side surface 36 | 7.750 | 0.500 | | | |
| Fourth lens element 4 | Object-side surface 45 | -154.426 | 0.541 | 1.545 | 55.987 | 21.986 |
| | Image-side surface 46 | -11.157 | 0.488 | | | |
| Fifth lens element 5 | Object-side surface 55 | -10.441 | 0.367 | 1.615 | 25.920 | -571.199 |
| | Image-side surface 56 | -10.903 | 0.482 | | | |
| Sixth lens element 6 | Object-side surface 65 | 7.643 | 0.447 | 1.671 | 19.243 | -37.002 |
| | Image-side surface 66 | 5.719 | 0.394 | | | |
| Seventh lens element 7 | Object-side surface 75 | 29.244 | 1.001 | 1.545 | 55.987 | 7.812 |
| | Image-side surface 76 | -4.936 | 0.795 | | | |
| Eighth lens element 8 | Object-side surface 85 | -8.940 | 1.364 | 1.545 | 55.987 | -4.631 |
| | Image-side surface 86 | 3.719 | 0.600 | | | |
| Filter 9 | Object-side surface 95 | Infinity | 0.210 | 1.517 | 64.167 | |
| | Image-side surface 96 | Infinity | 0.040 | | | |
| | Image plane 99 | Infinity | | | | |

Figure 16

| Surface | K | $a_4$ | $a_6$ | $a_8$ | $a_{10}$ |
|---|---|---|---|---|---|
| 15 | 5.335051E-02 | 2.133025E-04 | 3.059706E-04 | -3.494199E-04 | 2.097788E-04 |
| 16 | 0.000000E+00 | -4.243209E-03 | 1.846455E-03 | -9.260393E-04 | 2.796136E-04 |
| 25 | 0.000000E+00 | -5.866870E-03 | 2.460831E-03 | -8.203811E-04 | 1.798744E-04 |
| 26 | 3.529605E+00 | -6.198738E-03 | 1.461681E-03 | -8.414672E-04 | 3.990895E-04 |
| 35 | 0.000000E+00 | -6.455813E-03 | 1.737271E-04 | 5.092604E-04 | -4.030850E-04 |
| 36 | 0.000000E+00 | -5.237426E-03 | -8.075590E-04 | 1.377684E-03 | -8.637497E-04 |
| 45 | 0.000000E+00 | -1.017859E-02 | -1.543983E-03 | -2.022837E-04 | 1.956189E-04 |
| 46 | 0.000000E+00 | -1.003144E-02 | -1.772337E-03 | -2.614920E-04 | 2.790495E-04 |
| 55 | 0.000000E+00 | -6.512209E-04 | -6.675397E-03 | 2.811995E-03 | -1.257382E-03 |
| 56 | 0.000000E+00 | 1.216429E-03 | -7.798860E-03 | 3.871477E-03 | -1.718453E-03 |
| 65 | 0.000000E+00 | -1.040415E-02 | -5.919741E-03 | 3.337974E-03 | -1.028419E-03 |
| 66 | 0.000000E+00 | -9.102371E-03 | -5.364510E-03 | 2.303176E-03 | -4.971546E-04 |
| 75 | 0.000000E+00 | 3.353204E-03 | -8.144818E-04 | -7.298024E-04 | 3.192355E-04 |
| 76 | -1.340556E+01 | -1.053921E-02 | 3.824981E-03 | -9.480125E-04 | 1.090352E-04 |
| 85 | -1.465587E+00 | -2.461199E-02 | 5.147655E-03 | -9.088547E-04 | 1.176268E-04 |
| 86 | -7.416684E+00 | -1.038476E-02 | 1.756627E-03 | -2.107936E-04 | 1.735797E-05 |
| Surface | $a_{12}$ | $a_{14}$ | $a_{16}$ | $a_{18}$ | $a_{20}$ |
| 15 | -7.409906E-05 | 1.308194E-05 | -1.027030E-06 | | |
| 16 | -4.300944E-05 | 2.161814E-06 | -2.141041E-08 | | |
| 25 | 1.967135E-05 | -1.160268E-05 | 1.126695E-06 | | |
| 26 | -1.165828E-04 | 2.663467E-05 | -2.772745E-06 | | |
| 35 | 1.864191E-04 | -2.879203E-05 | 1.669993E-06 | | |
| 36 | 3.458885E-04 | -6.111886E-05 | 4.387753E-06 | | |
| 45 | -1.099086E-04 | 3.607348E-05 | -4.319553E-06 | | |
| 46 | -9.690325E-05 | 2.157093E-05 | -2.190580E-06 | | |
| 55 | 3.837137E-04 | -5.981211E-05 | 3.613476E-06 | | |
| 56 | 5.187522E-04 | -1.006824E-04 | 1.261117E-05 | -9.966144E-07 | 3.943540E-08 |
| 65 | 1.939640E-04 | -2.518789E-05 | 2.426175E-06 | -1.648656E-07 | 5.465343E-09 |
| 66 | 5.613163E-05 | -2.235786E-06 | -1.541590E-07 | 1.853665E-08 | -5.174780E-10 |
| 75 | -6.819570E-05 | 8.787820E-06 | -6.799359E-07 | 2.881665E-08 | -5.119670E-10 |
| 76 | -3.215414E-06 | -5.560429E-07 | 6.581655E-08 | -2.834071E-09 | 4.478600E-11 |
| 85 | -9.627345E-06 | 4.901326E-07 | -1.520020E-08 | 2.643770E-10 | -1.985000E-12 |
| 86 | -9.590967E-07 | 3.461059E-08 | -7.784600E-10 | 9.847000E-12 | -5.300000E-14 |

Figure 17

| Fourth Embodiment ||||||
|---|---|---|---|---|---|
| EFL=6.166 mm, HFOV=41.857°, System length=7.849 mm, Fno=1.650, Image height=5.800 mm ||||||
| Device | Surface | Radius of curvature (mm) | Thickness (mm) | Refractive index | Abbe number | Focal length (mm) |
| Object | | Infinity | Infinity | | | |
| Aperture 0 | | Infinity | -0.756 | | | |
| First lens element 1 | Object-side surface 15 | 2.635 | 1.025 | 1.545 | 55.987 | 6.453 |
| | Image-side surface 16 | 9.003 | 0.195 | | | |
| Second lens element 2 | Object-side surface 25 | 15.397 | 0.253 | 1.671 | 19.243 | -17.028 |
| | Image-side surface 26 | 6.551 | 0.199 | | | |
| Third lens element 3 | Object-side surface 35 | 7.787 | 0.363 | 1.545 | 55.987 | 25.979 |
| | Image-side surface 36 | 16.972 | 0.335 | | | |
| Fourth lens element 4 | Object-side surface 45 | -15.364 | 0.323 | 1.545 | 55.987 | -5100.805 |
| | Image-side surface 46 | -15.564 | 0.135 | | | |
| Fifth lens element 5 | Object-side surface 55 | 89.182 | 0.357 | 1.615 | 25.920 | -112.125 |
| | Image-side surface 56 | 38.980 | 0.176 | | | |
| Sixth lens element 6 | Object-side surface 65 | 24.694 | 0.568 | 1.671 | 19.243 | -23.478 |
| | Image-side surface 66 | 9.585 | 0.324 | | | |
| Seventh lens element 7 | Object-side surface 75 | 11.717 | 1.087 | 1.545 | 55.987 | 5.697 |
| | Image-side surface 76 | -4.099 | 1.408 | | | |
| Eighth lens element 8 | Object-side surface 85 | -6.247 | 0.352 | 1.535 | 55.690 | -4.422 |
| | Image-side surface 86 | 3.901 | 0.500 | | | |
| Filter 9 | Object-side surface 95 | Infinity | 0.210 | 1.517 | 64.167 | |
| | Image-side surface 96 | Infinity | 0.040 | | | |
| | Image plane 99 | Infinity | | | | |

Figure 20

| Surface | K | $a_4$ | $a_6$ | $a_8$ | $a_{10}$ |
|---|---|---|---|---|---|
| 15 | 8.189756E-02 | 1.367495E-04 | 1.543199E-03 | -1.947979E-03 | 1.445537E-03 |
| 16 | 0.000000E+00 | -4.406657E-03 | -2.108745E-03 | 2.492158E-03 | -1.426992E-03 |
| 25 | 0.000000E+00 | -1.177030E-02 | -8.670901E-04 | 7.741622E-03 | -4.790911E-03 |
| 26 | 1.238872E+01 | -1.044057E-02 | -3.496201E-03 | 7.915184E-03 | -3.799654E-03 |
| 35 | 0.000000E+00 | -1.814841E-04 | -1.097514E-02 | 5.246487E-03 | -2.435531E-03 |
| 36 | 0.000000E+00 | 3.017182E-03 | -1.052545E-02 | 6.163054E-03 | -4.824160E-03 |
| 45 | 0.000000E+00 | -1.384423E-03 | -1.430144E-02 | 1.334883E-02 | -1.216206E-02 |
| 46 | 0.000000E+00 | -5.511968E-03 | -1.826569E-02 | 1.504682E-02 | -1.007008E-02 |
| 55 | 0.000000E+00 | -1.306513E-02 | -2.895768E-02 | 2.306014E-02 | -1.360080E-02 |
| 56 | 0.000000E+00 | -1.764067E-03 | -3.839424E-02 | 3.242295E-02 | -1.955038E-02 |
| 65 | 0.000000E+00 | -1.387846E-02 | -1.520596E-02 | 1.547565E-02 | -8.502591E-03 |
| 66 | 0.000000E+00 | -2.795323E-02 | 1.888325E-03 | 1.069556E-03 | -3.050342E-04 |
| 75 | 0.000000E+00 | -8.530577E-03 | -2.122283E-04 | -1.272549E-03 | 7.263147E-04 |
| 76 | -9.427133E+00 | -3.320911E-03 | 1.530680E-03 | -6.519260E-04 | -3.312840E-05 |
| 85 | -7.771503E-01 | -2.856840E-02 | 7.664479E-03 | -1.969564E-03 | 3.326157E-04 |
| 86 | -9.603050E+00 | -1.565989E-02 | 3.535120E-03 | -6.199536E-04 | 7.433981E-05 |
| Surface | $a_{12}$ | $a_{14}$ | $a_{16}$ | $a_{18}$ | $a_{20}$ |
| 15 | -6.091213E-04 | 1.358666E-04 | -1.357000E-05 | | |
| 16 | 3.976678E-04 | -5.633571E-05 | 2.616422E-06 | | |
| 25 | 1.513342E-03 | -2.323581E-04 | 1.467454E-05 | | |
| 26 | 8.589724E-04 | -6.320561E-05 | 3.510845E-06 | | |
| 35 | 1.096439E-03 | -3.320982E-04 | 4.905954E-05 | | |
| 36 | 2.845572E-03 | -8.581716E-04 | 1.069940E-04 | | |
| 45 | 6.815264E-03 | -1.905592E-03 | 2.090295E-04 | | |
| 46 | 4.484060E-03 | -1.042847E-03 | 8.961363E-05 | | |
| 55 | 5.013384E-03 | -1.000771E-03 | 7.635151E-05 | | |
| 56 | 7.842757E-03 | -2.023230E-03 | 3.216493E-04 | -2.853596E-05 | 1.107923E-06 |
| 65 | 2.926338E-03 | -6.501662E-04 | 9.289716E-05 | -7.910048E-06 | 3.042889E-07 |
| 66 | 2.074770E-05 | 1.247173E-06 | 6.431654E-08 | -5.232094E-08 | 3.296115E-09 |
| 75 | -2.135510E-04 | 4.002881E-05 | -4.876867E-06 | 3.420907E-07 | -1.011043E-08 |
| 76 | 5.333105E-05 | -1.150663E-05 | 1.184037E-06 | -6.111955E-08 | 1.268246E-09 |
| 85 | -3.290394E-05 | 1.949668E-06 | -6.873860E-08 | 1.335027E-09 | -1.103000E-11 |
| 86 | -6.022274E-06 | 3.215330E-07 | -1.086324E-08 | 2.107110E-10 | -1.784000E-12 |

Figure 21

| Fifth Embodiment | | | | | | |
|---|---|---|---|---|---|---|
| EFL=8.678 mm, HFOV=36.326°, System length=10.203 mm, Fno=1.650, Image height=6.700 mm | | | | | | |
| Device | Surface | Radius of curvature (mm) | Thickness (mm) | Refractive index | Abbe number | Focal length (mm) |
| Object | | Infinity | Infinity | | | |
| Aperture 0 | | Infinity | -1.261 | | | |
| First lens element 1 | Object-side surface 15 | 3.374 | 1.724 | 1.545 | 55.987 | 7.405 |
| | Image-side surface 16 | 16.666 | 0.177 | | | |
| Second lens element 2 | Object-side surface 25 | 15.547 | 0.205 | 1.671 | 19.243 | -14.454 |
| | Image-side surface 26 | 5.976 | 0.211 | | | |
| Third lens element 3 | Object-side surface 35 | 5.938 | 0.596 | 1.671 | 19.243 | 81.375 |
| | Image-side surface 36 | 6.385 | 0.481 | | | |
| Fourth lens element 4 | Object-side surface 45 | -486.471 | 0.436 | 1.545 | 55.987 | 27.714 |
| | Image-side surface 46 | -14.687 | 0.208 | | | |
| Fifth lens element 5 | Object-side surface 55 | -9.082 | 0.873 | 1.671 | 19.243 | -149.464 |
| | Image-side surface 56 | -10.364 | 0.358 | | | |
| Sixth lens element 6 | Object-side surface 65 | 10.303 | 0.318 | 1.671 | 19.243 | -82.595 |
| | Image-side surface 66 | 8.592 | 0.528 | | | |
| Seventh lens element 7 | Object-side surface 75 | -48.433 | 0.884 | 1.545 | 55.987 | 8.778 |
| | Image-side surface 76 | -4.391 | 1.151 | | | |
| Eighth lens element 8 | Object-side surface 85 | -18.808 | 0.463 | 1.545 | 55.987 | -5.651 |
| | Image-side surface 86 | 3.725 | 0.550 | | | |
| Filter 9 | Object-side surface 95 | Infinity | 0.210 | 1.517 | 64.167 | |
| | Image-side surface 96 | Infinity | 0.829 | | | |
| | Image plane 99 | Infinity | | | | |

Figure 24

| Surface | K | $a_4$ | $a_6$ | $a_8$ | $a_{10}$ |
|---|---|---|---|---|---|
| 15 | 9.623829E-02 | -2.249510E-04 | -3.119215E-05 | 1.484822E-05 | -5.979065E-06 |
| 16 | 0.000000E+00 | -2.527161E-03 | -9.724428E-04 | 8.242936E-04 | -2.495169E-04 |
| 25 | 0.000000E+00 | 3.802373E-05 | -3.692426E-03 | 2.908849E-03 | -9.965634E-04 |
| 26 | 5.520259E+00 | -1.397700E-03 | -3.233576E-03 | 2.165430E-03 | -6.789068E-04 |
| 35 | 0.000000E+00 | -7.027143E-03 | -2.413187E-04 | 2.468258E-04 | -1.664077E-04 |
| 36 | 0.000000E+00 | -5.853234E-03 | 3.263101E-04 | -9.989567E-05 | -2.878614E-05 |
| 45 | 0.000000E+00 | -5.338567E-03 | -2.133847E-03 | 1.640213E-03 | -9.352094E-04 |
| 46 | 0.000000E+00 | -3.050454E-03 | -5.772457E-03 | 2.885296E-03 | -9.334645E-04 |
| 55 | 0.000000E+00 | -2.198728E-03 | -7.080111E-03 | 2.891456E-03 | -7.980363E-04 |
| 56 | 0.000000E+00 | 8.350072E-04 | -9.225947E-03 | 4.593838E-03 | -1.724417E-03 |
| 65 | 0.000000E+00 | -6.913552E-04 | -1.200295E-02 | 5.961592E-03 | -1.787034E-03 |
| 66 | 0.000000E+00 | -4.188971E-03 | -8.679812E-03 | 4.298783E-03 | -1.166617E-03 |
| 75 | 0.000000E+00 | 2.932985E-03 | -2.682992E-03 | -1.576372E-04 | 2.914999E-04 |
| 76 | -1.178359E+01 | -1.106145E-03 | 1.282546E-03 | -9.181960E-04 | 2.661128E-04 |
| 85 | 3.594842E+00 | -1.896514E-02 | 2.700399E-03 | -2.955992E-04 | 2.514932E-05 |
| 86 | -8.577556E+00 | -1.488336E-02 | 2.392533E-03 | -3.079840E-04 | 2.845528E-05 |
| Surface | $a_{12}$ | $a_{14}$ | $a_{16}$ | $a_{18}$ | $a_{20}$ |
| 15 | 1.345831E-06 | -1.635962E-07 | 7.231906E-09 | | |
| 16 | 4.148185E-05 | -3.728689E-06 | 1.426392E-07 | | |
| 25 | 1.926784E-04 | -1.993735E-05 | 8.435293E-07 | | |
| 26 | 1.146860E-04 | -8.809789E-06 | 2.707971E-07 | | |
| 35 | 7.634738E-05 | -1.477479E-05 | 1.266128E-06 | | |
| 36 | 2.981253E-05 | -6.216656E-06 | 5.225415E-07 | | |
| 45 | 2.533445E-04 | -3.282683E-05 | 1.666826E-06 | | |
| 46 | 1.115799E-04 | 1.031862E-05 | -2.537065E-06 | | |
| 55 | 8.061596E-05 | 1.056100E-05 | -2.283569E-06 | | |
| 56 | 4.601654E-04 | -8.399889E-05 | 1.014451E-05 | -7.458828E-07 | 2.555113E-08 |
| 65 | 3.321872E-04 | -3.678562E-05 | 2.211866E-06 | -5.582460E-08 | 3.732500E-11 |
| 66 | 2.005326E-04 | -2.197905E-05 | 1.476489E-06 | -5.516149E-08 | 8.752940E-10 |
| 75 | -7.590996E-05 | 9.796199E-06 | -7.021276E-07 | 2.666344E-08 | -4.161290E-10 |
| 76 | -4.238646E-05 | 4.013103E-06 | -2.243169E-07 | 6.827515E-09 | -8.719300E-11 |
| 85 | -1.313621E-06 | 3.499103E-08 | -2.110860E-10 | -9.735000E-12 | 1.600000E-13 |
| 86 | -1.858243E-06 | 8.302085E-08 | -2.407168E-09 | 4.071800E-11 | -3.040000E-13 |

Figure 25

| Sixth Embodiment | | | | | | |
|---|---|---|---|---|---|---|
| EFL=7.580 mm, HFOV=40.526°, System length=9.326 mm, Fno=1.650, Image height=6.700 mm | | | | | | |
| Device | Surface | Radius of curvature (mm) | Thickness (mm) | Refractive index | Abbe number | Focal length (mm) |
| Object | | Infinity | Infinity | | | |
| Aperture 0 | | Infinity | -0.853 | | | |
| First lens element 1 | Object-side surface 15 | 3.293 | 1.090 | 1.545 | 55.987 | 7.612 |
| | Image-side surface 16 | 13.973 | 0.239 | | | |
| Second lens element 2 | Object-side surface 25 | 8.690 | 0.253 | 1.671 | 19.243 | -17.831 |
| | Image-side surface 26 | 4.995 | 0.196 | | | |
| Third lens element 3 | Object-side surface 35 | 5.812 | 0.289 | 1.545 | 55.987 | 106.646 |
| | Image-side surface 36 | 6.343 | 0.667 | | | |
| Fourth lens element 4 | Object-side surface 45 | -38.305 | 0.577 | 1.545 | 55.987 | 28.457 |
| | Image-side surface 46 | -11.117 | 0.220 | | | |
| Fifth lens element 5 | Object-side surface 55 | -26.177 | 0.497 | 1.671 | 19.243 | -31.006 |
| | Image-side surface 56 | 107.215 | 0.347 | | | |
| Sixth lens element 6 | Object-side surface 65 | 5.926 | 0.360 | 1.671 | 19.243 | 1403.464 |
| | Image-side surface 66 | 5.816 | 0.752 | | | |
| Seventh lens element 7 | Object-side surface 75 | 33.919 | 0.917 | 1.545 | 55.987 | 5.227 |
| | Image-side surface 76 | -3.088 | 0.958 | | | |
| Eighth lens element 8 | Object-side surface 85 | -8.206 | 0.371 | 1.545 | 55.987 | -4.227 |
| | Image-side surface 86 | 3.265 | 0.600 | | | |
| Filter 9 | Object-side surface 95 | Infinity | 0.210 | 1.517 | 64.167 | |
| | Image-side surface 96 | Infinity | 0.782 | | | |
| | Image plane 99 | Infinity | | | | |

Figure 28

| Surface | K | $a_4$ | $a_6$ | $a_8$ | $a_{10}$ |
|---|---|---|---|---|---|
| 15 | 6.307277E-02 | -3.203878E-04 | 3.485432E-04 | -3.842927E-04 | 1.856319E-04 |
| 16 | 0.000000E+00 | -1.309060E-03 | -1.158239E-03 | 4.411558E-04 | -8.501882E-05 |
| 25 | 0.000000E+00 | -4.469939E-04 | -4.158679E-03 | 2.533857E-03 | -7.166553E-04 |
| 26 | 3.539893E+00 | -1.331077E-03 | -4.846271E-03 | 2.796043E-03 | -8.545726E-04 |
| 35 | 0.000000E+00 | -5.070743E-03 | -1.134072E-03 | 9.625633E-04 | -4.002982E-04 |
| 36 | 0.000000E+00 | -5.201021E-03 | 9.191656E-05 | 4.948414E-04 | -3.043615E-04 |
| 45 | 0.000000E+00 | -5.646837E-03 | -7.059702E-04 | -1.735760E-03 | 1.226129E-03 |
| 46 | 0.000000E+00 | 5.136013E-03 | -1.347276E-02 | 5.585335E-03 | -1.480692E-03 |
| 55 | 0.000000E+00 | 1.300499E-02 | -2.319194E-02 | 1.061582E-02 | -2.993023E-03 |
| 56 | 0.000000E+00 | 1.053489E-02 | -1.798905E-02 | 7.628163E-03 | -2.021030E-03 |
| 65 | 0.000000E+00 | -1.355863E-02 | -1.583359E-04 | -1.299805E-04 | 1.285005E-04 |
| 66 | 0.000000E+00 | -2.378659E-02 | 5.754651E-03 | -2.355410E-03 | 6.896155E-04 |
| 75 | 0.000000E+00 | -4.734855E-03 | 1.153888E-03 | -5.102152E-04 | 2.903129E-05 |
| 76 | -8.963630E+00 | -1.190815E-02 | 6.027784E-03 | -1.788071E-03 | 2.853455E-04 |
| 85 | -3.669012E+00 | -9.505472E-03 | -2.093930E-04 | 1.010970E-04 | -1.740566E-06 |
| 86 | -8.161172E+00 | -1.091795E-02 | 1.157137E-03 | -1.001911E-04 | 6.572693E-06 |
| Surface | $a_{12}$ | $a_{14}$ | $a_{16}$ | $a_{18}$ | $a_{20}$ |
| 15 | -5.511895E-05 | 8.443867E-06 | -5.805523E-07 | | |
| 16 | 4.258176E-06 | 6.175155E-07 | -1.004638E-07 | | |
| 25 | 1.305479E-04 | -1.483533E-05 | 8.641765E-07 | | |
| 26 | 1.769327E-04 | -1.991031E-05 | 8.658007E-07 | | |
| 35 | 1.690576E-04 | -2.755255E-05 | 1.578855E-06 | | |
| 36 | 1.610688E-04 | -3.192387E-05 | 2.554377E-06 | | |
| 45 | -4.983183E-04 | 1.013677E-04 | -8.214204E-06 | | |
| 46 | 1.822124E-04 | -1.562740E-06 | -1.113349E-06 | | |
| 55 | 5.044255E-04 | -4.487732E-05 | 1.612963E-06 | | |
| 56 | 3.345392E-04 | -3.162169E-05 | 1.112604E-06 | 6.288691E-08 | -5.142737E-09 |
| 65 | -2.802741E-05 | 2.067018E-06 | 1.624366E-08 | -7.878375E-09 | 2.377150E-10 |
| 66 | -1.215462E-04 | 1.275471E-05 | -7.835588E-07 | 2.613550E-08 | -3.673620E-10 |
| 75 | 1.004310E-05 | -1.925287E-06 | 1.401303E-07 | -4.531221E-09 | 5.052400E-11 |
| 76 | -2.856483E-05 | 1.980655E-06 | -9.470534E-08 | 2.753396E-09 | -3.552200E-11 |
| 85 | -5.350528E-07 | 4.405105E-08 | -1.554526E-09 | 2.721400E-11 | -1.940000E-13 |
| 86 | -3.449081E-07 | 1.422369E-08 | -4.262590E-10 | 7.887000E-12 | -6.400000E-14 |

Figure 29

| Seventh Embodiment | | | | | | |
|---|---|---|---|---|---|---|
| EFL=6.182 mm, HFOV=26.392°, System length=10.049 mm, Fno=1.650, Image height=5.800 mm | | | | | | |
| Device | Surface | Radius of curvature (mm) | Thickness (mm) | Refractive index | Abbe number | Focal length (mm) |
| Object | | Infinity | Infinity | | | |
| Aperture 0 | | Infinity | -0.758 | | | |
| First lens element 1 | Object-side surface 15 | 2.628 | 1.403 | 1.545 | 55.987 | 6.021 |
| | Image-side surface 16 | 10.609 | 0.176 | | | |
| Second lens element 2 | Object-side surface 25 | 13.724 | 0.526 | 1.671 | 19.243 | -16.294 |
| | Image-side surface 26 | 6.024 | 0.192 | | | |
| Third lens element 3 | Object-side surface 35 | 7.010 | 0.701 | 1.545 | 55.987 | 589.629 |
| | Image-side surface 36 | 6.913 | 0.730 | | | |
| Fourth lens element 4 | Object-side surface 45 | -3.746 | 0.665 | 1.545 | 55.987 | -53.303 |
| | Image-side surface 46 | -4.568 | 0.295 | | | |
| Fifth lens element 5 | Object-side surface 55 | -5.661 | 0.297 | 1.671 | 19.243 | -23.826 |
| | Image-side surface 56 | -8.902 | 0.338 | | | |
| Sixth lens element 6 | Object-side surface 65 | -6.230 | 0.469 | 1.671 | 19.243 | -22.225 |
| | Image-side surface 66 | -10.950 | 0.547 | | | |
| Seventh lens element 7 | Object-side surface 75 | 4.635 | 0.767 | 1.545 | 55.987 | 3.576 |
| | Image-side surface 76 | -3.179 | 1.138 | | | |
| Eighth lens element 8 | Object-side surface 85 | -13.620 | 0.441 | 1.535 | 55.690 | -14.228 |
| | Image-side surface 86 | 17.608 | 0.600 | | | |
| Filter 9 | Object-side surface 95 | Infinity | 0.210 | 1.517 | 64.167 | |
| | Image-side surface 96 | Infinity | 0.554 | | | |
| | Image plane 99 | Infinity | | | | |

Figure 32

| Surface | K | $a_4$ | $a_6$ | $a_8$ | $a_{10}$ |
|---|---|---|---|---|---|
| 15 | 1.030246E-01 | -1.856840E-03 | 3.395309E-03 | -2.963850E-03 | 1.681308E-03 |
| 16 | 0.000000E+00 | -3.629490E-03 | -1.883661E-03 | -1.841834E-03 | 2.199896E-03 |
| 25 | 0.000000E+00 | 1.310856E-03 | -1.350404E-02 | 8.893948E-03 | -1.368700E-03 |
| 26 | 1.373927E+01 | 7.015745E-03 | -2.146098E-02 | 8.143483E-03 | 3.827818E-03 |
| 35 | 0.000000E+00 | 7.548718E-03 | -9.204490E-03 | -1.380018E-02 | 1.684174E-02 |
| 36 | 0.000000E+00 | 1.004620E-02 | 1.038519E-03 | -9.645763E-03 | 6.777136E-03 |
| 45 | 0.000000E+00 | -4.347881E-04 | -1.600594E-02 | 1.683385E-02 | -1.598914E-02 |
| 46 | 0.000000E+00 | 1.478721E-02 | -5.338300E-02 | 5.267486E-02 | -3.399171E-02 |
| 55 | 0.000000E+00 | 1.180731E-02 | -8.044464E-02 | 7.333735E-02 | -4.350720E-02 |
| 56 | 0.000000E+00 | 1.079309E-02 | -6.881542E-02 | 5.741688E-02 | -3.000876E-02 |
| 65 | 0.000000E+00 | 7.596223E-03 | -4.774850E-02 | 4.900448E-02 | -2.755080E-02 |
| 66 | 0.000000E+00 | -1.834005E-02 | -2.147108E-02 | 2.356915E-02 | -1.104648E-02 |
| 75 | 0.000000E+00 | -8.333426E-03 | -9.296624E-03 | 3.754749E-03 | -9.274402E-04 |
| 76 | -1.032439E+04 | -7.874685E-03 | 5.465043E-03 | -3.962439E-03 | 1.132999E-03 |
| 85 | 2.400390E+00 | -2.995803E-02 | 6.587053E-03 | -1.893253E-03 | 3.796535E-04 |
| 86 | -9.170906E+01 | -1.819588E-02 | 3.325901E-03 | -5.536134E-04 | 6.984139E-05 |
| Surface | $a_{12}$ | $a_{14}$ | $a_{16}$ | $a_{18}$ | $a_{20}$ |
| 15 | -6.330671E-04 | 1.332338E-04 | -1.238727E-05 | | |
| 16 | -9.936983E-04 | 1.989087E-04 | -1.557891E-05 | | |
| 25 | -4.257365E-04 | 1.837122E-04 | -1.875151E-05 | | |
| 26 | -3.385243E-03 | 9.445565E-04 | -9.718121E-05 | | |
| 35 | -7.816952E-03 | 1.772164E-03 | -1.845962E-04 | | |
| 36 | -1.745284E-03 | 4.051147E-05 | 2.809052E-05 | | |
| 45 | 8.623126E-03 | -2.358336E-03 | 2.656360E-04 | | |
| 46 | 1.289888E-02 | -2.592649E-03 | 2.094784E-04 | | |
| 55 | 1.578061E-02 | -3.073763E-03 | 2.397202E-04 | | |
| 56 | 9.220681E-03 | -1.403794E-03 | 3.217687E-05 | 1.604058E-05 | -1.303170E-06 |
| 65 | 9.050514E-03 | -1.778506E-03 | 2.052564E-04 | -1.277322E-05 | 3.296902E-07 |
| 66 | 2.908608E-03 | -4.557898E-04 | 4.196680E-05 | -2.094122E-06 | 4.354175E-08 |
| 75 | 1.681882E-04 | -2.458076E-05 | 2.495665E-06 | -1.381532E-07 | 2.631732E-09 |
| 76 | -1.612850E-04 | 1.000976E-05 | 8.640903E-08 | -4.004559E-08 | 1.348494E-09 |
| 85 | -4.277395E-05 | 2.820392E-06 | -1.100174E-07 | 2.383556E-09 | -2.245900E-11 |
| 86 | -6.270391E-06 | 3.937477E-07 | -1.630474E-08 | 3.950820E-10 | -4.214000E-12 |

Longitudinal spherical aberration
Field of view
1.00
-0.02  0  0.03
(mm)

Field curvature (sagittal direction)
HFOV (°)
47.182
-0.2  0   0.6
(mm)

Field curvature (tangential direction)
HFOV (°)
47.182
-0.2  0   0.6
(mm)

Distortion
HFOV (°)
47.182
0   6
(%)

| Eighth embodiment |||||||
|---|---|---|---|---|---|---|
| EFL=5.913 mm, HFOV=47.182°, System length=7.978 mm, Fno=1.650, Image height=6.700 mm |||||||
| Device | Surface | Radius of curvature (mm) | Thickness (mm) | Refractive index | Abbe number | Focal length (mm) |
| Object | | Infinity | Infinity | | | |
| Aperture 0 | | Infinity | -0.607 | | | |
| First lens element 1 | Object-side surface 15 | 2.808 | 0.710 | 1.545 | 55.987 | 7.259 |
| | Image-side surface 16 | 8.762 | 0.043 | | | |
| Second lens element 2 | Object-side surface 25 | 6.001 | 0.251 | 1.671 | 19.243 | -23.787 |
| | Image-side surface 26 | 4.299 | 0.304 | | | |
| Third lens element 3 | Object-side surface 35 | 13.960 | 0.399 | 1.545 | 55.987 | 65.606 |
| | Image-side surface 36 | 22.635 | 0.281 | | | |
| Fourth lens element 4 | Object-side surface 45 | -53.258 | 0.644 | 1.545 | 55.987 | 18.478 |
| | Image-side surface 46 | -8.522 | 0.286 | | | |
| Fifth lens element 5 | Object-side surface 55 | -12.952 | 0.251 | 1.671 | 19.243 | -29.294 |
| | Image-side surface 56 | -37.570 | 0.271 | | | |
| Sixth lens element 6 | Object-side surface 65 | 6.761 | 0.533 | 1.671 | 19.243 | -157.547 |
| | Image-side surface 66 | 6.156 | 0.591 | | | |
| Seventh lens element 7 | Object-side surface 75 | 25.608 | 1.245 | 1.545 | 55.987 | 5.045 |
| | Image-side surface 76 | -3.035 | 0.984 | | | |
| Eighth lens element 8 | Object-side surface 85 | -3.663 | 0.436 | 1.545 | 55.987 | -3.461 |
| | Image-side surface 86 | 4.072 | 0.500 | | | |
| Filter 9 | Object-side surface 95 | Infinity | 0.210 | 1.517 | 64.167 | |
| | Image-side surface 96 | Infinity | 0.040 | | | |
| | Image plane 99 | Infinity | | | | |

Figure 36

| Surface | K | $a_4$ | $a_6$ | $a_8$ | $a_{10}$ |
|---|---|---|---|---|---|
| 15 | 8.640107E-02 | 5.336244E-04 | 1.283656E-03 | -1.890399E-03 | 1.476470E-03 |
| 16 | 0.000000E+00 | -1.392536E-03 | -6.429559E-03 | 7.199278E-03 | -4.512988E-03 |
| 25 | 0.000000E+00 | -2.875428E-03 | -7.134107E-03 | 9.722983E-03 | -6.464819E-03 |
| 26 | 3.476888E+00 | -4.705575E-03 | -2.013568E-03 | 1.670494E-03 | -5.922140E-04 |
| 35 | 0.000000E+00 | -5.691632E-03 | -3.130226E-04 | -1.354763E-03 | 1.893794E-03 |
| 36 | 0.000000E+00 | -4.407650E-03 | -3.223639E-03 | 3.000016E-03 | -1.905330E-03 |
| 45 | 0.000000E+00 | -8.772306E-03 | -9.265717E-04 | -5.694150E-03 | 5.637962E-03 |
| 46 | 0.000000E+00 | -9.634419E-03 | -3.201305E-04 | -7.467360E-03 | 6.011643E-03 |
| 55 | 0.000000E+00 | -1.857703E-03 | -2.921634E-03 | -8.666679E-03 | 6.505151E-03 |
| 56 | 0.000000E+00 | -1.030225E-02 | 8.177283E-03 | -1.554306E-02 | 1.076201E-02 |
| 65 | 0.000000E+00 | -3.598457E-02 | 1.555306E-02 | -1.116338E-02 | 5.436163E-03 |
| 66 | 0.000000E+00 | -2.883056E-02 | 9.174998E-03 | -4.860505E-03 | 1.785308E-03 |
| 75 | 0.000000E+00 | -8.304972E-03 | 3.353379E-03 | -1.594250E-03 | 3.618900E-04 |
| 76 | -5.543019E+00 | -1.093419E-02 | 2.945481E-03 | -7.628669E-04 | 9.917398E-05 |
| 85 | -3.308157E+00 | -1.464275E-02 | 1.460989E-03 | -2.942097E-04 | 6.117439E-05 |
| 86 | -9.254930E+00 | -8.463731E-03 | 1.081835E-03 | -9.455981E-05 | 5.777252E-06 |
| Surface | $a_{12}$ | $a_{14}$ | $a_{16}$ | $a_{18}$ | $a_{20}$ |
| 15 | -7.035104E-04 | 1.757357E-04 | -2.008616E-05 | | |
| 16 | 1.601094E-03 | -3.097407E-04 | 2.372519E-05 | | |
| 25 | 2.605200E-03 | -5.705967E-04 | 5.191957E-05 | | |
| 26 | 5.499978E-05 | 3.090387E-05 | -5.273492E-06 | | |
| 35 | -1.037335E-03 | 3.470423E-04 | -3.881922E-05 | | |
| 36 | 8.968359E-04 | -1.610345E-04 | 1.388417E-05 | | |
| 45 | -3.185972E-03 | 9.303629E-04 | -1.100537E-04 | | |
| 46 | -2.504600E-03 | 5.442208E-04 | -4.924569E-05 | | |
| 55 | -2.195270E-03 | 3.715227E-04 | -2.484256E-05 | | |
| 56 | -4.324584E-03 | 1.099681E-03 | -1.783168E-04 | 1.715011E-05 | -7.420960E-07 |
| 65 | -1.718370E-03 | 3.521050E-04 | -4.619654E-05 | 3.554623E-06 | -1.206432E-07 |
| 66 | -4.126499E-04 | 5.966862E-05 | -5.264646E-06 | 2.600912E-07 | -5.516260E-09 |
| 75 | -5.134087E-05 | 4.910563E-06 | -3.128952E-07 | 1.183139E-08 | -1.909220E-10 |
| 76 | -8.431727E-06 | 6.816057E-07 | -4.044453E-08 | 1.033636E-09 | -1.968000E-12 |
| 85 | -6.436454E-06 | 3.724210E-07 | -1.231665E-08 | 2.200990E-10 | -1.657000E-12 |
| 86 | -2.633326E-07 | 9.572832E-09 | -2.723410E-10 | 4.904000E-12 | -3.800000E-14 |

Figure 37

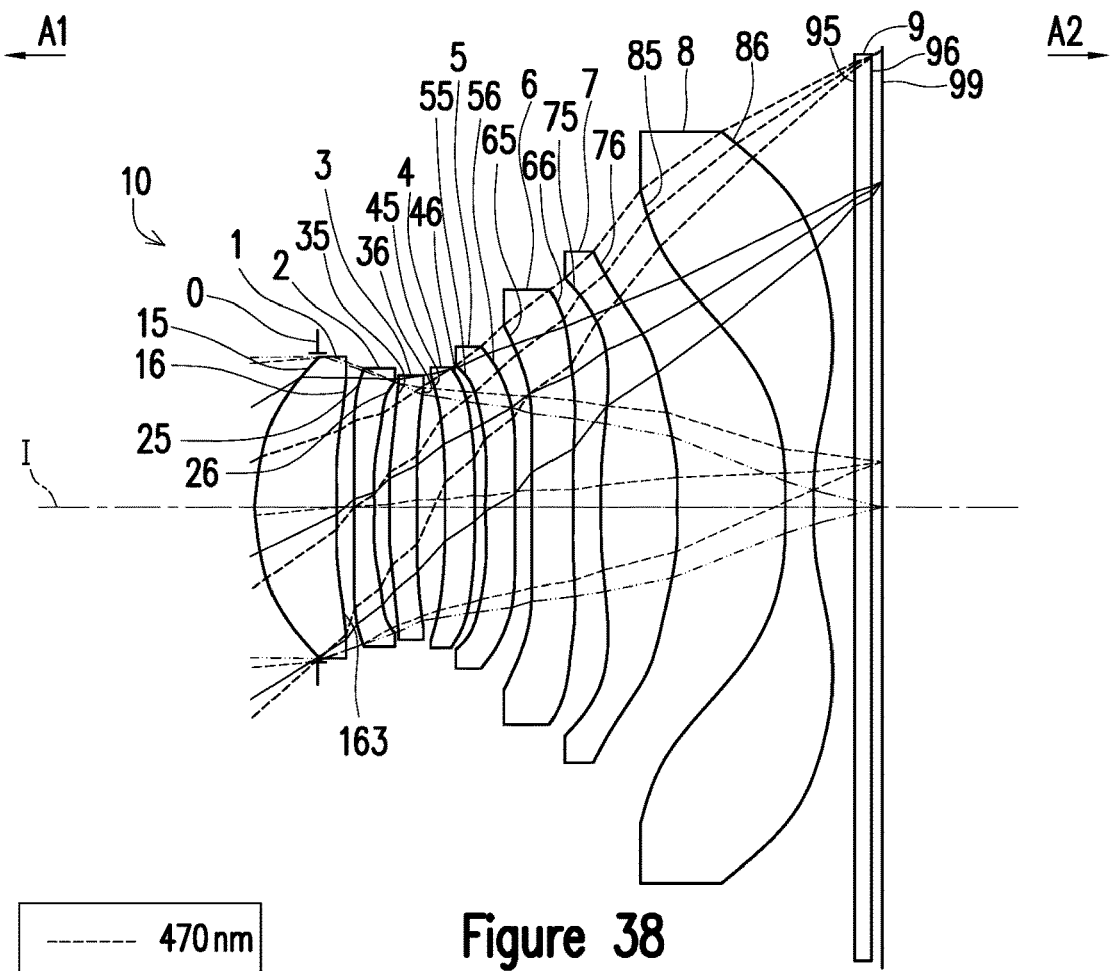
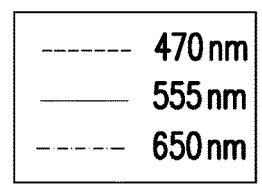
Figure 38
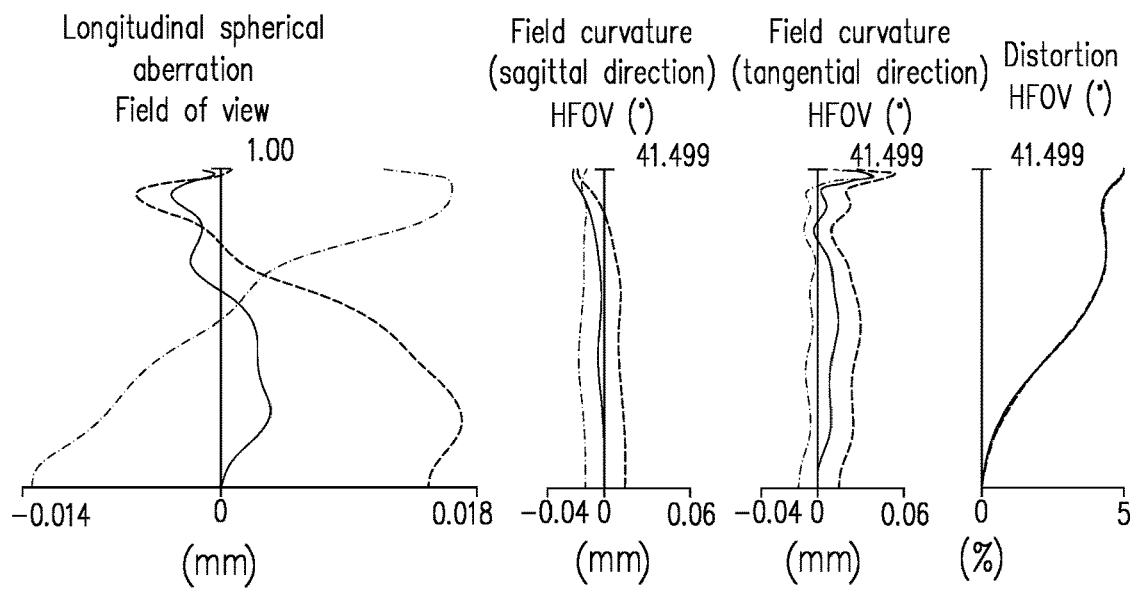
Figure 39A  Figure 39B  Figure 39C  Figure 39D

| Ninth embodiment | | | | | | |
|---|---|---|---|---|---|---|
| EFL=6.244 mm, HFOV=41.499°, System length=7.799 mm, Fno=1.650, Image height=5.800 mm | | | | | | |
| Device | Surface | Radius of curvature (mm) | Thickness (mm) | Refractive index | Abbe number | Focal length (mm) |
| Object | | Infinity | Infinity | | | |
| Aperture 0 | | Infinity | -0.793 | | | |
| First lens element 1 | Object-side surface 15 | 2.602 | 1.021 | 1.545 | 55.987 | 6.520 |
| | Image-side surface 16 | 8.315 | 0.202 | | | |
| Second lens element 2 | Object-side surface 25 | 13.820 | 0.266 | 1.671 | 19.243 | -18.100 |
| | Image-side surface 26 | 6.447 | 0.187 | | | |
| Third lens element 3 | Object-side surface 35 | 6.817 | 0.343 | 1.545 | 55.987 | 30.369 |
| | Image-side surface 36 | 11.367 | 0.356 | | | |
| Fourth lens element 4 | Object-side surface 45 | -14.927 | 0.370 | 1.545 | 55.987 | -5964.513 |
| | Image-side surface 46 | -15.127 | 0.113 | | | |
| Fifth lens element 5 | Object-side surface 55 | 38.242 | 0.374 | 1.671 | 19.243 | -258.936 |
| | Image-side surface 56 | 31.274 | 0.215 | | | |
| Sixth lens element 6 | Object-side surface 65 | 36.608 | 0.526 | 1.671 | 19.243 | -22.715 |
| | Image-side surface 66 | 10.772 | 0.339 | | | |
| Seventh lens element 7 | Object-side surface 75 | 10.574 | 0.952 | 1.545 | 55.987 | 5.610 |
| | Image-side surface 76 | -4.178 | 1.344 | | | |
| Eighth lens element 8 | Object-side surface 85 | -6.110 | 0.342 | 1.535 | 55.690 | -4.383 |
| | Image-side surface 86 | 3.899 | 0.500 | | | |
| Filter 9 | Object-side surface 95 | Infinity | 0.210 | 1.517 | 64.167 | |
| | Image-side surface 96 | Infinity | 0.140 | | | |
| | Image plane 99 | Infinity | | | | |

Figure 40

| Surface | K | $a_4$ | $a_6$ | $a_8$ | $a_{10}$ |
|---|---|---|---|---|---|
| 15 | 8.389506E-02 | -2.907799E-04 | 2.203900E-03 | -2.749694E-03 | 1.969234E-03 |
| 16 | 0.000000E+00 | -2.737032E-03 | -3.718075E-03 | 2.678354E-03 | -9.665529E-04 |
| 25 | 0.000000E+00 | -5.213255E-03 | -9.128841E-03 | 1.172909E-02 | -5.340389E-03 |
| 26 | 1.228451E+01 | -2.405498E-03 | -1.444361E-02 | 1.398390E-02 | -5.421394E-03 |
| 35 | 0.000000E+00 | 5.335093E-03 | -1.717276E-02 | 9.337835E-03 | -4.836926E-03 |
| 36 | 0.000000E+00 | 5.691293E-03 | -1.195258E-02 | 7.013607E-03 | -5.830577E-03 |
| 45 | 0.000000E+00 | 3.180055E-03 | -2.096510E-02 | 2.317890E-02 | -2.133620E-02 |
| 46 | 0.000000E+00 | 6.768824E-03 | -4.465267E-02 | 4.744673E-02 | -3.285956E-02 |
| 55 | 0.000000E+00 | -4.593559E-03 | -5.420596E-02 | 5.355105E-02 | -3.276281E-02 |
| 56 | 0.000000E+00 | 2.479542E-03 | -4.983213E-02 | 4.246332E-02 | -2.232484E-02 |
| 65 | 0.000000E+00 | -6.598869E-03 | -2.456182E-02 | 2.210888E-02 | -1.041298E-02 |
| 66 | 0.000000E+00 | -2.275108E-02 | -4.922924E-03 | 5.986334E-03 | -2.209835E-03 |
| 75 | 0.000000E+00 | -3.093344E-03 | -3.227697E-03 | -2.056369E-04 | 5.226860E-04 |
| 76 | -1.304115E+01 | -3.348897E-03 | 3.495876E-03 | -2.113612E-03 | 4.675624E-04 |
| 85 | -7.826720E-01 | -2.665567E-02 | 5.728171E-03 | -1.553155E-03 | 2.975282E-04 |
| 86 | -1.129713E+01 | -1.481523E-02 | 2.673424E-03 | -4.352301E-04 | 5.088013E-05 |
| Surface | $a_{12}$ | $a_{14}$ | $a_{16}$ | $a_{18}$ | $a_{20}$ |
| 15 | -8.000710E-04 | 1.732435E-04 | -1.651465E-05 | | |
| 16 | 1.148619E-04 | 1.128442E-05 | -3.386568E-06 | | |
| 25 | 1.244253E-03 | -1.183799E-04 | 2.119508E-06 | | |
| 26 | 9.979705E-04 | -6.496704E-05 | 6.554546E-06 | | |
| 35 | 2.409897E-03 | -7.759914E-04 | 1.092351E-04 | | |
| 36 | 3.678122E-03 | -1.166510E-03 | 1.475657E-04 | | |
| 45 | 1.137576E-02 | -3.053295E-03 | 3.245515E-04 | | |
| 46 | 1.340866E-02 | -2.852860E-03 | 2.397922E-04 | | |
| 55 | 1.167401E-02 | -2.195925E-03 | 1.636521E-04 | | |
| 56 | 6.968765E-03 | -1.184655E-03 | 7.717732E-05 | 4.305257E-06 | -6.155281E-07 |
| 65 | 2.817135E-03 | -4.405029E-04 | 3.837441E-05 | -1.710877E-06 | 3.333445E-08 |
| 66 | 4.478291E-04 | -5.505584E-05 | 4.200079E-06 | -1.927675E-07 | 4.289488E-09 |
| 75 | -1.965752E-04 | 3.981014E-05 | -4.809105E-06 | 3.206287E-07 | -8.906715E-09 |
| 76 | -4.687828E-05 | 9.278828E-07 | 2.405052E-07 | -2.102212E-08 | 5.382430E-10 |
| 85 | -3.194581E-05 | 1.984522E-06 | -7.146795E-08 | 1.384118E-09 | -1.110400E-11 |
| 86 | -4.229283E-06 | 2.450541E-07 | -9.448601E-09 | 2.160960E-10 | -2.182000E-12 |

Figure 41

| Tenth embodiment | | | | | | |
|---|---|---|---|---|---|---|
| EFL=6.563 mm, HFOV=44.193°, System length=8.530 mm, Fno=1.650, Image height=6.700 mm | | | | | | |
| Device | Surface | Radius of curvature (mm) | Thickness (mm) | Refractive index | Abbe number | Focal length (mm) |
| Object | | Infinity | Infinity | | | |
| Aperture 0 | | Infinity | -0.798 | | | |
| First lens element 1 | Object-side surface 15 | 3.067 | 0.832 | 1.545 | 55.987 | 7.983 |
| | Image-side surface 16 | 9.349 | 0.172 | | | |
| Second lens element 2 | Object-side surface 25 | 14.044 | 0.200 | 1.671 | 19.243 | -23.383 |
| | Image-side surface 26 | 7.402 | 0.187 | | | |
| Third lens element 3 | Object-side surface 35 | 15.757 | 0.348 | 1.545 | 55.987 | 70.128 |
| | Image-side surface 36 | 26.556 | 0.295 | | | |
| Fourth lens element 4 | Object-side surface 45 | -13.714 | 0.399 | 1.545 | 55.987 | 18.119 |
| | Image-side surface 46 | -5.808 | 0.041 | | | |
| Fifth lens element 5 | Object-side surface 55 | -8.514 | 0.200 | 1.671 | 19.243 | -24.094 |
| | Image-side surface 56 | -17.965 | 0.340 | | | |
| Sixth lens element 6 | Object-side surface 65 | 9.010 | 0.218 | 1.671 | 19.243 | -93.154 |
| | Image-side surface 66 | 7.808 | 1.017 | | | |
| Seventh lens element 7 | Object-side surface 75 | -38.162 | 0.982 | 1.545 | 55.987 | 7.316 |
| | Image-side surface 76 | -3.650 | 2.299 | | | |
| Eighth lens element 8 | Object-side surface 85 | -6.536 | 0.250 | 1.545 | 55.987 | -5.112 |
| | Image-side surface 86 | 4.941 | 0.500 | | | |
| Filter 9 | Object-side surface 95 | Infinity | 0.210 | 1.517 | 64.167 | |
| | Image-side surface 96 | Infinity | 0.040 | | | |
| | Image plane 99 | Infinity | | | | |

Figure 44

| Surface | K | $a_4$ | $a_6$ | $a_8$ | $a_{10}$ |
|---|---|---|---|---|---|
| 15 | 4.605624E-01 | -3.149004E-04 | -1.848648E-05 | 2.012251E-04 | -1.377713E-04 |
| 16 | 0.000000E+00 | -2.585578E-03 | 1.340709E-03 | -2.198672E-04 | 5.608012E-05 |
| 25 | 0.000000E+00 | -1.138980E-02 | 5.216632E-03 | -2.150444E-03 | 8.769351E-04 |
| 26 | -2.289371E+00 | -7.048573E-03 | 3.339100E-03 | -2.214320E-03 | 6.755141E-04 |
| 35 | 0.000000E+00 | -1.005324E-03 | -3.060941E-03 | 1.091527E-03 | -1.914146E-03 |
| 36 | 0.000000E+00 | -1.284583E-03 | -2.256197E-03 | 2.554016E-03 | -3.075201E-03 |
| 45 | 0.000000E+00 | -1.199972E-02 | 8.659048E-04 | 1.749065E-03 | -2.688061E-03 |
| 46 | 0.000000E+00 | 2.174878E-02 | -4.173463E-02 | 3.044351E-02 | -1.548547E-02 |
| 55 | 0.000000E+00 | 2.933727E-02 | -5.112864E-02 | 3.067577E-02 | -1.494973E-02 |
| 56 | 0.000000E+00 | -5.968146E-03 | -4.384330E-03 | -5.937349E-03 | 7.023440E-03 |
| 65 | 0.000000E+00 | -7.514579E-02 | 2.231842E-02 | -1.000629E-02 | 2.042054E-03 |
| 66 | 0.000000E+00 | -6.559503E-02 | 1.624284E-02 | -4.479212E-03 | -5.304524E-04 |
| 75 | 0.000000E+00 | -3.359848E-03 | -6.239908E-04 | 1.392673E-04 | -5.974949E-05 |
| 76 | -7.290997E+00 | -1.395699E-02 | 2.501300E-03 | -4.612858E-04 | 4.911288E-05 |
| 85 | -1.621840E+00 | -2.656210E-02 | 6.301083E-03 | -9.568564E-04 | 9.850940E-05 |
| 86 | -1.242676E+01 | -8.654957E-03 | 1.364780E-03 | -1.380609E-04 | 9.184535E-06 |
| Surface | $a_{12}$ | $a_{14}$ | $a_{16}$ | $a_{18}$ | $a_{20}$ |
| 15 | 6.293376E-05 | -1.392924E-05 | 1.348573E-06 | | |
| 16 | -1.325416E-05 | 4.067289E-06 | -5.851144E-07 | | |
| 25 | -2.146187E-04 | 2.986423E-05 | -2.174225E-06 | | |
| 26 | 2.735524E-05 | -2.985310E-05 | 1.249741E-06 | | |
| 35 | 1.438579E-03 | -4.042137E-04 | 3.875616E-05 | | |
| 36 | 1.923857E-03 | -5.252989E-04 | 5.136768E-05 | | |
| 45 | 1.448615E-03 | -3.429779E-04 | 2.822988E-05 | | |
| 46 | 5.090237E-03 | -9.456341E-04 | 7.388376E-05 | | |
| 55 | 5.095223E-03 | -9.792340E-04 | 7.844098E-05 | | |
| 56 | -4.407717E-03 | 1.824493E-03 | -4.644071E-04 | 6.477664E-05 | -3.791762E-06 |
| 65 | 9.059321E-04 | -9.380525E-04 | 3.440703E-04 | -6.103970E-05 | 4.245797E-06 |
| 66 | 1.294879E-03 | -6.637525E-04 | 1.778011E-04 | -2.532317E-05 | 1.507811E-06 |
| 75 | 1.238894E-05 | -1.467902E-06 | 1.213899E-07 | -8.142376E-09 | 3.186480E-10 |
| 76 | -1.340036E-06 | -7.749052E-07 | 1.702627E-07 | -1.449311E-08 | 4.490760E-10 |
| 85 | -6.671330E-06 | 2.923565E-07 | -7.996617E-09 | 1.243530E-10 | -8.410000E-13 |
| 86 | -4.067416E-07 | 1.183863E-08 | -2.177270E-10 | 2.296000E-12 | -1.100000E-14 |

Figure 45

| Eleventh embodiment | | | | | | |
|---|---|---|---|---|---|---|
| EFL=6.032 mm, HFOV=29.748°, System length=9.209 mm, Fno=1.650, Image height=5.800 mm | | | | | | |
| Device | Surface | Radius of curvature (mm) | Thickness (mm) | Refractive index | Abbe number | Focal length (mm) |
| Object | | Infinity | Infinity | | | |
| Aperture 0 | | Infinity | -0.756 | | | |
| First lens element 1 | Object-side surface 15 | 2.570 | 1.273 | 1.545 | 55.987 | 6.570 |
| | Image-side surface 16 | 7.463 | 0.217 | | | |
| Second lens element 2 | Object-side surface 25 | 14.783 | 0.499 | 1.671 | 19.243 | -16.444 |
| | Image-side surface 26 | 6.267 | 0.145 | | | |
| Third lens element 3 | Object-side surface 35 | 5.806 | 0.579 | 1.545 | 55.987 | 27.466 |
| | Image-side surface 36 | 9.136 | 0.677 | | | |
| Fourth lens element 4 | Object-side surface 45 | -5.180 | 0.528 | 1.671 | 19.243 | 200.189 |
| | Image-side surface 46 | -5.195 | 0.204 | | | |
| Fifth lens element 5 | Object-side surface 55 | -18.808 | 0.348 | 1.545 | 55.987 | -25.688 |
| | Image-side surface 56 | 55.626 | 0.321 | | | |
| Sixth lens element 6 | Object-side surface 65 | -9.590 | 0.408 | 1.671 | 19.243 | -23.801 |
| | Image-side surface 66 | -24.071 | 0.499 | | | |
| Seventh lens element 7 | Object-side surface 75 | 6.930 | 0.794 | 1.545 | 55.987 | 4.080 |
| | Image-side surface 76 | -3.153 | 0.959 | | | |
| Eighth lens element 8 | Object-side surface 85 | -11.986 | 0.404 | 1.535 | 55.690 | -7.757 |
| | Image-side surface 86 | 6.462 | 0.600 | | | |
| Filter 9 | Object-side surface 95 | Infinity | 0.210 | 1.517 | 64.167 | |
| | Image-side surface 96 | Infinity | 0.544 | | | |
| | Image plane 99 | Infinity | | | | |

Figure 48

| Surface | K | $a_4$ | $a_6$ | $a_8$ | $a_{10}$ |
|---|---|---|---|---|---|
| 15 | 1.283760E-01 | -1.864180E-03 | 3.255574E-03 | -2.964731E-03 | 1.694529E-03 |
| 16 | 0.000000E+00 | -3.119638E-03 | -1.882739E-03 | -1.869326E-03 | 2.255350E-03 |
| 25 | 0.000000E+00 | 8.864651E-04 | -1.385786E-02 | 8.446737E-03 | -1.404401E-03 |
| 26 | 1.345270E+01 | 8.475881E-03 | -2.367665E-02 | 7.929749E-03 | 3.676356E-03 |
| 35 | 0.000000E+00 | 7.088246E-03 | -8.697156E-03 | -1.494132E-02 | 1.677527E-02 |
| 36 | 0.000000E+00 | 6.038050E-03 | -9.262684E-04 | -9.745013E-03 | 6.805956E-03 |
| 45 | 0.000000E+00 | 3.032975E-04 | -1.586982E-02 | 1.658302E-02 | -1.602471E-02 |
| 46 | 0.000000E+00 | 1.881681E-02 | -5.358072E-02 | 5.271989E-02 | -3.397733E-02 |
| 55 | 0.000000E+00 | 6.922752E-03 | -8.034003E-02 | 7.313307E-02 | -4.353148E-02 |
| 56 | 0.000000E+00 | 1.253920E-02 | -7.029526E-02 | 5.747086E-02 | -2.999476E-02 |
| 65 | 0.000000E+00 | 1.077555E-02 | -4.899309E-02 | 4.924846E-02 | -2.755696E-02 |
| 66 | 0.000000E+00 | -1.606448E-02 | -2.133164E-02 | 2.348963E-02 | -1.103775E-02 |
| 75 | 0.000000E+00 | 3.568300E-03 | -1.129864E-02 | 3.996309E-03 | -9.254816E-04 |
| 76 | -1.365269E+03 | -4.755390E-03 | 5.753546E-03 | -4.005257E-03 | 1.132076E-03 |
| 85 | 3.882174E-01 | -2.817655E-02 | 6.430485E-03 | -1.891011E-03 | 3.797936E-04 |
| 86 | -4.218049E+01 | -1.712170E-02 | 3.300113E-03 | -5.541563E-04 | 6.979192E-05 |
| Surface | $a_{12}$ | $a_{14}$ | $a_{16}$ | $a_{18}$ | $a_{20}$ |
| 15 | -6.276710E-04 | 1.340790E-04 | -1.268095E-05 | | |
| 16 | -1.015838E-03 | 2.007264E-04 | -1.505591E-05 | | |
| 25 | -4.083339E-04 | 1.904740E-04 | -1.938709E-05 | | |
| 26 | -3.430698E-03 | 9.463647E-04 | -8.737250E-05 | | |
| 35 | -7.760974E-03 | 1.803544E-03 | -1.805050E-04 | | |
| 36 | -1.734336E-03 | 4.470402E-05 | 3.206101E-05 | | |
| 45 | 8.614939E-03 | -2.361301E-03 | 2.662615E-04 | | |
| 46 | 1.290673E-02 | -2.589025E-03 | 2.104774E-04 | | |
| 55 | 1.582516E-02 | -3.078367E-03 | 2.391372E-04 | | |
| 56 | 9.221784E-03 | -1.403958E-03 | 3.211656E-05 | 1.603639E-05 | -1.299893E-06 |
| 65 | 9.043974E-03 | -1.778530E-03 | 2.054732E-04 | -1.274160E-05 | 3.231961E-07 |
| 66 | 2.910269E-03 | -4.557301E-04 | 4.196106E-05 | -2.095689E-06 | 4.388047E-08 |
| 75 | 1.664341E-04 | -2.472789E-05 | 2.498166E-06 | -1.361510E-07 | 2.949826E-09 |
| 76 | -1.612659E-04 | 1.001519E-05 | 8.689457E-08 | -4.002203E-08 | 1.348074E-09 |
| 85 | -4.277043E-05 | 2.820289E-06 | -1.100326E-07 | 2.382908E-09 | -2.242300E-11 |
| 86 | -6.271992E-06 | 3.937029E-07 | -1.630453E-08 | 3.953050E-10 | -4.205000E-12 |

Figure 49

| Condition expression | First embodiment | Second embodiment | Third embodiment | Fourth embodiment | Fifth embodiment | Sixth embodiment |
|---|---|---|---|---|---|---|
| T1 | 0.989 | 1.139 | 1.001 | 1.025 | 1.724 | 1.090 |
| G12 | 0.082 | 0.042 | 0.040 | 0.195 | 0.177 | 0.239 |
| T2 | 0.357 | 0.393 | 0.347 | 0.253 | 0.205 | 0.253 |
| G23 | 0.144 | 0.388 | 0.286 | 0.199 | 0.211 | 0.196 |
| T3 | 0.523 | 0.668 | 0.320 | 0.363 | 0.596 | 0.289 |
| G34 | 0.422 | 0.393 | 0.500 | 0.335 | 0.481 | 0.667 |
| T4 | 0.478 | 0.722 | 0.541 | 0.323 | 0.436 | 0.577 |
| G45 | 0.267 | 0.371 | 0.488 | 0.135 | 0.208 | 0.220 |
| T5 | 0.381 | 0.456 | 0.367 | 0.357 | 0.873 | 0.497 |
| G56 | 0.302 | 0.437 | 0.482 | 0.176 | 0.358 | 0.347 |
| T6 | 0.360 | 0.426 | 0.447 | 0.568 | 0.318 | 0.360 |
| G67 | 0.444 | 0.719 | 0.394 | 0.324 | 0.528 | 0.752 |
| T7 | 0.550 | 0.577 | 1.001 | 1.087 | 0.884 | 0.917 |
| G78 | 0.850 | 1.058 | 0.795 | 1.408 | 1.151 | 0.958 |
| T8 | 0.399 | 0.496 | 1.364 | 0.352 | 0.463 | 0.371 |
| G8F | 0.600 | 0.550 | 0.600 | 0.500 | 0.550 | 0.600 |
| TF | 0.210 | 0.210 | 0.210 | 0.210 | 0.210 | 0.210 |
| GFP | 0.202 | 0.102 | 0.040 | 0.040 | 0.829 | 0.782 |
| BFL | 1.012 | 0.862 | 0.850 | 0.750 | 1.589 | 1.592 |
| EFL | 5.842 | 7.386 | 7.256 | 6.166 | 8.678 | 7.580 |
| TTL | 7.559 | 9.146 | 9.222 | 7.849 | 10.203 | 9.326 |
| TL | 6.547 | 8.284 | 8.372 | 7.099 | 8.614 | 7.734 |
| ALT | 4.037 | 4.877 | 5.387 | 4.327 | 5.499 | 4.355 |
| AAG | 2.510 | 3.408 | 2.985 | 2.772 | 3.115 | 3.379 |
| ImgH | 5.800 | 6.700 | 6.700 | 5.800 | 6.700 | 6.700 |
| V1 | 55.987 | 55.987 | 55.987 | 55.987 | 55.987 | 55.987 |
| V2 | 19.243 | 19.243 | 19.243 | 19.243 | 19.243 | 19.243 |
| V3 | 55.987 | 19.243 | 55.987 | 55.987 | 19.243 | 55.987 |
| V4 | 55.982 | 55.987 | 55.987 | 55.987 | 55.987 | 55.987 |
| V5 | 25.920 | 25.920 | 25.920 | 25.920 | 19.243 | 19.243 |
| V6 | 19.243 | 19.243 | 19.243 | 19.243 | 19.243 | 19.243 |
| V7 | 55.987 | 55.987 | 55.987 | 55.987 | 55.987 | 55.987 |
| V8 | 55.690 | 55.987 | 55.987 | 55.690 | 55.987 | 55.987 |

Figure 50

| Condition expression | First embodiment | Second embodiment | Third embodiment | Fourth embodiment | Fifth embodiment | Sixth embodiment |
|---|---|---|---|---|---|---|
| \|V4-V5\| | 30.062 | 30.067 | 30.067 | 30.067 | 36.744 | 36.744 |
| (G67+T7)/(G56+T6) | 1.500 | 1.501 | 1.501 | 1.896 | 2.087 | 2.358 |
| ImgH/BFL | 5.732 | 7.773 | 7.882 | 7.733 | 4.217 | 4.208 |
| (T1+G12)/T2 | 3.000 | 3.007 | 3.001 | 4.819 | 9.285 | 5.247 |
| (T2+T3+T6)/(G12+G45) | 3.558 | 3.597 | 2.108 | 3.590 | 2.902 | 1.964 |
| (T7+G78+T8)/T6 | 5.000 | 5.001 | 7.073 | 5.010 | 7.849 | 6.235 |
| EFL/AAG | 2.327 | 2.167 | 2.431 | 2.224 | 2.786 | 2.243 |
| (T2+T3+T4+T5)/G67 | 3.920 | 3.116 | 3.999 | 3.996 | 3.996 | 2.151 |
| (G23+G34+G45)/T3 | 1.591 | 1.725 | 3.984 | 1.845 | 1.509 | 3.753 |
| ALT/(T7+G78) | 2.885 | 2.982 | 2.999 | 1.734 | 2.702 | 2.322 |
| TTL/(T1+T7+G78) | 3.165 | 3.297 | 3.296 | 2.230 | 2.714 | 3.145 |
| (G45+G56+T6)/T8 | 2.326 | 2.489 | 1.039 | 2.499 | 1.910 | 2.499 |
| EFL/(T5+G56+T6) | 5.600 | 5.601 | 5.601 | 5.601 | 5.601 | 6.290 |
| TL/(T3+T4+T7) | 4.222 | 4.211 | 4.498 | 4.006 | 4.495 | 4.339 |
| (G23+G78)/T4 | 2.079 | 2.001 | 2.001 | 4.976 | 3.124 | 2.001 |
| T1/(G12+T3) | 1.635 | 1.605 | 2.783 | 1.839 | 2.229 | 2.067 |
| (T1+T2+T3)/(G12+G78) | 2.007 | 1.999 | 1.997 | 1.023 | 1.900 | 1.363 |
| EFL/(G23+G45+G67) | 6.843 | 5.001 | 6.211 | 9.363 | 9.164 | 6.490 |
| (G12+BFL)/T7 | 1.990 | 1.567 | 0.889 | 0.869 | 1.998 | 1.997 |
| V2+V3+V4 | 131.212 | 94.473 | 131.217 | 131.217 | 94.473 | 131.217 |
| V3+V4+V6 | 131.212 | 94.473 | 131.217 | 131.217 | 94.473 | 131.217 |
| V5+V6 | 45.163 | 45.163 | 45.163 | 45.163 | 38.486 | 38.486 |
| V2+V5 | 45.163 | 45.163 | 45.163 | 45.163 | 38.486 | 38.486 |

Figure 51

| Condition expression | Seventh embodiment | Eighth embodiment | Ninth embodiment | Tenth embodiment | Eleventh embodiment |
|---|---|---|---|---|---|
| T1 | 1.403 | 0.710 | 1.021 | 0.832 | 1.273 |
| G12 | 0.176 | 0.043 | 0.202 | 0.172 | 0.217 |
| T2 | 0.526 | 0.251 | 0.266 | 0.200 | 0.499 |
| G23 | 0.192 | 0.304 | 0.187 | 0.187 | 0.145 |
| T3 | 0.701 | 0.399 | 0.343 | 0.348 | 0.579 |
| G34 | 0.730 | 0.281 | 0.356 | 0.295 | 0.677 |
| T4 | 0.665 | 0.644 | 0.370 | 0.399 | 0.528 |
| G45 | 0.295 | 0.286 | 0.113 | 0.041 | 0.204 |
| T5 | 0.297 | 0.251 | 0.374 | 0.200 | 0.348 |
| G56 | 0.338 | 0.271 | 0.215 | 0.340 | 0.321 |
| T6 | 0.469 | 0.533 | 0.526 | 0.218 | 0.408 |
| G67 | 0.547 | 0.591 | 0.339 | 1.017 | 0.499 |
| T7 | 0.767 | 1.245 | 0.952 | 0.982 | 0.794 |
| G78 | 1.138 | 0.984 | 1.344 | 2.299 | 0.959 |
| T8 | 0.441 | 0.436 | 0.342 | 0.250 | 0.404 |
| G8F | 0.600 | 0.500 | 0.500 | 0.500 | 0.600 |
| TF | 0.210 | 0.210 | 0.210 | 0.210 | 0.210 |
| GFP | 0.554 | 0.040 | 0.140 | 0.040 | 0.544 |
| BFL | 1.364 | 0.750 | 0.850 | 0.750 | 1.354 |
| EFL | 6.182 | 5.913 | 6.244 | 6.563 | 6.032 |
| TTL | 10.049 | 7.978 | 7.799 | 8.530 | 9.209 |
| TL | 8.686 | 7.228 | 6.949 | 7.780 | 7.856 |
| ALT | 5.269 | 4.468 | 4.193 | 3.429 | 4.833 |
| AAG | 3.416 | 2.760 | 2.756 | 4.351 | 3.023 |
| ImgH | 5.800 | 6.700 | 5.800 | 6.700 | 5.800 |
| V1 | 55.987 | 55.987 | 55.987 | 55.987 | 55.987 |
| V2 | 19.243 | 19.243 | 19.243 | 19.243 | 19.243 |
| V3 | 55.987 | 55.987 | 55.987 | 55.987 | 55.987 |
| V4 | 55.987 | 55.987 | 55.987 | 55.987 | 19.243 |
| V5 | 19.243 | 19.243 | 19.243 | 19.243 | 55.987 |
| V6 | 19.243 | 19.243 | 19.243 | 19.243 | 19.243 |
| V7 | 55.987 | 55.987 | 55.987 | 55.987 | 55.987 |
| V8 | 55.690 | 55.987 | 55.690 | 55.987 | 55.690 |

Figure 52

| Condition expression | Seventh embodiment | Eighth embodiment | Ninth embodiment | Tenth embodiment | Eleventh embodiment |
|---|---|---|---|---|---|
| \|V4-V5\| | 36.744 | 36.744 | 36.744 | 36.744 | 36.744 |
| (G67+T7)/(G56+T6) | 1.628 | 2.283 | 1.744 | 3.586 | 1.771 |
| ImgH/BFL | 4.254 | 8.933 | 6.824 | 8.933 | 4.285 |
| (T1+G12)/T2 | 3.000 | 3.002 | 4.593 | 5.017 | 2.986 |
| (T2+T3+T6)/(G12+G45) | 3.600 | 3.599 | 3.599 | 3.599 | 3.529 |
| (T7+G78+T8)/T6 | 5.001 | 5.001 | 5.018 | 16.199 | 5.283 |
| EFL/AAG | 1.810 | 2.142 | 2.266 | 1.508 | 1.996 |
| (T2+T3+T4+T5)/G67 | 4.000 | 2.612 | 3.993 | 1.128 | 3.915 |
| (G23+G34+G45)/T3 | 1.736 | 2.183 | 1.917 | 1.503 | 1.773 |
| ALT/(T7+G78) | 2.766 | 2.005 | 1.826 | 1.045 | 2.757 |
| TTL/(T1+T7+G78) | 3.038 | 2.715 | 2.352 | 2.074 | 3.043 |
| (G45+G56+T6)/T8 | 2.499 | 2.499 | 2.499 | 2.396 | 2.309 |
| EFL/(T5+G56+T6) | 5.599 | 5.603 | 5.601 | 8.663 | 5.599 |
| TL/(T3+T4+T7) | 4.072 | 3.160 | 4.174 | 4.499 | 4.134 |
| (G23+G78)/T4 | 2.000 | 2.002 | 4.136 | 6.234 | 2.091 |
| T1/(G12+T3) | 1.600 | 1.608 | 1.875 | 1.601 | 1.600 |
| (T1+T2+T3)/(G12+G78) | 2.001 | 1.325 | 1.054 | 0.558 | 1.999 |
| EFL/(G23+G45+G67) | 5.977 | 5.004 | 9.773 | 5.272 | 7.114 |
| (G12+BFL)/T7 | 2.007 | 0.637 | 1.105 | 0.938 | 1.979 |
| V2+V3+V4 | 131.217 | 131.217 | 131.217 | 131.217 | 94.473 |
| V3+V4+V6 | 131.217 | 131.217 | 131.217 | 131.217 | 94.473 |
| V5+V6 | 38.486 | 38.486 | 38.486 | 38.486 | 75.230 |
| V2+V5 | 38.486 | 38.486 | 38.486 | 38.486 | 75.230 |

Figure 53

OPTICAL IMAGING LENS INCLUDING EIGHT LENSES OF +−++−+−, +−+−−+− OR +−++−++− REFRACTIVE POWERS

CROSS-REFERENCE TO RELATED APPLICATION

This application claims the priority benefit of China application serial no. 202011428427.3, filed on Dec. 9, 2020. The entirety of the above-mentioned patent application is hereby incorporated by reference herein and made a part of this specification.

BACKGROUND OF THE INVENTION

1. Field of the Invention

The invention relates to an optical element, and in particular to an optical imaging lens.

2. Description of Related Art

In recent years, optical imaging lenses keep evolving. In addition to making optical imaging lenses light, thin and compact, improving the imaging quality of such lenses, such as improving optical and chromatic aberrations, is also important. To cope with the demands, the number of optical lens elements may be increased, but such increase would result in a longer distance from the object-side surface of a first lens element to an image plane on the optical axis, which makes it difficult to reduce the thickness of mobile phones and digital cameras.

Therefore, efforts have been devoted to provide an optical imaging lens which is light, thin and compact and has favorable imaging quality. In addition, a small F-number increases the luminous flux, and a great image height helps moderately increase the pixel size which helps night shooting. Thus, a small F-number and a great image height are gradually becoming the trend on the market.

SUMMARY OF THE INVENTION

The invention provides an optical imaging lens capable of providing a greater image height while reducing the system length as well as the F-number of the optical imaging lens.

The invention provides an optical imaging lens, including a first lens element, a second lens element, a third lens element, a fourth lens element, a fifth lens element, a sixth lens element, a seventh lens element and an eighth lens element sequentially arranged along an optical axis from an object side to an image side. Each of the first lens element to the eighth lens element includes an object-side surface facing the object side and allowing imaging rays to pass through and an image-side surface facing the image side and allowing the imaging rays to pass through. The second lens element has negative refracting power. A periphery region of the image-side surface of the third lens element is concave. An optical axis region of the object-side surface of the fourth lens element is concave. An optical axis region of the image-side surface of the seventh lens element is convex. Lens elements of the optical imaging lens are only the eight lens elements described above, and satisfy the following conditions: $|V4−V5| \geq 30.000$ and $(G67+T7)/(G56+T6) \geq 1.500$. V4 is an Abbe number of the fourth lens element; V5 is an Abbe number of the fifth lens element; G67 is an air gap between the sixth lens element and the seventh lens element on the optical axis; T7 is a thickness of the seventh lens element on the optical axis; G56 is an air gap between the fifth lens element and the sixth lens element on the optical axis; and T6 is a thickness of the sixth lens element on the optical axis.

The invention further provides an optical imaging lens, including a first lens element, a second lens element, a third lens element, a fourth lens element, a fifth lens element, a sixth lens element, a seventh lens element and an eighth lens element sequentially arranged along an optical axis from an object side to an image side. Each of the first lens element to the eighth lens element includes an object-side surface facing the object side and allowing imaging rays to pass through and an image-side surface facing the image side and allowing the imaging rays to pass through. The second lens element has negative refracting power. A periphery region of the image-side surface of the third lens element is concave. An optical axis region of the object-side surface of the fourth lens element is concave. The fifth lens element has negative refracting power. The sixth lens element has negative refracting power. Lens elements of the optical imaging lens are only the eight lens elements described above, and satisfy the following conditions: $|V4−V5| \geq 30.000$ and $(G67+T7)/(G56+T6) \geq 1.500$. V4 is an Abbe number of the fourth lens element; V5 is an Abbe number of the fifth lens element; G67 is an air gap between the sixth lens element and the seventh lens element on the optical axis; T7 is a thickness of the seventh lens element on the optical axis; G56 is an air gap between the fifth lens element and the sixth lens element on the optical axis; and T6 is a thickness of the sixth lens element on the optical axis.

The invention further provides an optical imaging lens, including a first lens element, a second lens element, a third lens element, a fourth lens element, a fifth lens element, a sixth lens element, a seventh lens element and an eighth lens element sequentially arranged along an optical axis from an object side to an image side. Each of the first lens element to the eighth lens element includes an object-side surface facing the object side and allowing imaging rays to pass through and an image-side surface facing the image side and allowing the imaging rays to pass through. The second lens element has negative refracting power. The third lens element has positive refracting power, and a periphery region of the image-side surface of the third lens element is concave. An optical axis region of the image-side surface of the seventh lens element is convex. Lens elements of the optical imaging lens are only the eight lens elements described above, and satisfy the following conditions: $|V4−V5| \geq 30.000$ and $(G67+T7)/(G56+T6) \geq 1.500$. V4 is an Abbe number of the fourth lens element; V5 is an Abbe number of the fifth lens element; G67 is an air gap between the sixth lens element and the seventh lens element on the optical axis; T7 is a thickness of the seventh lens element on the optical axis; G56 is an air gap between the fifth lens element and the sixth lens element on the optical axis; and T6 is a thickness of the sixth lens element on the optical axis.

Based on the above, in the optical imaging lens of the embodiments of the invention, with the conditions satisfying the concave-convex surface arrangement design and the refracting power of the above lens and the design satisfying the above conditions, the optical imaging lens has a greater image height, and at the same time, while the system length of the optical imaging lens is reduced, and the F-number of the optical imaging lens is decreased.

To enable the above features and advantages of the invention to be more comprehensible, the invention is described in detail below through embodiments with reference to the accompanying drawings.

BRIEF DESCRIPTION OF THE DRAWINGS

FIG. 8 illustrates detailed optical data of an optical imaging lens of a first embodiment of the invention.

FIG. 9 illustrates aspheric parameters of an optical imaging lens of a first embodiment of the invention.

FIG. 12 illustrates detailed optical data of an optical imaging lens of a second embodiment of the invention.

FIG. 13 illustrates aspheric parameters of an optical imaging lens of a second embodiment of the invention.

FIG. 16 illustrates detailed optical data of an optical imaging lens of a third embodiment of the invention.

FIG. 17 illustrates aspheric parameters of an optical imaging lens of a third embodiment of the invention.

FIG. 20 illustrates detailed optical data of an optical imaging lens of a fourth embodiment of the invention.

FIG. 21 illustrates aspheric parameters of an optical imaging lens of a fourth embodiment of the invention.

FIG. 24 illustrates detailed optical data of an optical imaging lens of a fifth embodiment of the invention.

FIG. 25 illustrates aspheric parameters of an optical imaging lens of a fifth embodiment of the invention.

FIG. 28 illustrates detailed optical data of an optical imaging lens of a sixth embodiment of the invention.

FIG. 29 illustrates aspheric parameters of an optical imaging lens of a sixth embodiment of the invention.

FIG. 32 illustrates detailed optical data of an optical imaging lens of a seventh embodiment of the invention.

FIG. 33 illustrates aspheric parameters of an optical imaging lens of a seventh embodiment of the invention.

FIG. 36 illustrates detailed optical data of an optical imaging lens of an eighth embodiment of the invention.

FIG. 37 illustrates aspheric parameters of an optical imaging lens of an eighth embodiment of the invention.

FIG. 38 is a schematic diagram of an optical imaging lens of a ninth embodiment of the invention.

FIG. 39A to FIG. 39D are diagrams of longitudinal spherical aberrations and various aberrations of an optical imaging lens of a ninth embodiment.

FIG. 40 illustrates detailed optical data of an optical imaging lens of a ninth embodiment of the invention.

FIG. 41 illustrates aspheric parameters of an optical imaging lens of a ninth embodiment of the invention.

FIG. 44 illustrates detailed optical data of an optical imaging lens of a tenth embodiment of the invention.

FIG. 45 illustrates aspheric parameters of an optical imaging lens of a tenth embodiment of the invention.

FIG. 48 illustrates detailed optical data of an optical imaging lens of an eleventh embodiment of the invention.

FIG. 49 illustrates aspheric parameters of an optical imaging lens of an eleventh embodiment of the invention.

FIG. 50 and FIG. 51 illustrate all important parameters and numerical values of relational expressions of the optical imaging lenses of first to sixth embodiments of the invention.

FIG. 52 and FIG. 53 illustrate all important parameters and numerical values of relational expressions of the optical imaging lenses of seventh to eleventh embodiments of the invention.

DESCRIPTION OF THE EMBODIMENTS

The terms "optical axis region", "periphery region", "concave", and "convex" used in this specification and claims should be interpreted based on the definition listed in the specification by the principle of lexicographer.

Figure 1:
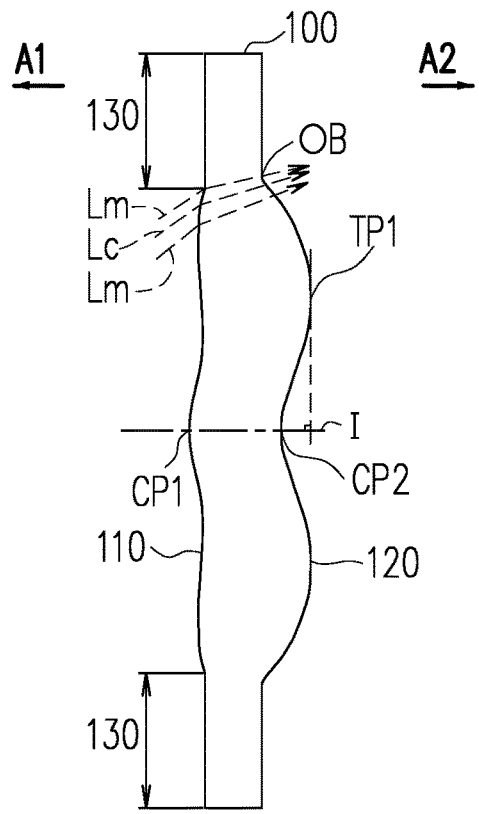
FIG. 1 is a schematic diagram illustrating a surface shape structure of a lens element.

In the present disclosure, the optical system may comprise at least one lens element to receive imaging rays that are incident on the optical system over a set of angles ranging from parallel to an optical axis to a half field of view (HFOV) angle with respect to the optical axis. The imaging rays pass through the optical system to produce an image on an image plane. The term "a lens element having positive refracting power (or negative refracting power)" means that the paraxial refracting power of the lens element in Gaussian optics is positive (or negative). The term "an object-side (or image-side) surface of a lens element" refers to a specific region of that surface of the lens element at which imaging rays can pass through that specific region. Imaging rays include at least two types of rays: a chief ray Lc and a marginal ray Lm (as shown in FIG. 1). An object-side (or image-side) surface of a lens element can be characterized as having several regions, including an optical axis region, a periphery region, and, in some cases, one or more intermediate regions, as discussed more fully below.

Figure 4:
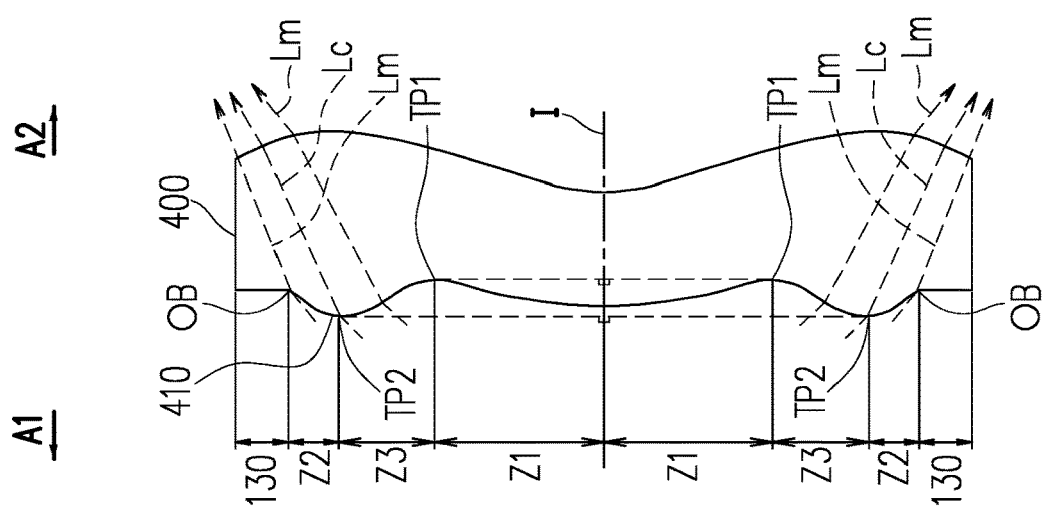
FIG. 4 is a schematic diagram illustrating a surface shape structure of a lens element of Example 2.

FIG. 1 is a radial cross-sectional view of a lens element 100. Two referential points for the surfaces of the lens element 100 can be defined: a central point, and a transition point. The central point of a surface of a lens element is a point of intersection of that surface and the optical axis I. As illustrated in FIG. 1, a first central point CP1 may be present on the object-side surface 110 of lens element 100 and a second central point CP2 may be present on the image-side surface 120 of the lens element 100. The transition point is a point on a surface of a lens element, at which the line tangent to that point is perpendicular to the optical axis I. The optical boundary OB of a surface of the lens element is defined as a point at which the radially outermost marginal ray Lm passing through the surface of the lens element intersects the surface of the lens element. All transition points lie between the optical axis I and the optical boundary OB of the surface of the lens element. A surface of the lens element 100 may have no transition point or have at least one transition point. If multiple transition points are present on a single surface, then these transition points are sequentially named along the radial direction of the surface with reference numerals starting from the first transition point. For example, the first transition point, e.g., TP1, (closest to the optical axis I), the second transition point, e.g., TP2, (as shown in FIG. 4), and the Nth transition point (farthest from the optical axis I).

When a surface of the lens element has at least one transition point, the region of the surface of the lens element from the central point to the first transition point TP1 is defined as the optical axis region, which includes the central point. The region located radially outside of the farthest transition point (the Nth transition point) from the optical axis I to the optical boundary OB of the surface of the lens element is defined as the periphery region. In some embodiments, there may be intermediate regions present between the optical axis region and the periphery region, with the number of intermediate regions depending on the number of the transition points. When a surface of the lens element has no transition point, the optical axis region is defined as a region of 0%-50% of the distance between the optical axis I and the optical boundary OB of the surface of the lens element, and the periphery region is defined as a region of 50%-100% of the distance between the optical axis I and the optical boundary OB of the surface of the lens element.

The shape of a region is convex if a collimated ray being parallel to the optical axis I and passing through the region is bent toward the optical axis I such that the ray intersects the optical axis I on the image side A2 of the lens element. The shape of a region is concave if the extension line of a collimated ray being parallel to the optical axis I and passing through the region intersects the optical axis I on the object side A1 of the lens element.

Additionally, referring to FIG. 1, the lens element 100 may also have a mounting portion 130 extending radially outward from the optical boundary OB. The mounting portion 130 is typically used to physically secure the lens element to a corresponding element of the optical system (not shown). Imaging rays do not reach the mounting portion 130. The structure and shape of the mounting portion 130 are only examples to explain the technologies, and should not be taken as limiting the scope of the present disclosure. The mounting portion 130 of the lens elements discussed below may be partially or completely omitted in the following drawings.

Figure 2:
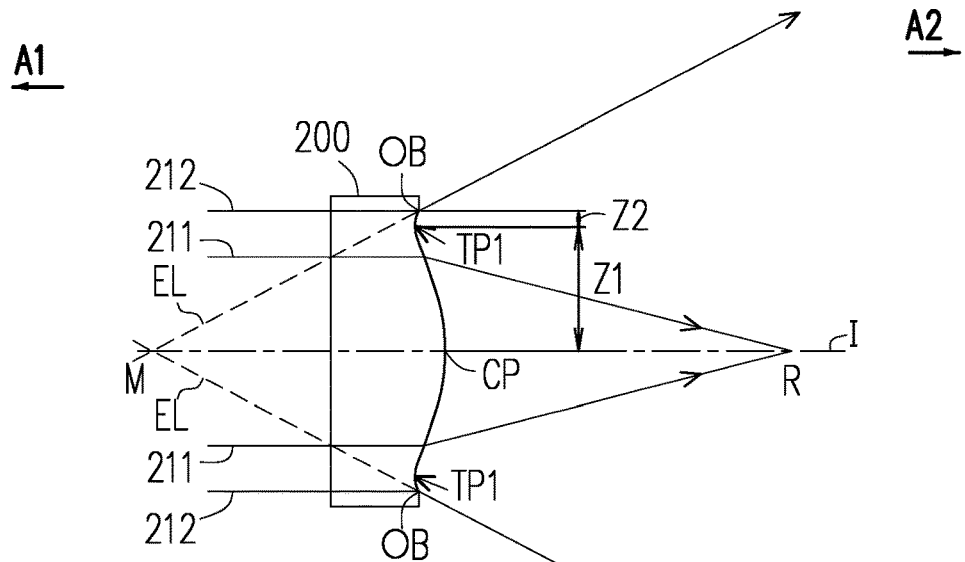
FIG. 2 is a schematic diagram illustrating a concave-convex structure and an intersection point of rays of a lens element.

Referring to FIG. 2, optical axis region Z1 is defined between central point CP and first transition point TP1. Periphery region Z2 is defined between TP1 and the optical boundary OB of the surface of the lens element. Collimated ray 211 intersects the optical axis I on the image side A2 of lens element 200 after passing through optical axis region Z1, i.e., the focal point of collimated ray 211 after passing through optical axis region Z1 is on the image side A2 of the lens element 200 at point R in FIG. 2. Accordingly, since the ray itself intersects the optical axis I on the image side A2 of the lens element 200, optical axis region Z1 is convex. On the contrary, collimated ray 212 diverges after passing through periphery region Z2. The extension line EL of collimated ray 212 after passing through periphery region Z2 intersects the optical axis I on the object side A1 of lens element 200, i.e., the focal point of collimated ray 212 after passing through periphery region Z2 is on the object side A1 at point M in FIG. 2. Accordingly, since the extension line EL of the ray intersects the optical axis I on the object side A1 of the lens element 200, periphery region Z2 is concave. In the lens element 200 illustrated in FIG. 2, the first transition point TP1 is the border of the optical axis region and the periphery region, i.e., TP1 is the point at which the shape changes from convex to concave.

Alternatively, there is another way for a person having ordinary skill in the art to determine whether an optical axis region is convex or concave by referring to the sign of "Radius of curvature" (the "R" value), which is the paraxial radius of shape of a lens surface in the optical axis region. The R value is commonly used in conventional optical design software such as Zemax and CodeV. The R value usually appears in the lens data sheet in the software. For an object-side surface, a positive R value defines that the optical axis region of the object-side surface is convex, and a negative R value defines that the optical axis region of the object-side surface is concave. Conversely, for an image-side surface, a positive R value defines that the optical axis region of the image-side surface is concave, and a negative R value defines that the optical axis region of the image-side surface is convex. The result found by using this method should be consistent with the method utilizing intersection of the optical axis by rays/extension lines mentioned above, which determines surface shape by referring to whether the focal point of a collimated ray being parallel to the optical axis I is on the object-side or the image-side of a lens element. As used herein, the terms "a shape of a region is convex (concave)," "a region is convex (concave)," and "a convex- (concave-) region," can be used alternatively.

Figure 5:
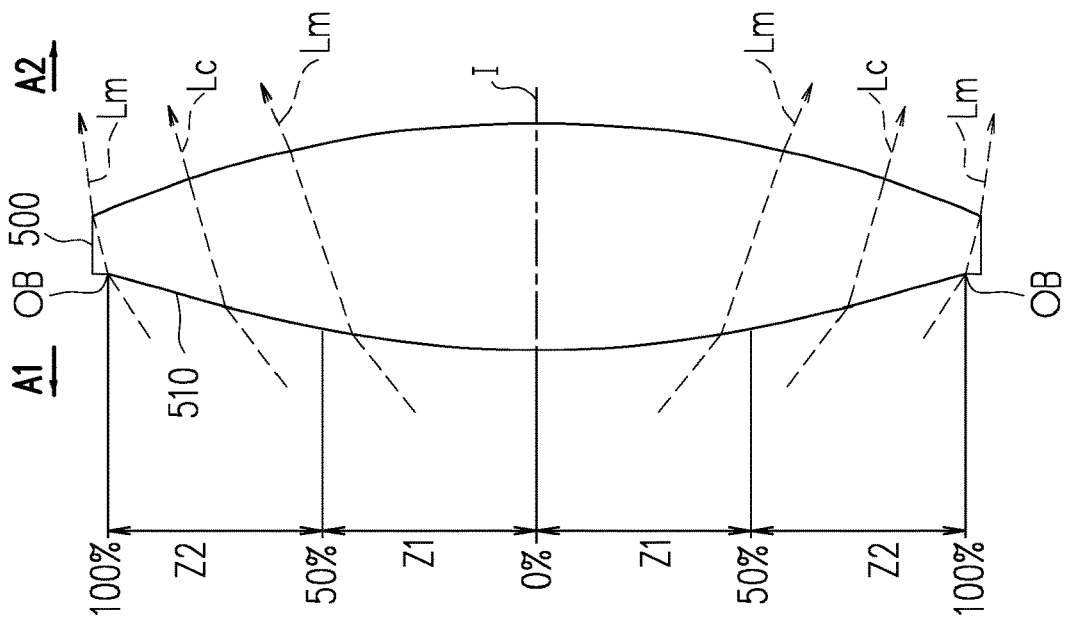
FIG. 5 is a schematic diagram illustrating a surface shape structure of a lens element of Example 3.
Figure 3:
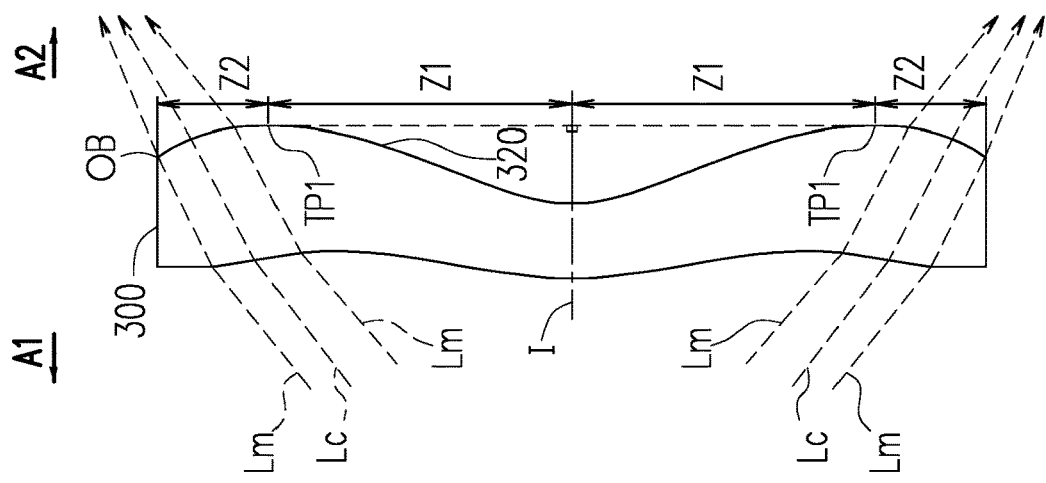
FIG. 3 is a schematic diagram illustrating a surface shape structure of a lens element of Example 1.

FIG. 3, FIG. 4 and FIG. 5 illustrate examples of determining the shape of lens element regions and the boundaries of regions under various circumstances, including the optical axis region, the periphery region, and intermediate regions as set forth in the present specification.

FIG. 3 is a radial cross-sectional view of a lens element 300. As illustrated in FIG. 3, only one transition point TP1 appears within the optical boundary OB of the image-side surface 320 of the lens element 300. Optical axis region Z1 and periphery region Z2 of the image-side surface 320 of lens element 300 are illustrated. The R value of the image-side surface 320 is positive (i.e., R>0). Accordingly, the optical axis region Z1 is concave.

In general, the shape of each region demarcated by the transition point will have an opposite shape to the shape of the adjacent region(s). Accordingly, the transition point will define a transition in shape, changing from concave to convex at the transition point or changing from convex to concave. In FIG. 3, since the shape of the optical axis region Z1 is concave, the shape of the periphery region Z2 will be convex as the shape changes at the transition point TP1.

FIG. 4 is a radial cross-sectional view of a lens element 400. Referring to FIG. 4, a first transition point TP1 and a second transition point TP2 are present on the object-side surface 410 of lens element 400. The optical axis region Z1 of the object-side surface 410 is defined between the optical axis I and the first transition point TP1. The R value of the object-side surface 410 is positive (i.e., R>0). Accordingly, the optical axis region Z1 is convex.

The periphery region Z2 of the object-side surface 410, which is also convex, is defined between the second transition point TP2 and the optical boundary OB of the object-side surface 410 of the lens element 400. Further, intermediate region Z3 of the object-side surface 410, which is concave, is defined between the first transition point TP1 and the second transition point TP2. Referring once again to FIG. 4, the object-side surface 410 includes an optical axis region Z1 located between the optical axis I and the first transition point TP1, an intermediate region Z3 located between the first transition point TP1 and the second transition point TP2, and a periphery region Z2 located between the second transition point TP2 and the optical boundary OB of the object-side surface 410. Since the shape of the optical axis region Z1 is designed to be convex, the shape of the intermediate region Z3 is concave as the shape of the intermediate region Z3 changes at the first transition point TP1, and the shape of the periphery region Z2 is convex as the shape of the periphery region Z2 changes at the second transition point TP2.

FIG. 5 is a radial cross-sectional view of a lens element 500. Lens element 500 has no transition point on the object-side surface 510 of the lens element 500. For a surface of a lens element with no transition point, for example, the object-side surface 510 the lens element 500, the optical axis region Z1 is defined as the region of 0%-50% of the distance between the optical axis I and the optical boundary OB of the surface of the lens element and the periphery region is defined as the region of 50%-100% of the distance between the optical axis I and the optical boundary OB of the surface of the lens element. Referring to lens element 500 illustrated in FIG. 5, the optical axis region Z1 of the object-side surface 510 is defined between the optical axis I and 50% of the distance between the optical axis I and the optical boundary OB. The R value of the object-side surface 510 is positive (i.e., R>0). Accordingly, the optical axis region Z1 is convex. For the object-side surface 510 of the lens element 500, because there is no transition point, the periphery region Z2 of the object-side surface 510 is also convex. It should be noted that lens element 500 may have a mounting portion (not shown) extending radially outward from the periphery region Z2.

Figure 6:
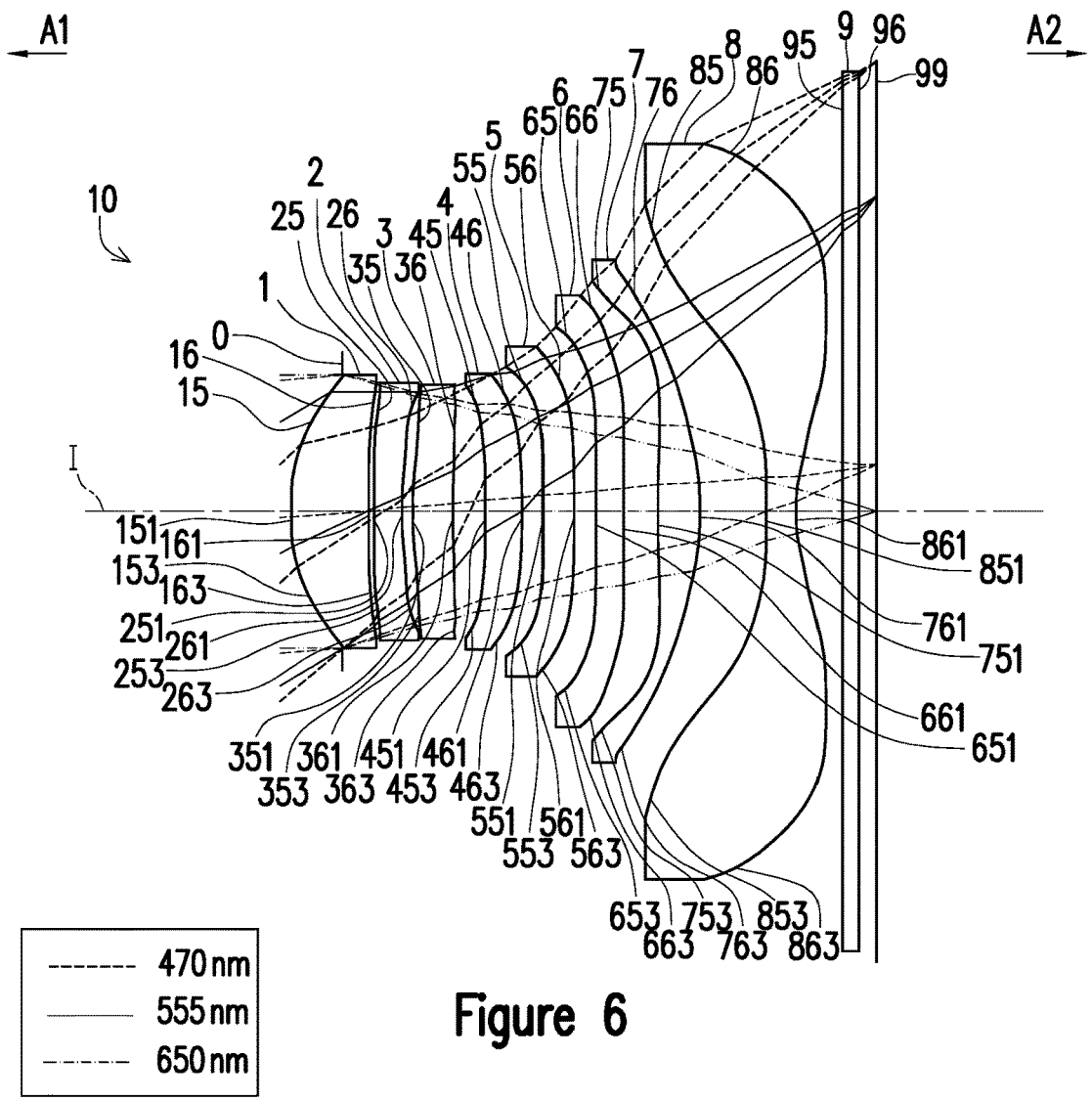
FIG. 6 is a schematic diagram of an optical imaging lens of a first embodiment of the invention.

FIG. 6 is a schematic diagram of an optical imaging lens of a first embodiment of the invention. FIG. 7A to FIG. 7D are diagrams of longitudinal spherical aberrations and various aberrations of the optical imaging lens of the first embodiment. Referring to FIG. 6 at first, an optical imaging lens 10 of the first embodiment of the invention includes an aperture 0, a first lens element 1, a second lens element 2, a third lens element 3, a fourth lens element 4, a fifth lens element 5, a sixth lens element 6, a seventh lens element 7, an eighth lens element 8 and a filter 9 sequentially arranged along an optical axis I of the optical imaging lens 10 from an object side A1 to an image side A2. When rays emitted by an object to be photographed enter the optical imaging lens 10, and may form an image on an image plane 99 after passing through the aperture 0, the first lens element 1, the second lens element 2, the third lens element 3, the fourth lens element 4, the fifth lens element 5, the sixth lens element 6, the seventh lens element 7, the eighth lens element 8 and the filter 9. The filter 9 is arranged between the image-side surface 86 of the eighth lens element 8 and the image plane 99. It is supplemented that the object side A1 is a side facing the object to be photographed, and the image side A2 is a side facing the image plane 99. In the present embodiment, the filter 9 is an infrared ray (IR) cut filter.

In the present embodiment, the first lens element 1, the second lens element 2, the third lens element 3, the fourth lens element 4, the fifth lens element 5, the sixth lens element 6, the seventh lens element 7, the eighth lens element 8 and the filter 9 of the optical imaging lens 10 each has an object-side surface 15, 25, 35, 45, 55, 65, 75, 85, 95 facing the object side A1 and allowing imaging rays to pass through, and an image-side surface 16, 26, 36, 46, 56, 66, 76, 86, 96 facing the image side A2 and allowing the imaging rays to pass through. In the present embodiment, the first lens element 1 is arranged between the aperture 0 and the second lens element 2.

The first lens element 1 has positive refracting power. A material of the first lens element 1 is plastic. An optical axis region 151 of the object-side surface 15 of the first lens element 1 is convex, and a periphery region 153 thereof is convex. An optical axis region 161 of the image-side surface 16 of the first lens element 1 is concave, and a periphery region 163 thereof is concave. In the present embodiment, both the object-side surface 15 and the image-side surface 16 of the first lens element 1 are aspheric surfaces, but the invention is not limited thereto.

The second lens element 2 has negative refracting power. A material of the second lens element 2 is plastic. An optical axis region 251 of the object-side surface 25 of the second lens element 2 is convex, and a periphery region 253 thereof is convex. An optical axis region 261 of the image-side surface 26 of the second lens element 2 is concave, and a periphery region 263 thereof is concave. In the present embodiment, both the object-side surface 25 and the image-side surface 26 of the second lens element 2 are aspheric surfaces, but the invention is not limited thereto.

The third lens element 3 has positive refracting power. A material of the third lens element 3 is plastic. An optical axis region 351 of the object-side surface 35 of the third lens element 3 is convex, and a periphery region 353 thereof is convex. An optical axis region 361 of the image-side surface 36 of the third lens element 3 is concave, and a periphery region 363 thereof is concave. In the present embodiment, both the object-side surface 35 and the image-side surface 36 of the third lens element 3 are aspheric surfaces, but the invention is not limited thereto.

The fourth lens element 4 has positive refracting power. A material of the fourth lens element 4 is plastic. An optical axis region 451 of the object-side surface 45 of the fourth lens element 4 is concave, and a periphery region 453 thereof is concave. An optical axis region 461 of the image-side surface 46 of the fourth lens element 4 is convex, and a periphery region 463 thereof is convex. In the present embodiment, both the object-side surface 45 and the image-side surface 46 of the fourth lens element 4 are aspheric surfaces, but the invention is not limited thereto.

The fifth lens element 5 has negative refracting power. A material of the fifth lens element 5 is plastic. An optical axis region 551 of the object-side surface 55 of the fifth lens element 5 is convex, and a periphery region 553 thereof is concave. An optical axis region 561 of the image-side surface 56 of the fifth lens element 5 is concave, and a periphery region 563 thereof is convex. In the present embodiment, both the object-side surface 55 and the image-side surface 56 of the fifth lens element 5 are aspheric surfaces, but the invention is not limited thereto.

The sixth lens element 6 has negative refracting power. A material of the sixth lens element 6 is plastic. An optical axis region 651 of the object-side surface 65 of the sixth lens element 6 is convex, and a periphery region 653 thereof is concave. An optical axis region 661 of the image-side surface 66 of the sixth lens element 6 is concave, and a periphery region 663 thereof is convex. In the present embodiment, both the object-side surface 65 and the image-side surface 66 of the sixth lens element 6 are aspheric surfaces, but the invention is not limited thereto.

The seventh lens element 7 has positive refracting power. A material of the seventh lens element 7 is plastic. An optical axis region 751 of the object-side surface 75 of the seventh lens element 7 is convex, and a periphery region 753 thereof is concave. An optical axis region 761 of the image-side surface 76 of the seventh lens element 7 is convex, and a periphery region 763 thereof is convex. In the present embodiment, both the object-side surface 75 and the image-side surface 76 of the seventh lens element 7 are aspheric surfaces, but the invention is not limited thereto.

The eighth lens element 8 has negative refracting power. A material of the eighth lens element 8 is plastic. An optical axis region 851 of the object-side surface 85 of the eighth lens element 8 is concave, and a periphery region 853 thereof is concave. An optical axis region 861 of the image-side surface 86 of the eighth lens element 8 is concave, and a periphery region 863 thereof is convex. In the present embodiment, both the object-side surface 85 and the image-side surface 86 of the eighth lens element 8 are aspheric surfaces, but the invention is not limited thereto.

In the present embodiment, the lens elements of the optical imaging lens 10 are only the eight lens elements described above.

Other detailed optical data of the first embodiment is as shown in FIG. 8, and the optical imaging lens 10 of the first embodiment has an effective focal length (EFL) of 5.842 millimeters (mm), a half field of view (HFOV) of 40.428°, a system length of 7.559 mm, an F-number (Fno) of 1.650, and an image height of 5.800 mm. The system length is a distance from the object-side surface 15 of the first lens element 1 to the image plane 99 on the optical axis I.

In addition, in the present embodiment, a total of sixteen surfaces, including the object-side surfaces 15, 25, 35, 45, 55, 65, 75, 85 and the image-side surfaces 16, 26, 36, 46, 56, 66, 76, 86 of the first lens element 1, the second lens element 2, the third lens element 3, the fourth lens element 4, the fifth lens element 5, the sixth lens element 6, the seventh lens element 7 and the eighth lens element 8, are all aspheric surfaces, and the object-side surfaces 15, 25, 35, 45, 55, 65, 75, 85 and the image-side surfaces 16, 26, 36, 46, 56, 66, 76, 86 are common even asphere surfaces. These aspheric surfaces are defined according to the following formula (1):

$$Z(Y) = \frac{Y^2}{R} \bigg/ \left( 1 + \sqrt{1 - (1+K)\frac{Y^2}{R^2}} \right) + \sum_{i=1}^{n} a_{2i} \times Y^{2i}$$

where
R: a radius of curvature of a position, near the optical axis I, on a surface of the lens element;
Z: a depth of an aspheric surface (a perpendicular distance between a point, on the aspheric surface that is spaced by the distance Y from the optical axis and a tangent plane tangent to a vertex of the aspheric surface on the optical axis I);
Y: a perpendicular distance between a point on an aspheric curve and the optical axis I;
K: a conic constant;
$a_{2i}$: a $2i^{th}$-order aspheric coefficient.

Various aspheric coefficients of the object-side surface 15 of the first lens element 1 to the image-side surface 86 of the eighth lens element 8 in Formula (1) are as shown in FIG. 9. Column number 15 in FIG. 9 denotes an aspheric coefficient of the object-side surface 15 of the first lens element 1, and the rest columns may be deduced by analogy. In the present embodiment, the second-order aspheric coefficient $a_2$ of each aspheric surface is zero, so they are not listed in FIG. 9.

In addition, relations among all important parameters in the optical imaging lens 10 of the first embodiment are as shown in FIG. 50 and FIG. 51.
f1 is a focal length of the first lens element;
f2 is a focal length of the second lens element;
f3 is a focal length of the third lens element;
f4 is a focal length of the fourth lens element;
f5 is a focal length of the fifth lens element;
f6 is a focal length of the sixth lens element;
f7 is a focal length of the seventh lens element;
f8 is a focal length of the eighth lens element;
n1 is a refractive index of the first lens element;
n2 is a refractive index of the second lens element;
n3 is a refractive index of the third lens element;
n4 is a refractive index of the fourth lens element;
n5 is a refractive index of the fifth lens element;
n6 is a refractive index of the sixth lens element; and
n7 is a refractive index of the seventh lens element;
n8 is a refractive index of the eighth lens element;
V1 is an Abbe number of the first lens element;
V2 is an Abbe number of the second lens element;
V3 is an Abbe number of the third lens element;
V4 is an Abbe number of the fourth lens element;
V5 is an Abbe number of the fifth lens element;
V6 is an Abbe number of the sixth lens element;
V7 is an Abbe number of the seventh lens element;
V8 is an Abbe number of the eighth lens element;
T1 is a thickness of the first lens element on the optical axis;
T2 is a thickness of the second lens element on the optical axis;
T3 is a thickness of the third lens element on the optical axis;
T4 is a thickness of the fourth lens element on the optical axis;
T5 is a thickness of the fifth lens element on the optical axis;
T6 is a thickness of the sixth lens element on the optical axis;

T7 is a thickness of the seventh lens element on the optical axis;

T8 is a thickness of the eighth lens element on the optical axis;

G12 is an air gap between the first lens element and the second lens element on the optical axis;

G23 is an air gap between the second lens element and the third lens element on the optical axis;

G34 is an air gap between the third lens element and the fourth lens element on the optical axis;

G45 is an air gap between the fourth lens element and the fifth lens element on the optical axis;

G56 is an air gap between the fifth lens element and the sixth lens element on the optical axis;

G67 is an air gap between the sixth lens element and the seventh lens element on the optical axis;

G78 is an air gap between the seventh lens element and the eighth lens element on the optical axis;

G8F is an air gap between the eighth lens element and the filter on the optical axis;

TF is a thickness of the filter on the optical axis;

GFP is an air gap between the filter and the image plane on the optical axis;

AAG is a sum of the seven air gaps of the first lens element to the eighth lens element on the optical axis;

ALT is a sum of the thicknesses of the eight lens elements from the first lens element to the eighth lens element on the optical axis;

EFL is an effective focal length of the optical imaging lens;

BFL is a distance from the image-side surface of the eighth lens element to the image plane on the optical axis;

TTL is a distance from the object-side surface of the first lens element to the image plane on the optical axis;

TL is a distance from the object-side surface of the first lens element to the image-side surface of the eighth lens element on the optical axis;

HFOV is a half field of view of the optical imaging lens;

ImgH is an image height of the optical imaging lens; and

Fno is an F-number of the optical imaging lens.

Figures 7A, 7B, 7C, 7D:
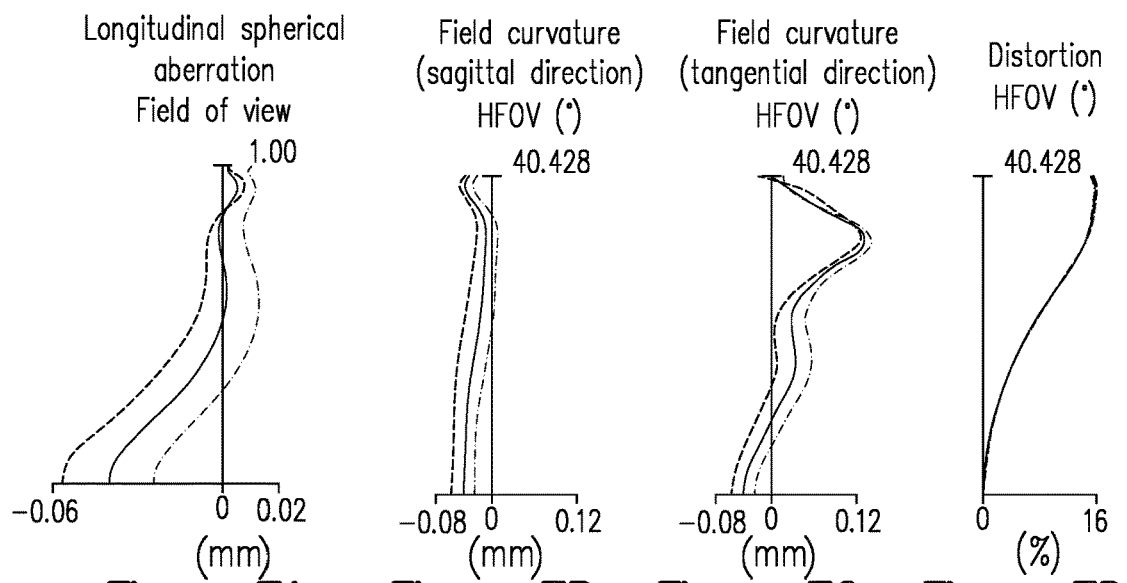
FIG. 7A to FIG. 7D are diagrams of longitudinal spherical aberrations and various aberrations of an optical imaging lens of a first embodiment.

Referring to FIG. 7A to FIG. 7D cooperatively, the diagram of FIG. 7A illustrates longitudinal spherical aberrations on the image plane 99 of the first embodiment at wavelengths of 470 nm, 555 nm and 650 nm; the diagrams of FIG. 7B and FIG. 7C respectively illustrate a field curvature aberration in a sagittal direction and a field curvature aberration in a tangential direction on the image plane 99 of the first embodiment at wavelengths of 470 nm, 555 nm and 650 nm; and the diagram of FIG. 7D illustrates a distortion aberration on the image plane 99 of the first embodiment at wavelengths of 470 nm, 555 nm and 650 nm. The longitudinal spherical aberration of the present first embodiment is as shown in FIG. 7A. A curve generated by each wavelength is very close, and is close to the center, which indicates that off-axis rays at different heights of each wavelength are concentrated near to an imaging point. It can be seen from the deflection amplitude of the curve of each wavelength that deflections of the imaging points of the off-axis rays at different heights are controlled within a range of ±0.06 mm, so that the first embodiment alleviates the spherical aberration of the same wavelength. In addition, distances between three representative wavelengths are quite close, it indicates that imaging positions of different wavelength rays are quite concentrated, so that the chromatic aberration is also alleviated.

In the two field curvature aberration diagrams of FIG. 7B and FIG. 7C, the focal length variables of three representative wavelengths within an entire field of view range fall within ±0.12 mm, it indicates that an optical system of the present first embodiment can effectively eliminate the aberration. The distortion aberration diagram of FIG. 7D shows that the distortion aberration of the present embodiment is maintained within a range of ±16%, it indicates that the distortion aberration of the present first embodiment has met an imaging quality requirement of the optical system. It is indicated accordingly that compared with an existing optical lens, the present first embodiment can still provide good imaging quality in the circumstances that the system length has been reduced to about 7.559 mm, so the present first embodiment can reduce the length of the lens and has good imaging quality under the condition of maintaining good optical properties.

Figure 10:
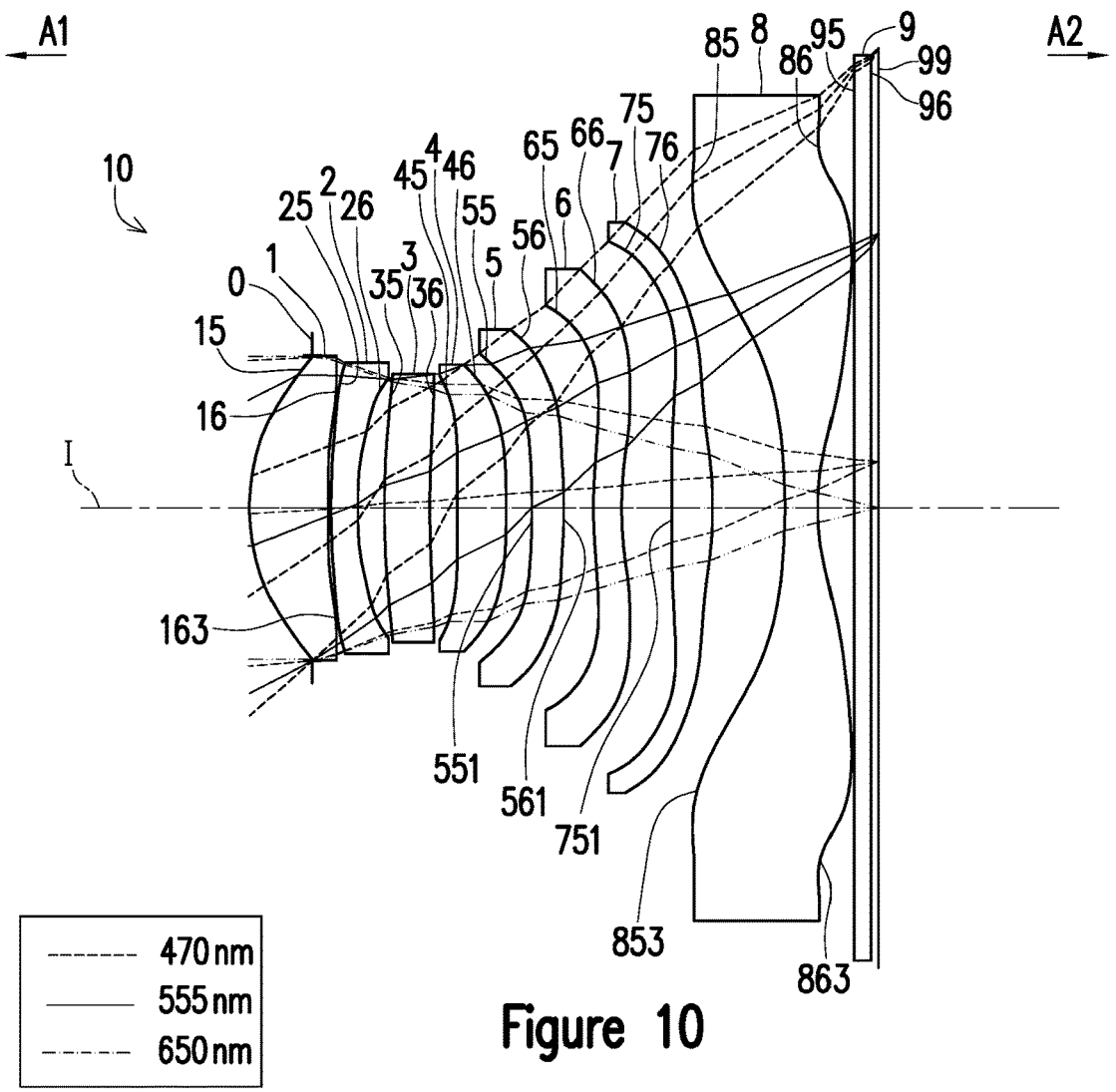
FIG. 10 is a schematic diagram of an optical imaging lens of a second embodiment of the invention.

FIG. 10 is a schematic diagram of an optical imaging lens of a second embodiment of the invention. FIG. 11A to FIG. 11D are diagrams of longitudinal spherical aberrations and various aberrations of the optical imaging lens of the second embodiment. Referring to FIG. 10 at first, the second embodiment of the optical imaging lens 10 of the invention is approximately similar to the first embodiment, except that: various optical data, aspheric coefficients, and parameters among these lens elements 1, 2, 3, 4, 5, 6, 7 and 8 are different more or less. In addition, in the present embodiment, the periphery region 163 of the image-side surface 16 of the first lens element 1 is convex; the optical axis region 551 of the object-side surface 55 of the fifth lens element 5 is concave; the optical axis region 561 of the image-side surface 56 of the fifth lens element 5 is convex; the optical axis region 751 of the object-side surface 75 of the seventh lens element 7 is concave; the periphery region 853 of the object-side surface 85 of the eighth lens element 8 is convex; and the periphery region 863 of the image-side surface 86 of the eighth lens element 8 is concave. It should be noted that in order to show the drawing clearly, numerals of the optical axis regions and the periphery regions which are similar to the surface shapes in the first embodiment are partially omitted in FIG. 10.

Detailed optical data of the optical imaging lens 10 of the second embodiment are as shown in FIG. 12, and the optical imaging lens 10 of the second embodiment has an EFL of 7.386 mm, an HFOV of 40.825°, a system length of 9.146 mm, an Fno of 1.650, and an image height of 6.700 mm.

As shown in FIG. 13, FIG. 13 illustrates various aspheric coefficients of the object-side surface 15 of the first lens element 1 to the image-side surface 86 of the eighth lens element 8 of the second embodiment in the formula (1).

In addition, relations among all important parameters in the optical imaging lens 10 of the second embodiment are as shown in FIG. 50 and FIG. 51.

Figures 11A, 11B, 11C, 11D:
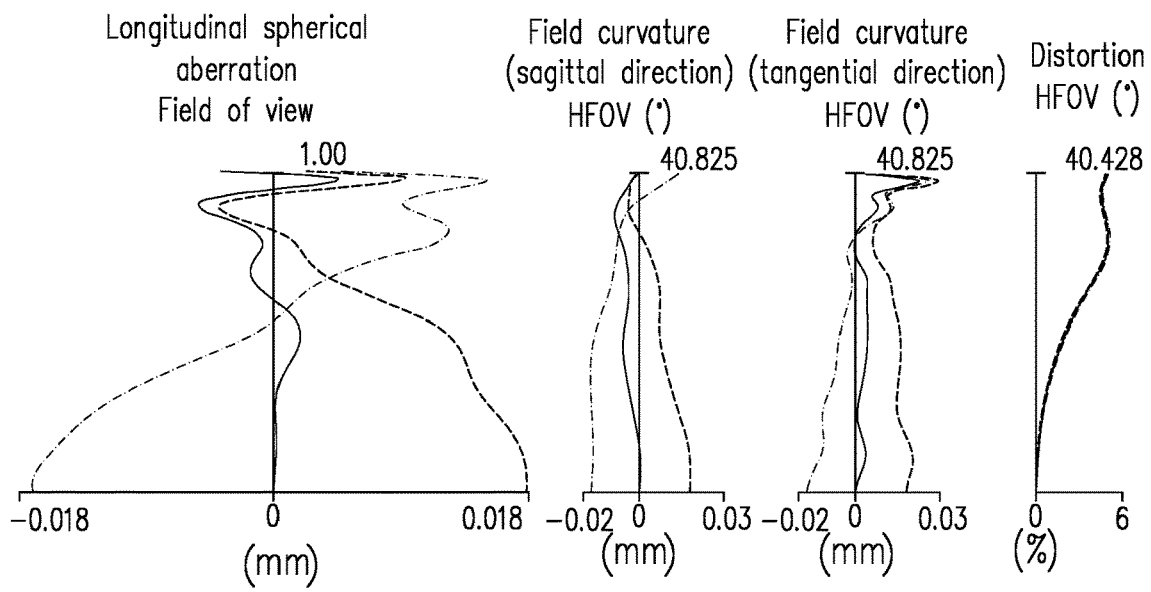
FIG. 11A to FIG. 11D are diagrams of longitudinal spherical aberrations and various aberrations of an optical imaging lens of a second embodiment.

A longitudinal spherical aberration of the present second embodiment is as shown in FIG. 11A, and deflections of imaging points of off-axis rays at different heights are controlled within a range of ±0.018 mm. In the two field curvature aberration diagrams of FIG. 11B and FIG. 11C, focal length variables of three representative wavelengths within an entire field of view range fall within ±0.03 mm. The distortion aberration diagram of FIG. 11D shows that the distortion aberration of the present embodiment is maintained within a range of ±6%.

It can be known via the above instructions that: the HFOV of the second embodiment is greater than the HFOV of the first embodiment. Therefore, compared to the first embodiment, the second embodiment has a larger angle range for receiving images. In addition, the longitudinal spherical aberration of the second embodiment is less than the longitudinal spherical aberration of the first embodiment; the field curvature aberration of the second embodiment is less than the field curvature aberration of the first embodiment; and the distortion aberration of the second embodiment is less than the distortion aberration of the first embodiment.

Figure 14:
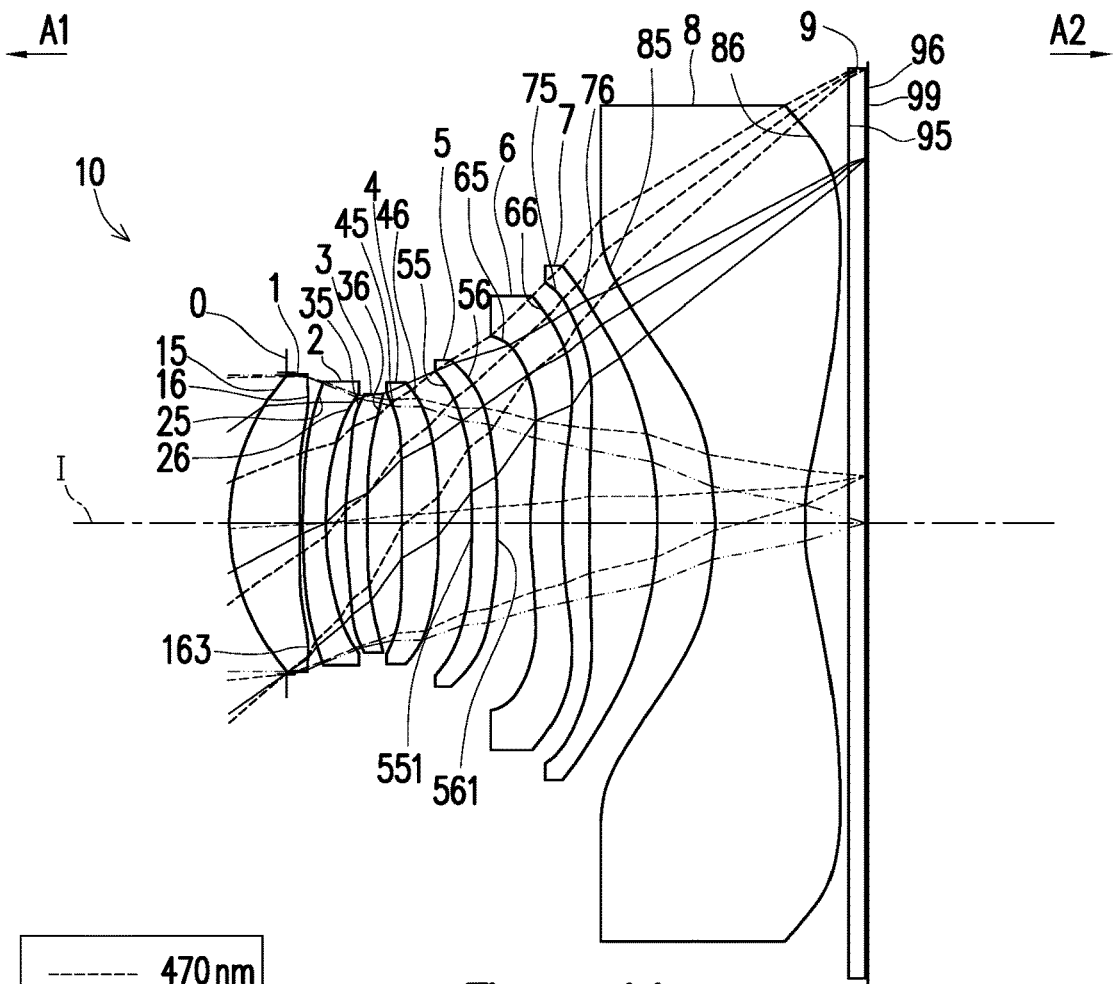
FIG. 14 is a schematic diagram of an optical imaging lens of a third embodiment of the invention.

FIG. 14 is a schematic diagram of an optical imaging lens of a third embodiment of the invention. FIG. 15A to FIG. 15D are diagrams of longitudinal spherical aberrations and various aberrations of the optical imaging lens of the third embodiment. Referring to FIG. 14 at first, the third embodiment of the optical imaging lens 10 of the invention is approximately similar to the first embodiment, except that: various optical data, aspheric coefficients, and parameters among these lens elements 1, 2, 3, 4, 5, 6, 7 and 8 are different more or less. In addition, in the present embodiment, the periphery region 163 of the image-side surface 16 of the first lens element 1 is convex; the optical axis region 551 of the object-side surface 55 of the fifth lens element 5 is concave; and the optical axis region 561 of the image-side surface 56 of the fifth lens element 5 is convex. It should be noted that in order to show the drawing clearly, numerals of the optical axis regions and the periphery regions which are similar to the surface shapes in the first embodiment are partially omitted in FIG. 14.

Detailed optical data of the optical imaging lens 10 of the third embodiment are as shown in FIG. 16, and the optical imaging lens 10 of the third embodiment has an EFL of 7.256 mm, an HFOV of 41.329°, a system length of 9.222 mm, an Fno of 1.650, and an image height of 6.700 mm.

As shown in FIG. 17, FIG. 17 illustrates various aspheric coefficients of the object-side surface 15 of the first lens element 1 to the image-side surface 86 of the eighth lens element 8 of the third embodiment in the formula (1).

In addition, relations among all important parameters in the optical imaging lens 10 of the third embodiment are as shown in FIG. 50 and FIG. 51.

Figures 15A, 15B, 15C, 15D:
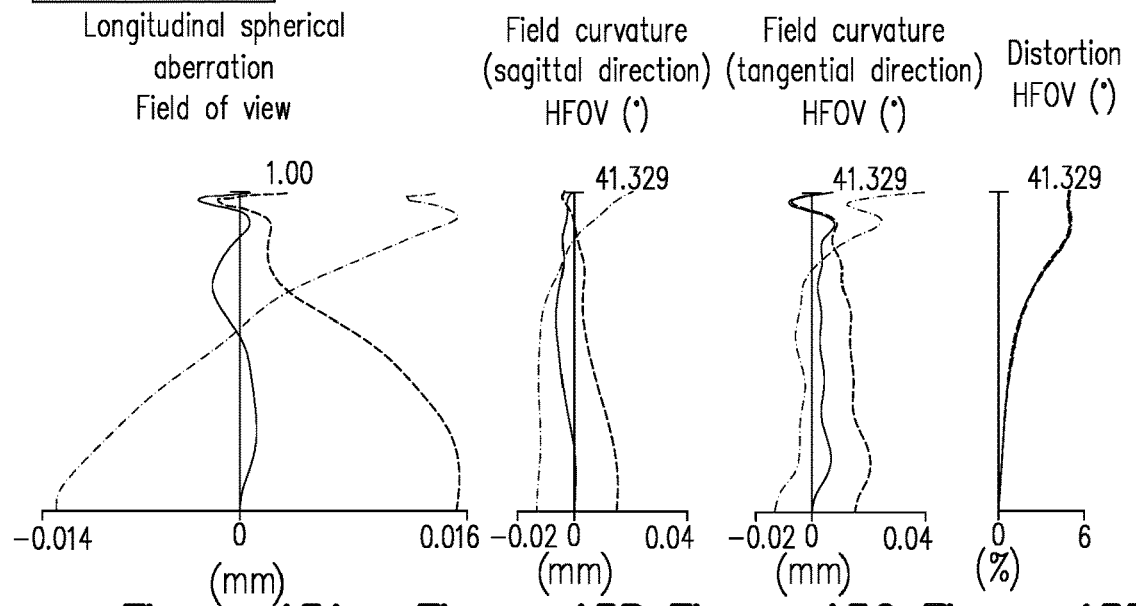
FIG. 15A to FIG. 15D are diagrams of longitudinal spherical aberrations and various aberrations of an optical imaging lens of a third embodiment.

A longitudinal spherical aberration of the present third embodiment is as shown in FIG. 15A, and deflections of imaging points of off-axis rays at different heights are controlled within a range of ±0.016 mm. In the two field curvature aberration diagrams of FIG. 15B and FIG. 15C, focal length variables of three representative wavelengths within an entire field of view range fall within ±0.04 mm. The distortion aberration diagram of FIG. 15D shows that the distortion aberration of the present embodiment is maintained within a range of ±6%.

It can be known via the above instructions that: the HFOV of the third embodiment is greater than the HFOV of the first embodiment. Therefore, compared to the first embodiment, the third embodiment has a larger angle range for receiving images. In addition, the longitudinal spherical aberration of the third embodiment is less than the longitudinal spherical aberration of the first embodiment; the field curvature aberration of the third embodiment is less than the field curvature aberration of the first embodiment; and the distortion aberration of the third embodiment is less than the distortion aberration of the first embodiment.

Figure 18:
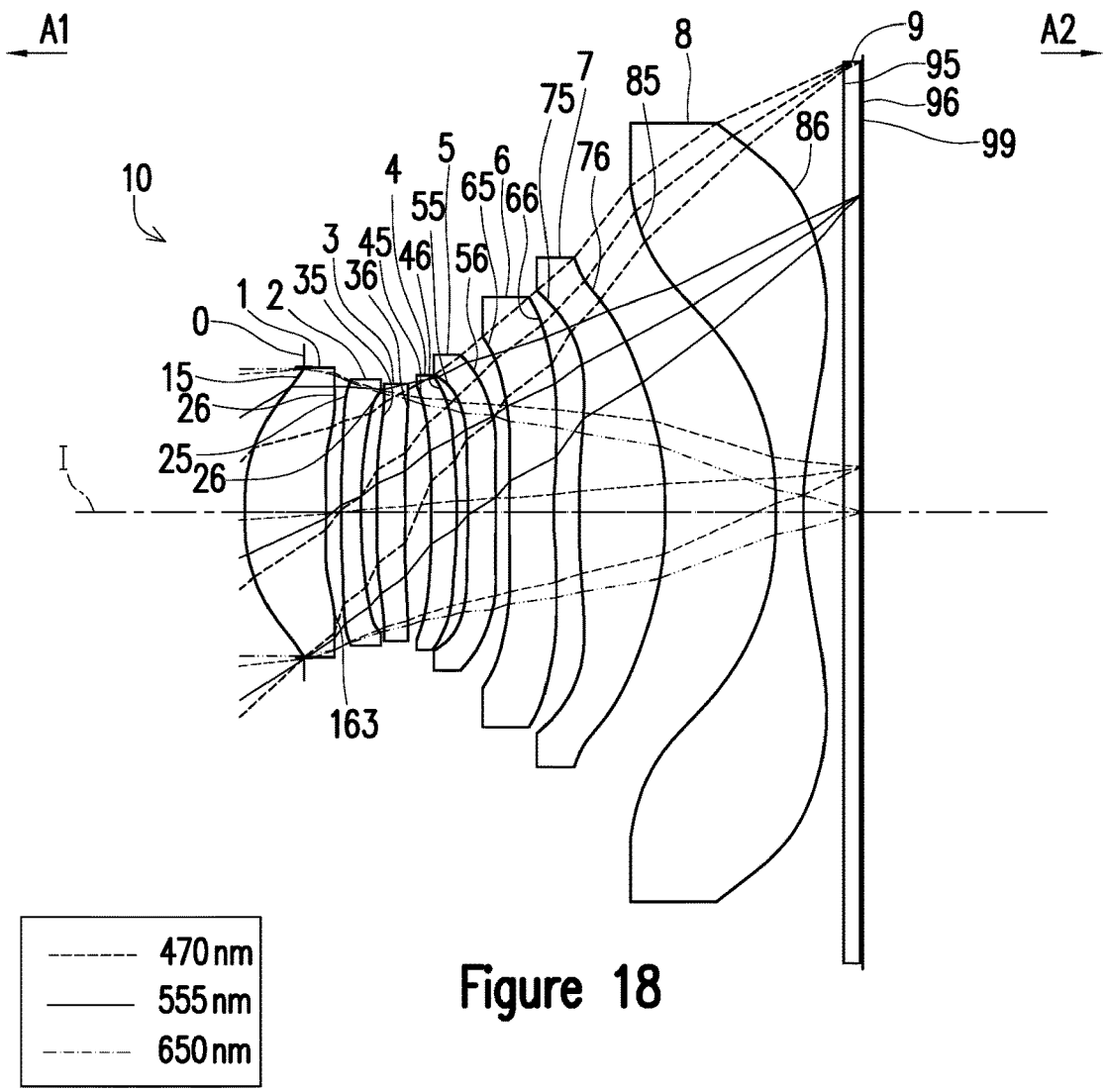
FIG. 18 is a schematic diagram of an optical imaging lens of a fourth embodiment of the invention.

FIG. 18 is a schematic diagram of an optical imaging lens of a fourth embodiment of the invention. FIG. 19A to FIG. 19D are diagrams of longitudinal spherical aberrations and various aberrations of the optical imaging lens of the fourth embodiment. Referring to FIG. 18 at first, the fourth embodiment of the optical imaging lens 10 of the invention is approximately similar to the first embodiment, except that: various optical data, aspheric coefficients, and parameters among these lens elements 1, 2, 3, 4, 5, 6, 7 and 8 are different more or less. In addition, in the present embodiment, the periphery region 163 of the image-side surface 16 of the first lens element 1 is convex, and the fourth lens element 4 has negative refracting power. It should be noted that in order to show the drawing clearly, numerals of the optical axis regions and the periphery regions which are similar to the surface shapes in the first embodiment are partially omitted in FIG. 18.

Detailed optical data of the optical imaging lens 10 of the fourth embodiment are as shown in FIG. 20, and the optical imaging lens 10 of the fourth embodiment has an EFL of 6.166 mm, an HFOV of 41.857°, a system length of 7.849 mm, an Fno of 1.650, and an image height of 5.800 mm.

As shown in FIG. 21, FIG. 21 illustrates various aspheric coefficients of the object-side surface 15 of the first lens element 1 to the image-side surface 86 of the eighth lens element 8 of the fourth embodiment in the formula (1).

In addition, relations among all important parameters in the optical imaging lens 10 of the fourth embodiment are as shown in FIG. 50 and FIG. 51.

Figures 19A, 19B, 19C, 19D:
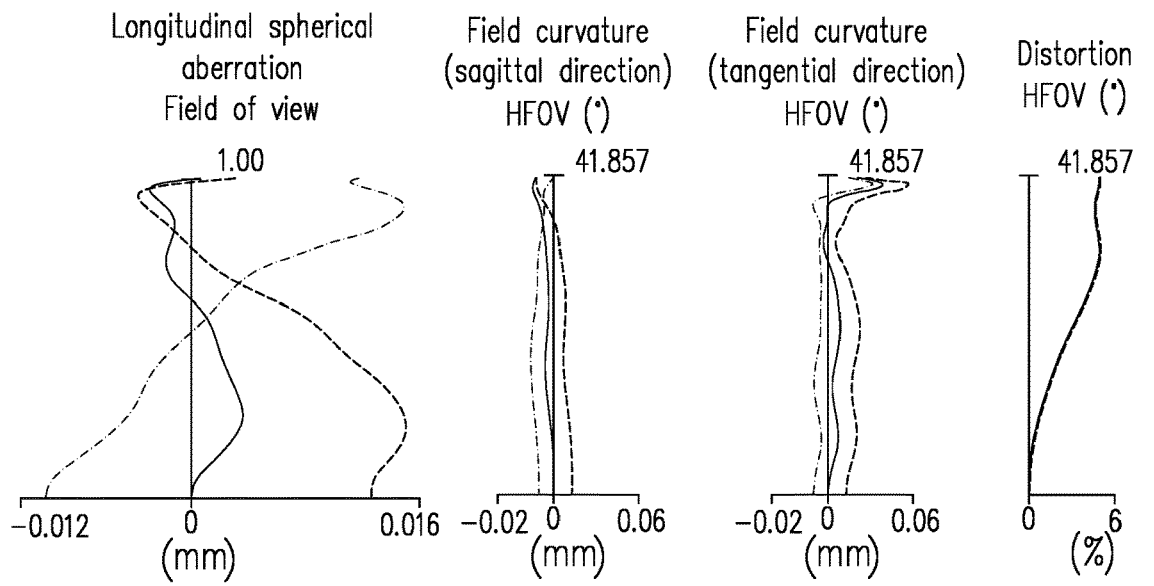
FIG. 19A to FIG. 19D are diagrams of longitudinal spherical aberrations and various aberrations of an optical imaging lens of a fourth embodiment.

A longitudinal spherical aberration of the present fourth embodiment is as shown in FIG. 19A, and deflections of imaging points of off-axis rays at different heights are controlled within a range of ±0.016 mm. In the two field curvature aberration diagrams of FIG. 19B and FIG. 19C, focal length variables of three representative wavelengths within an entire field of view range fall within ±0.06 mm. The distortion aberration diagram of FIG. 19D shows that the distortion aberration of the present embodiment is maintained within a range of ±6%.

It can be known via the above instructions that: the HFOV of the fourth embodiment is greater than the HFOV of the first embodiment. Therefore, compared to the first embodiment, the fourth embodiment has a larger angle range for receiving images. In addition, the longitudinal spherical aberration of the fourth embodiment is less than the longitudinal spherical aberration of the first embodiment; the field curvature aberration of the fourth embodiment is less than the field curvature aberration of the first embodiment; and the distortion aberration of the fourth embodiment is less than the distortion aberration of the first embodiment.

Figure 22:
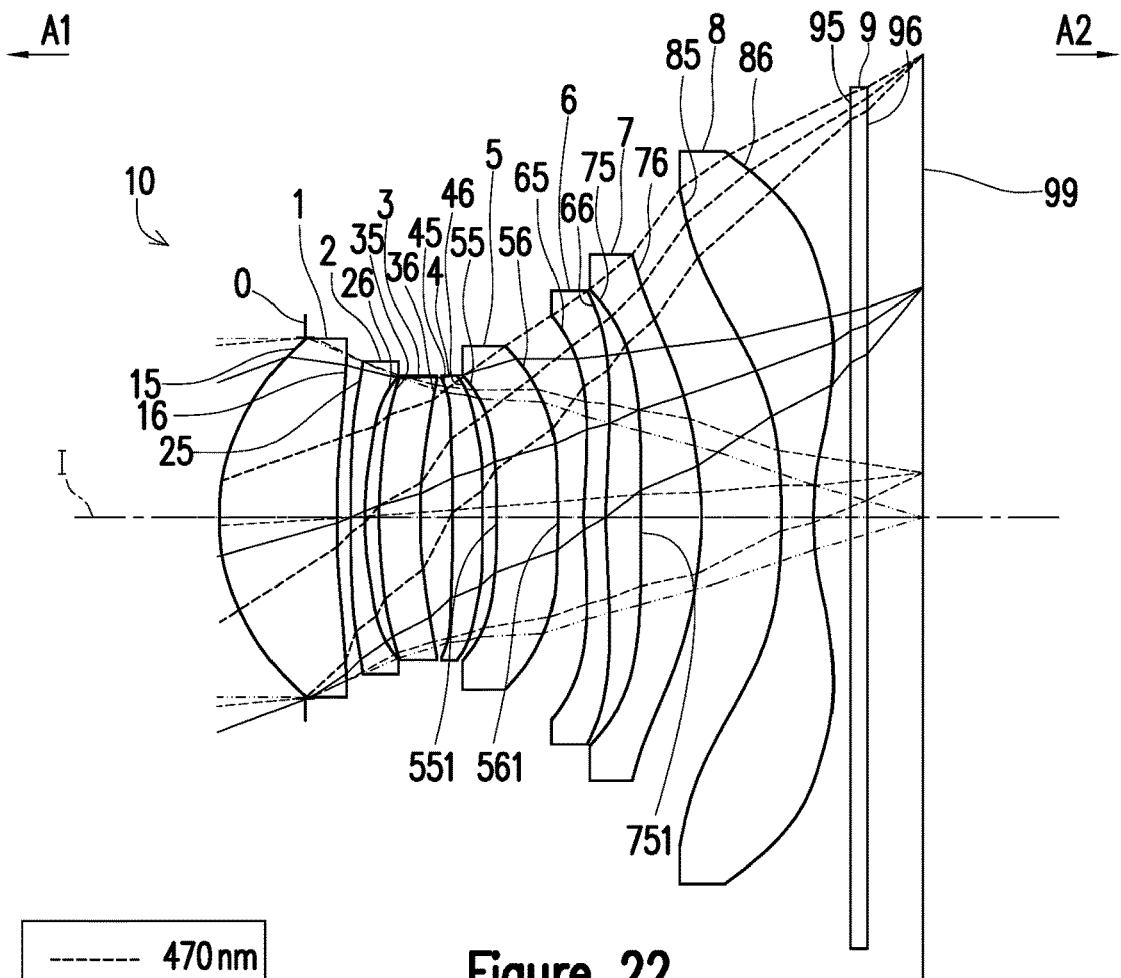
FIG. 22 is a schematic diagram of an optical imaging lens of a fifth embodiment of the invention.

FIG. 22 is a schematic diagram of an optical imaging lens of a fifth embodiment of the invention. FIG. 23A to FIG. 23D are diagrams of longitudinal spherical aberrations and various aberrations of the optical imaging lens of the fifth embodiment. Referring to FIG. 22 at first, the fifth embodiment of the optical imaging lens 10 of the invention is approximately similar to the first embodiment, except that: various optical data, aspheric coefficients, and parameters among these lens elements 1, 2, 3, 4, 5, 6, 7 and 8 are different more or less. In addition, in the present embodiment, the optical axis region 551 of the object-side surface 55 of the fifth lens element 5 is concave; the optical axis region 561 of the image-side surface 56 of the fifth lens element 5 is convex; and the optical axis region 751 of the object-side surface 75 of the seventh lens element 7 is concave. It should be noted that in order to show the drawing clearly, numerals of the optical axis regions and the periphery regions which are similar to the surface shapes in the first embodiment are partially omitted in FIG. 22.

Detailed optical data of the optical imaging lens 10 of the fifth embodiment are as shown in FIG. 24, and the optical imaging lens 10 of the fifth embodiment has an EFL of 8.678 mm, an HFOV of 36.326°, a system length of 10.203 mm, an Fno of 1.650, and an image height of 6.700 mm.

As shown in FIG. 25, FIG. 25 illustrates various aspheric coefficients of the object-side surface 15 of the first lens element 1 to the image-side surface 86 of the eighth lens element 8 of the fifth embodiment in the formula (1).

In addition, relations among all important parameters in the optical imaging lens 10 of the fifth embodiment are as shown in FIG. 50 and FIG. 51.

Figures 23A, 23B, 23C, 23D:
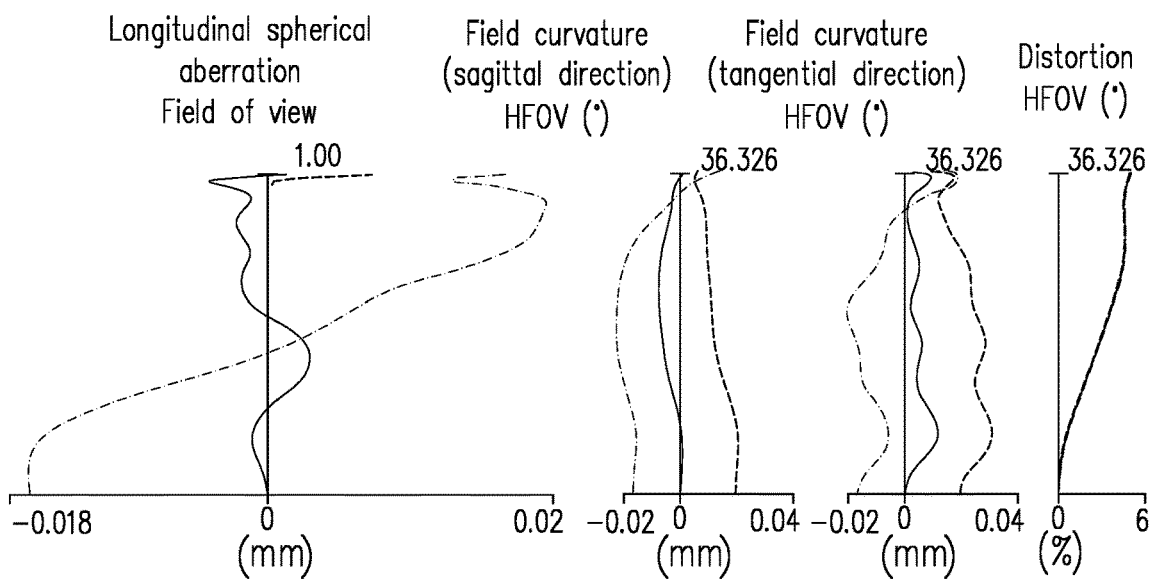
FIG. 23A to FIG. 23D are diagrams of longitudinal spherical aberrations and various aberrations of an optical imaging lens of a fifth embodiment.

A longitudinal spherical aberration of the present fifth embodiment is as shown in FIG. 23A, and deflections of imaging points of off-axis rays at different heights are controlled within a range of ±0.02 mm. In the two field curvature aberration diagrams of FIG. 23B and FIG. 23C, focal length variables of three representative wavelengths within an entire field of view range fall within ±0.04 mm. The distortion aberration diagram of FIG. 23D shows that the distortion aberration of the present embodiment is maintained within a range of ±6%.

It can be known via the above instructions that: the longitudinal spherical aberration of the fifth embodiment is less than the longitudinal spherical aberration of the first embodiment; the field curvature aberration of the fifth embodiment is less than the field curvature aberration of the first embodiment; and the distortion aberration of the fifth embodiment is less than the distortion aberration of the first embodiment.

Figure 26:
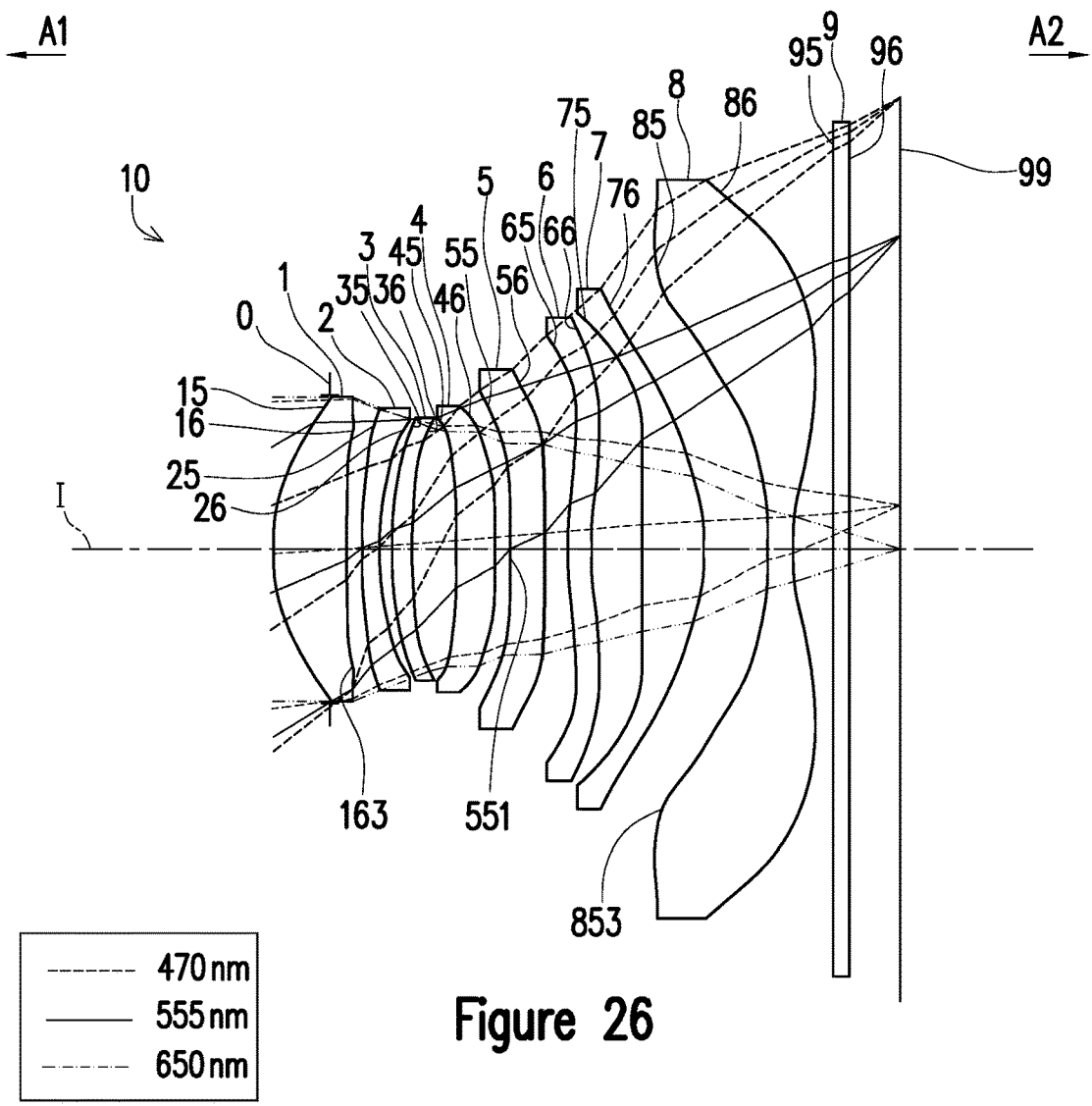
FIG. 26 is a schematic diagram of an optical imaging lens of a sixth embodiment of the invention.

FIG. 26 is a schematic diagram of an optical imaging lens of a sixth embodiment of the invention. FIG. 27A to FIG. 27D are diagrams of longitudinal spherical aberrations and various aberrations of the optical imaging lens of the sixth embodiment. Referring to FIG. 26 at first, the sixth embodiment of the optical imaging lens 10 of the invention is approximately similar to the first embodiment, except that: various optical data, aspheric coefficients, and parameters among these lens elements 1, 2, 3, 4, 5, 6, 7 and 8 are different more or less. In addition, in the present embodiment, the periphery region 163 of the image-side surface 16 of the first lens element 1 is convex; the optical axis region 551 of the object-side surface 55 of the fifth lens element 5 is concave; the sixth lens element has positive refracting power; and the periphery region 853 of the object-side surface 85 of the eighth lens element 8 is convex. It should be noted that in order to show the drawing clearly, numerals of the optical axis regions and the periphery regions which are similar to the surface shapes in the first embodiment are partially omitted in FIG. 26.

Detailed optical data of the optical imaging lens 10 of the sixth embodiment are as shown in FIG. 28, and the optical imaging lens 10 of the sixth embodiment has an EFL of 7.580 mm, an HFOV of 40.526°, a system length of 9.326 mm, an Fno of 1.650, and an image height of 6.700 mm.

As shown in FIG. 29, FIG. 29 illustrates various aspheric coefficients of the object-side surface 15 of the first lens element 1 to the image-side surface 86 of the eighth lens element 8 of the sixth embodiment in the formula (1).

In addition, relations among all important parameters in the optical imaging lens 10 of the sixth embodiment are as shown in FIG. 50 and FIG. 51.

Figures 27A, 27B, 27C, 27D:
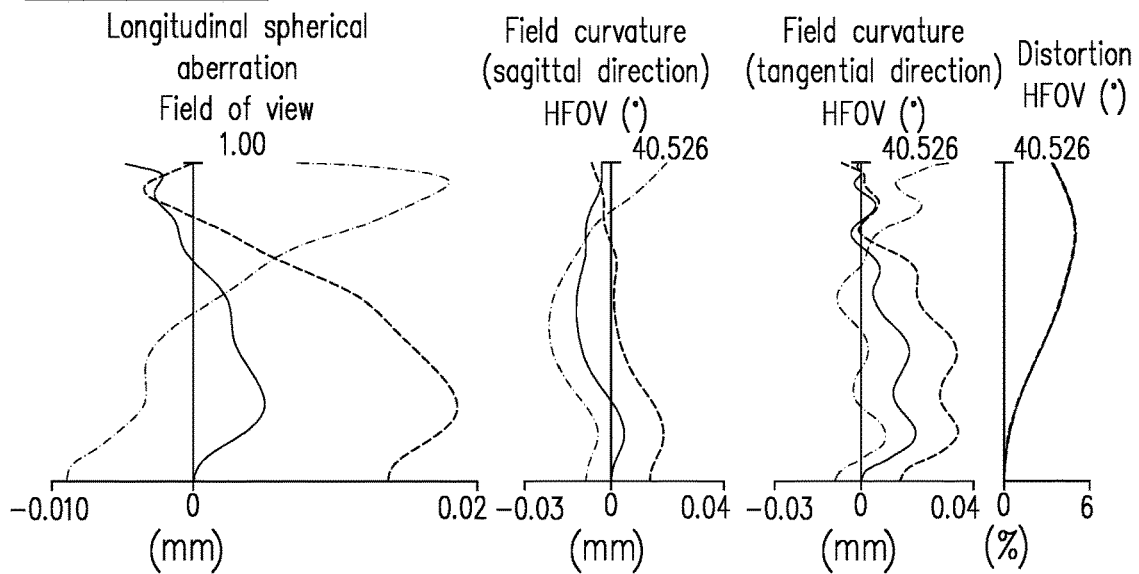
FIG. 27A to FIG. 27D are diagrams of longitudinal spherical aberrations and various aberrations of an optical imaging lens of a sixth embodiment.

A longitudinal spherical aberration of the present sixth embodiment is as shown in FIG. 27A, and deflections of imaging points of off-axis rays at different heights are controlled within a range of ±0.02 mm. In the two field curvature aberration diagrams of FIG. 27B and FIG. 27C, focal length variables of three representative wavelengths within an entire field of view range fall within ±0.04 mm. The distortion aberration diagram of FIG. 27D shows that the distortion aberration of the present embodiment is maintained within a range of ±6%.

It can be known via the above instructions that: the HFOV of the sixth embodiment is greater than the HFOV of the first embodiment. Therefore, compared to the first embodiment, the sixth embodiment has a larger angle range for receiving images. In addition, the longitudinal spherical aberration of the sixth embodiment is less than the longitudinal spherical aberration of the first embodiment; the field curvature aberration of the sixth embodiment is less than the field curvature aberration of the first embodiment; and the distortion aberration of the sixth embodiment is less than the distortion aberration of the first embodiment.

Figure 30:
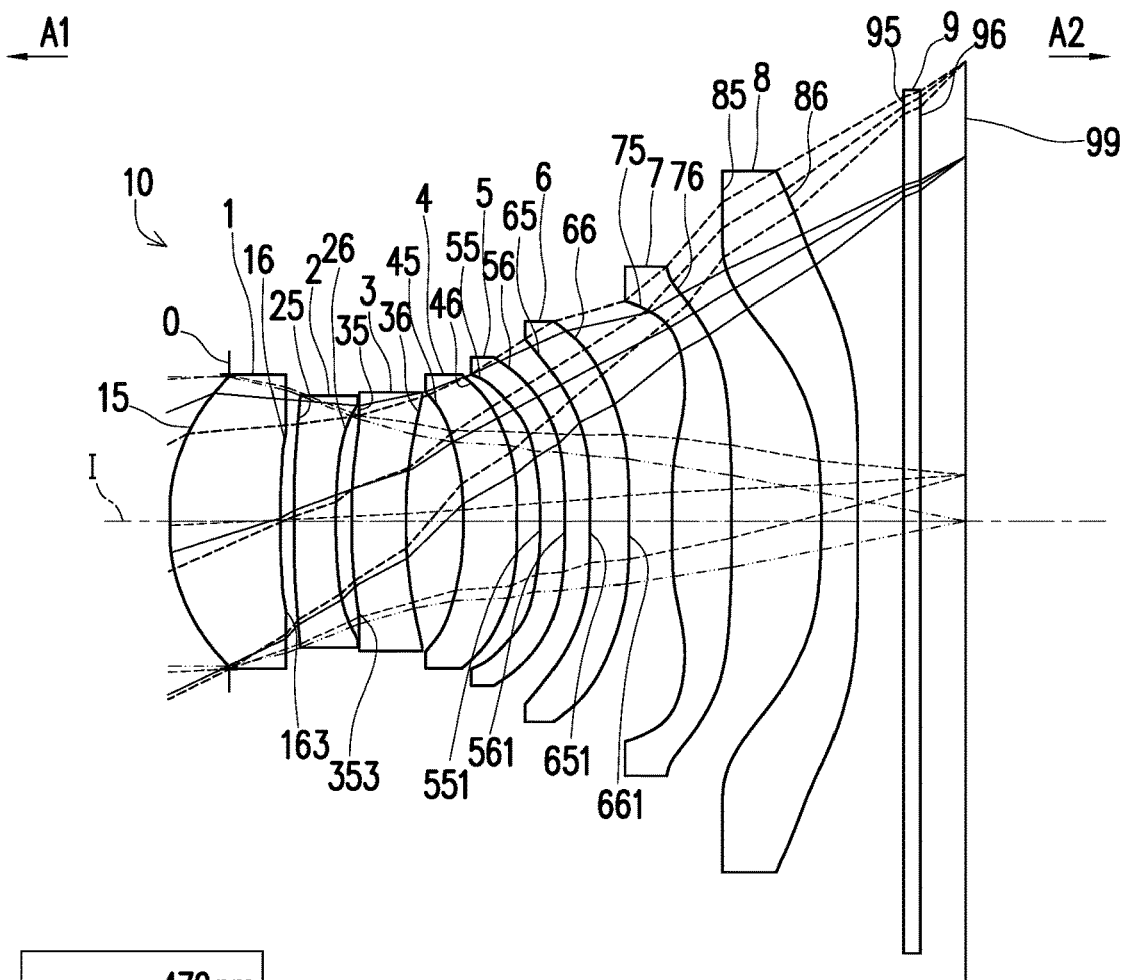
FIG. 30 is a schematic diagram of an optical imaging lens of a seventh embodiment of the invention.

FIG. 30 is a schematic diagram of an optical imaging lens of a seventh embodiment of the invention. FIG. 31A to FIG. 31D are diagrams of longitudinal spherical aberrations and various aberrations of the optical imaging lens of the seventh embodiment. Referring to FIG. 30 at first, the seventh embodiment of the optical imaging lens 10 of the invention is approximately similar to the first embodiment, except that: various optical data, aspheric coefficients, and parameters among these lens elements 1, 2, 3, 4, 5, 6, 7 and 8 are different more or less. In addition, in the present embodiment, the periphery region 163 of the image-side surface 16 of the first lens element 1 is convex; the periphery region 353 of the object-side surface 35 of the third lens element 3 is concave; the fourth lens element 4 has negative refracting power; the optical axis region 551 of the object-side surface 55 of the fifth lens element 5 is concave; the optical axis region 561 of the image-side surface 56 of the fifth lens element 5 is convex; the optical axis region 651 of the object-side surface 65 of the sixth lens element 6 is concave; and the optical axis region 661 of the image-side surface 66 of the sixth lens element 6 is convex. It should be noted that in order to show the drawing clearly, numerals of the optical axis regions and the periphery regions which are similar to the surface shapes in the first embodiment are partially omitted in FIG. 30.

Detailed optical data of the optical imaging lens 10 of the seventh embodiment are as shown in FIG. 32, and the optical imaging lens 10 of the seventh embodiment has an EFL of 6.182 mm, an HFOV of 26.392°, a system length of 10.049 mm, an Fno of 1.650, and an image height of 5.800 mm.

As shown in FIG. 33, FIG. 33 illustrates various aspheric coefficients of the object-side surface 15 of the first lens element 1 to the image-side surface 86 of the eighth lens element 8 of the seventh embodiment in the formula (1).

In addition, relations among all important parameters in the optical imaging lens 10 of the seventh embodiment are as shown in FIG. 52 and FIG. 53.

Figures 31A, 31B, 31C, 31D:
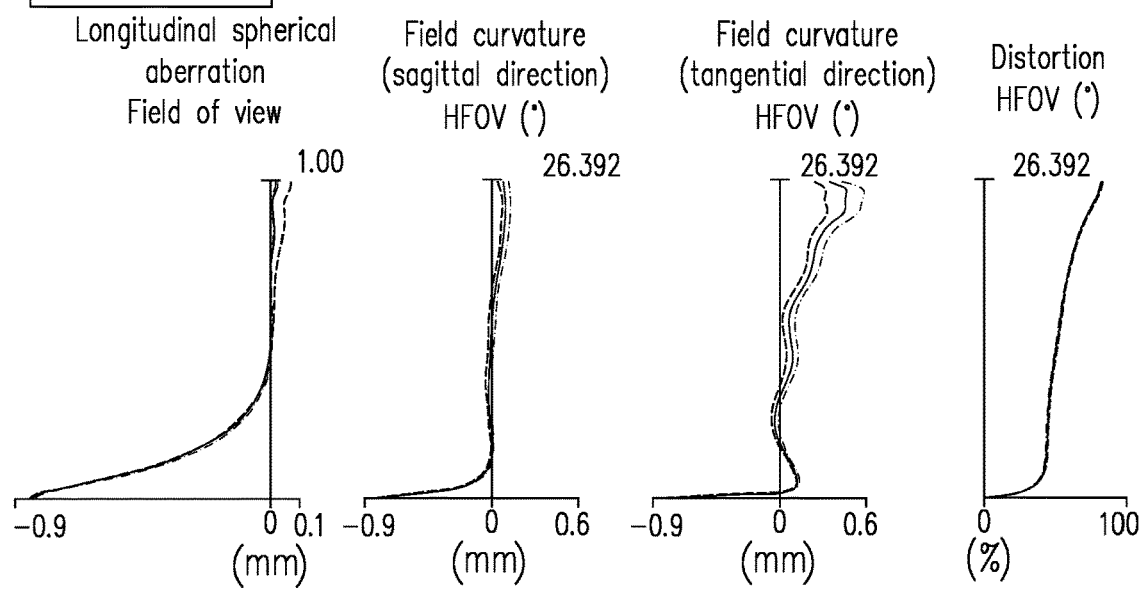
FIG. 31A to FIG. 31D are diagrams of longitudinal spherical aberrations and various aberrations of an optical imaging lens of a seventh embodiment.

A longitudinal spherical aberration of the present seventh embodiment is as shown in FIG. 31A, and deflections of imaging points of off-axis rays at different heights are controlled within a range of ±0.9 mm. In the two field curvature aberration diagrams of FIG. 31B and FIG. 31C, focal length variables of three representative wavelengths within an entire field of view range fall within ±0.9 mm. The distortion aberration diagram of FIG. 31D shows that the distortion aberration of the present embodiment is maintained within a range of ±90%.

It can be known from the above instructions that: the seventh embodiment is easy to fabricate, so that the yield is relatively high.

Figure 34:
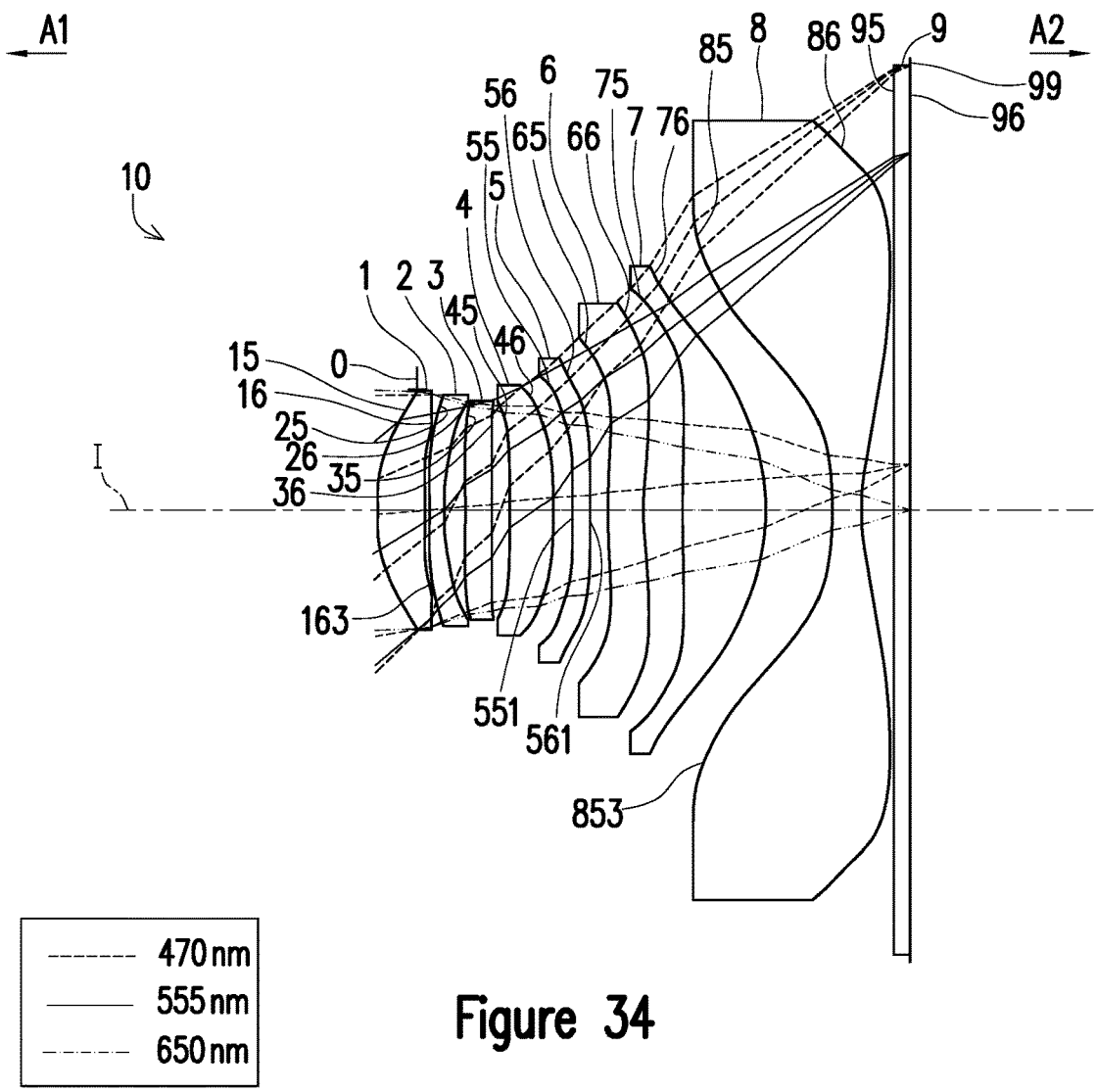
FIG. 34 is a schematic diagram of an optical imaging lens of an eighth embodiment of the invention.

FIG. 34 is a schematic diagram of an optical imaging lens of an eighth embodiment of the invention. FIG. 35A to FIG. 35D are diagrams of longitudinal spherical aberrations and various aberrations of the optical imaging lens of the eighth embodiment. Referring to FIG. 34 at first, the eighth embodiment of the optical imaging lens 10 of the invention is approximately similar to the first embodiment, except that: various optical data, aspheric coefficients, and parameters among these lens elements 1, 2, 3, 4, 5, 6, 7 and 8 are different more or less. In addition, in the present embodiment, the periphery region 163 of the image-side surface 16 of the first lens element 1 is convex; the optical axis region 551 of the object-side surface 55 of the fifth lens element 5 is concave; the optical axis region 561 of the image-side surface 56 of the fifth lens element 5 is convex; and the periphery region 853 of the object-side surface 85 of the eighth lens element 8 is convex. It should be noted that in order to show the drawing clearly, numerals of the optical axis regions and the periphery regions which are similar to the surface shapes in the first embodiment are partially omitted in FIG. 34.

Detailed optical data of the optical imaging lens 10 of the eighth embodiment are as shown in FIG. 36, and the optical imaging lens 10 of the eighth embodiment has an EFL of 5.913 mm, an HFOV of 47.182°, a system length of 7.978 mm, an Fno of 1.650, and an image height of 6.700 mm.

As shown in FIG. 37, FIG. 37 illustrates various aspheric coefficients of the object-side surface 15 of the first lens element 1 to the image-side surface 86 of the eighth lens element 8 of the eighth embodiment in the formula (1).

In addition, relations among all important parameters in the optical imaging lens 10 of the eighth embodiment are as shown in FIG. 52 and FIG. 53.

Figure 35A:
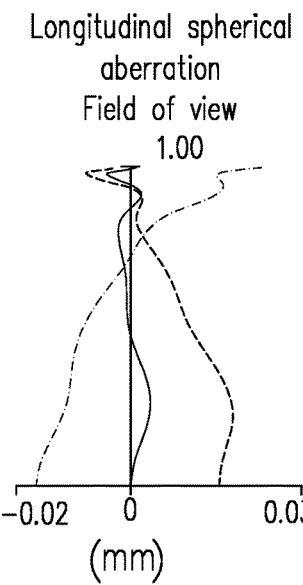
FIG. 35A to FIG. 35D are diagrams of longitudinal spherical aberrations and various aberrations of an optical imaging lens of an eighth embodiment.
Figure 35B:
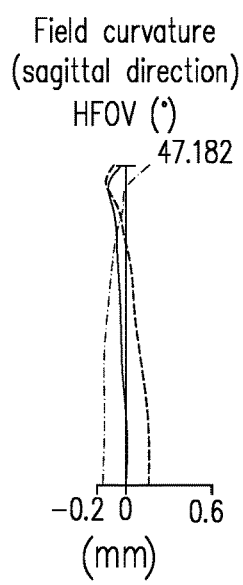
Figure 35C:
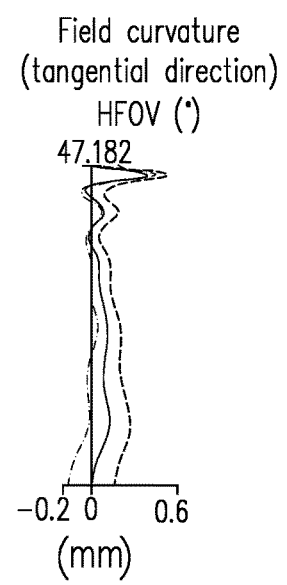
Figure 35D:
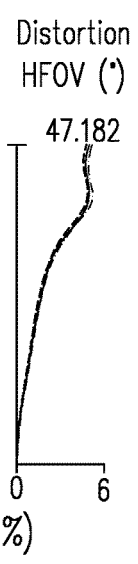

A longitudinal spherical aberration of the present eighth embodiment is as shown in FIG. 35A, and deflections of imaging points of off-axis rays at different heights are controlled within a range of ±0.03 mm. In the two field curvature aberration diagrams of FIG. 35B and FIG. 35C, focal length variables of three representative wavelengths within an entire field of view range fall within ±0.6 mm. The distortion aberration diagram of FIG. 35D shows that the distortion aberration of the present embodiment is maintained within a range of ±6%.

It can be known via the above instructions that: the system length of the eighth embodiment is shorter than the system length of the first embodiment, and the HFOV of the eighth embodiment is greater than the HFOV of the first embodiment. Therefore, compared to the first embodiment, the eighth embodiment has a smaller volume and a larger angle range for receiving images. In addition, the longitudinal spherical aberration of the eighth embodiment is less than the longitudinal spherical aberration of the first embodiment, and the distortion aberration of the eighth embodiment is less than the distortion aberration of the first embodiment.

FIG. 38 is a schematic diagram of an optical imaging lens of a ninth embodiment of the invention. FIG. 39A to FIG. 39D are diagrams of longitudinal spherical aberrations and various aberrations of the optical imaging lens of the ninth embodiment. Referring to FIG. 38 at first, the ninth embodiment of the optical imaging lens 10 of the invention is approximately similar to the first embodiment, except that: various optical data, aspheric coefficients, and parameters among these lens elements 1, 2, 3, 4, 5, 6, 7 and 8 are different more or less. In addition, in the present embodiment, the periphery region 163 of the image-side surface 16 of the first lens element 1 is convex, and the fourth lens element 4 has negative refracting power. It should be noted that in order to show the drawing clearly, numerals of the optical axis regions and the periphery regions which are similar to the surface shapes in the first embodiment are partially omitted in FIG. 38.

Detailed optical data of the optical imaging lens 10 of the ninth embodiment are as shown in FIG. 40, and the optical imaging lens 10 of the ninth embodiment has an EFL of 6.244 mm, an HFOV of 41.499°, a system length of 7.799 mm, an Fno of 1.650, and an image height of 5.800 mm.

As shown in FIG. 41, FIG. 41 illustrates various aspheric coefficients of the object-side surface 15 of the first lens element 1 to the image-side surface 86 of the eighth lens element 8 of the ninth embodiment in the formula (1).

In addition, relations among all important parameters in the optical imaging lens 10 of the ninth embodiment are as shown in FIG. 52 and FIG. 53.

A longitudinal spherical aberration of the present ninth embodiment is as shown in FIG. 39A, and deflections of imaging points of off-axis rays at different heights are controlled within a range of ±0.018 mm. In the two field curvature aberration diagrams of FIG. 39B and FIG. 39C, focal length variables of three representative wavelengths within an entire field of view range fall within ±0.06 mm. The distortion aberration diagram of FIG. 39D shows that the distortion aberration of the present embodiment is maintained within a range of ±5%.

It can be known via the above instructions that: the HFOV of the ninth embodiment is greater than the HFOV of the first embodiment. Therefore, compared to the first embodiment, the ninth embodiment has a larger angle range for receiving images. In addition, the longitudinal spherical aberration of the ninth embodiment is less than the longitudinal spherical aberration of the first embodiment; the field curvature aberration of the ninth embodiment is less than the field curvature aberration of the first embodiment; and the distortion aberration of the ninth embodiment is less than the distortion aberration of the first embodiment.

Figure 42:
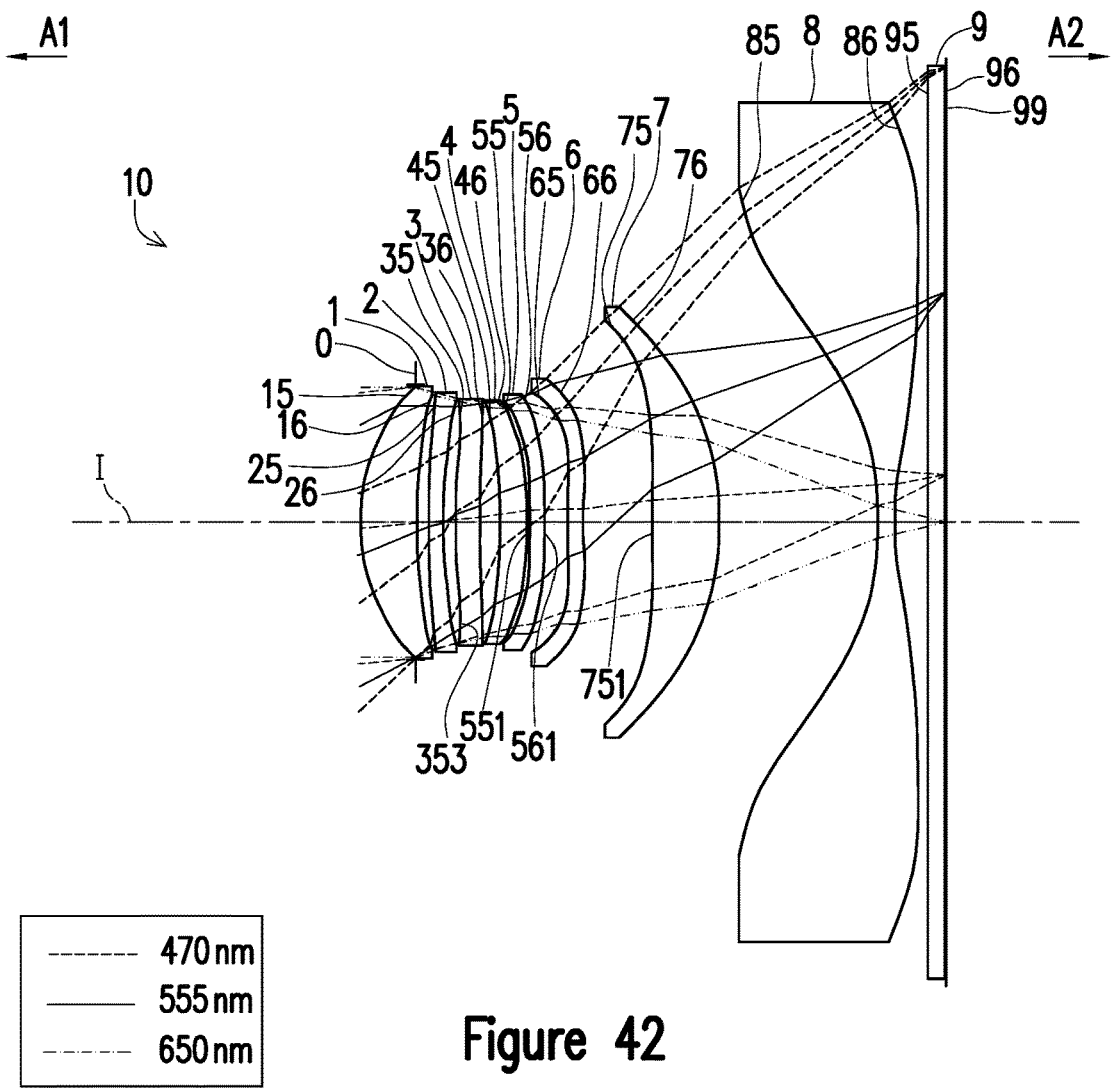
FIG. 42 is a schematic diagram of an optical imaging lens of a tenth embodiment of the invention.

FIG. 42 is a schematic diagram of an optical imaging lens of a tenth embodiment of the invention. FIG. 43A to FIG. 43D are diagrams of longitudinal spherical aberrations and various aberrations of the optical imaging lens of the tenth embodiment. Referring to FIG. 42 at first, the tenth embodiment of the optical imaging lens 10 of the invention is approximately similar to the first embodiment, except that: various optical data, aspheric coefficients, and parameters among these lens elements 1, 2, 3, 4, 5, 6, 7 and 8 are different more or less. In addition, in the present embodiment, the periphery region 353 of the object-side surface 35 of the third lens element 3 is concave; the optical axis region 551 of the object-side surface 55 of the fifth lens element 5 is concave; the optical axis region 561 of the image-side surface 56 of the fifth lens element 5 is convex; and the optical axis region 751 of the object-side surface 75 of the seventh lens element 7 is concave. It should be noted that in order to show the drawing clearly, numerals of the optical axis regions and the periphery regions which are similar to the surface shapes in the first embodiment are partially omitted in FIG. 42.

Detailed optical data of the optical imaging lens 10 of the tenth embodiment are as shown in FIG. 44, and the optical imaging lens 10 of the tenth embodiment has an EFL of 6.563 mm, an HFOV of 44.193°, a system length of 8.530 mm, an Fno of 1.650, and an image height of 6.700 mm.

As shown in FIG. 45, FIG. 45 illustrates various aspheric coefficients of the object-side surface 15 of the first lens element 1 to the image-side surface 86 of the eighth lens element 8 of the tenth embodiment in the formula (1).

In addition, relations among all important parameters in the optical imaging lens 10 of the tenth embodiment are as shown in FIG. 52 and FIG. 53.

Figures 43A, 43B, 43C, 43D:
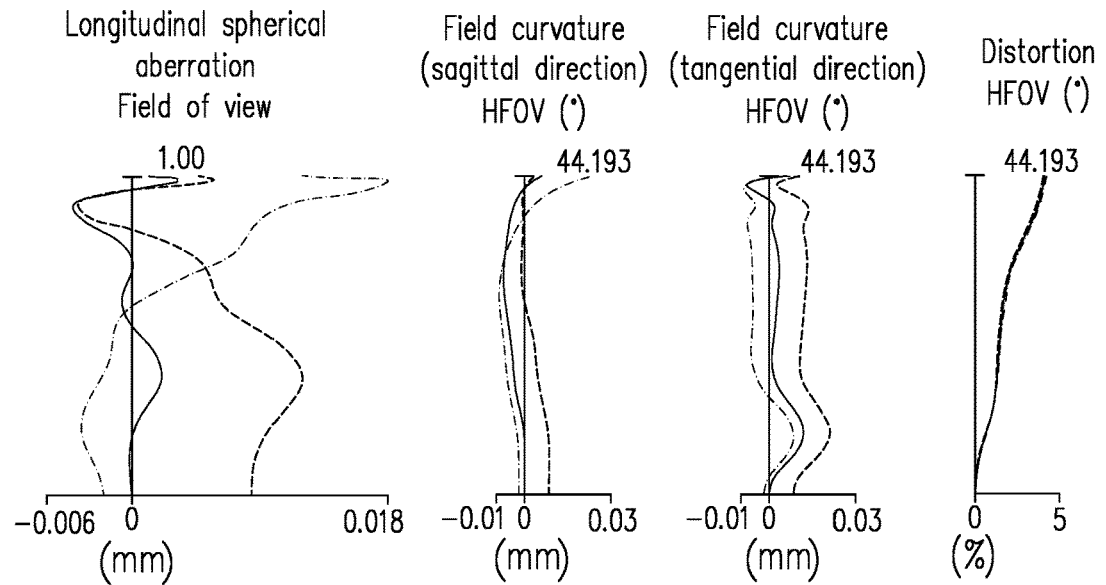
FIG. 43A to FIG. 43D are diagrams of longitudinal spherical aberrations and various aberrations of an optical imaging lens of a tenth embodiment.

A longitudinal spherical aberration of the present tenth embodiment is as shown in FIG. 43A, and deflections of imaging points of off-axis rays at different heights are controlled within a range of ±0.018 mm. In the two field curvature aberration diagrams of FIG. 43B and FIG. 43C, focal length variables of three representative wavelengths within an entire field of view range fall within ±0.06 mm. The distortion aberration diagram of FIG. 43D shows that the distortion aberration of the present embodiment is maintained within a range of ±5%.

It can be known via the above instructions that: the HFOV of the tenth embodiment is greater than the HFOV of the first embodiment. Therefore, compared to the first embodiment, the tenth embodiment has a larger angle range for receiving images. In addition, the longitudinal spherical aberration of the tenth embodiment is less than the longitudinal spherical aberration of the first embodiment; the field curvature aberration of the tenth embodiment is less than the field curvature aberration of the first embodiment; and the distortion aberration of the tenth embodiment is less than the distortion aberration of the first embodiment.

Figure 46:
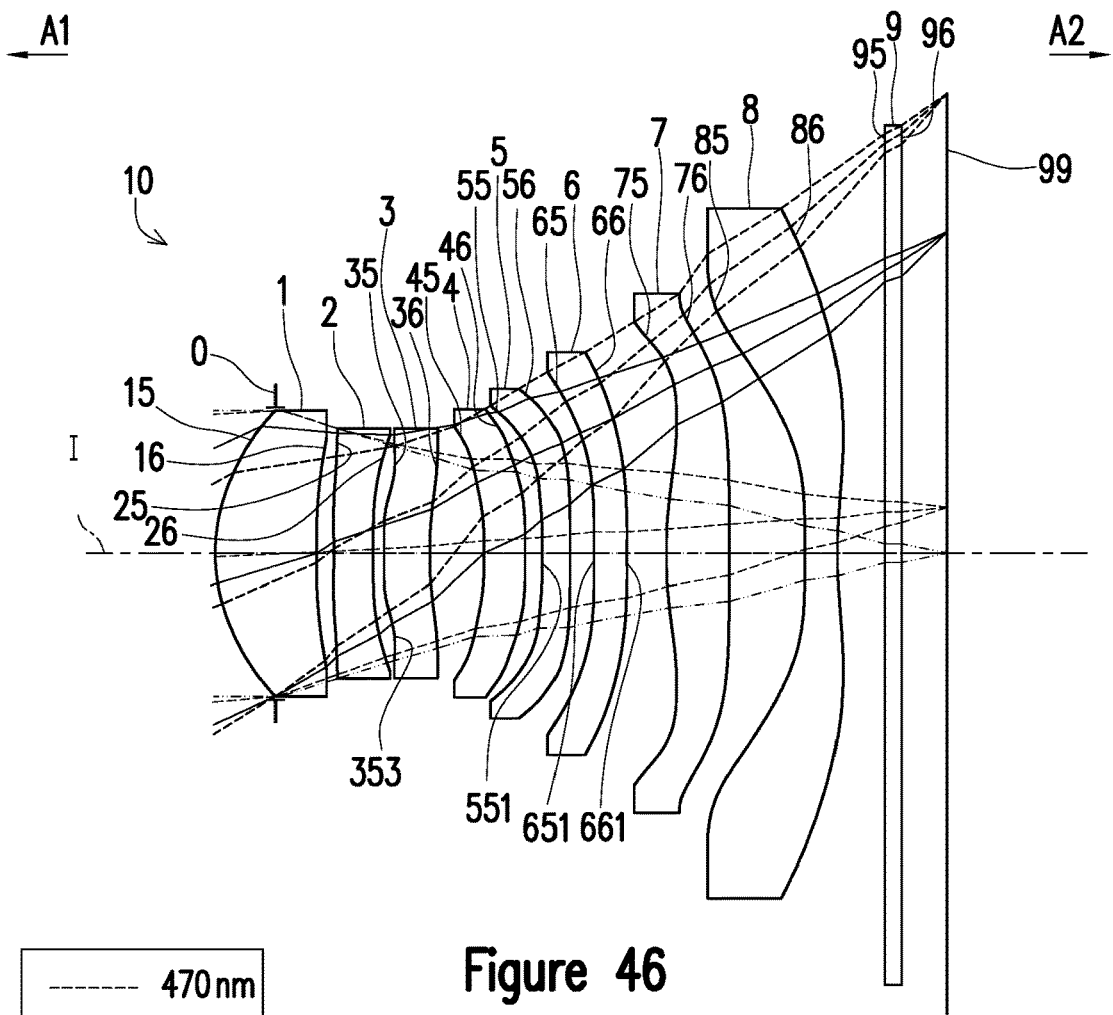
FIG. 46 is a schematic diagram of an optical imaging lens of an eleventh embodiment of the invention.

FIG. 46 is a schematic diagram of an optical imaging lens of an eleventh embodiment of the invention. FIG. 47A to FIG. 47D are diagrams of longitudinal spherical aberrations and various aberrations of the optical imaging lens of the eleventh embodiment. Referring to FIG. 46 at first, the eleventh embodiment of the optical imaging lens 10 of the invention is approximately similar to the first embodiment, except that: various optical data, aspheric coefficients, and parameters among these lens elements 1, 2, 3, 4, 5, 6, 7 and 8 are different more or less. In addition, in the present embodiment, the periphery region 353 of the object-side surface 35 of the third lens element 3 is concave; the optical axis region 551 of the object-side surface 55 of the fifth lens element 5 is concave; the optical axis region 651 of the object-side surface 65 of the sixth lens element 6 is concave; and the optical axis region 661 of the image-side surface 66 of the sixth lens element 6 is convex. It should be noted that in order to show the drawing clearly, numerals of the optical axis regions and the periphery regions which are similar to the surface shapes in the first embodiment are partially omitted in FIG. 46.

Detailed optical data of the optical imaging lens 10 of the eleventh embodiment are as shown in FIG. 48, and the optical imaging lens 10 of the eleventh embodiment has an EFL of 6.032 mm, an HFOV of 29.748°, a system length of 9.209 mm, an Fno of 1.650, and an image height of 5.800 mm.

As shown in FIG. 49, FIG. 49 illustrates various aspheric coefficients of the object-side surface 15 of the first lens element 1 to the image-side surface 86 of the eighth lens element 8 of the eleventh embodiment in the formula (1).

In addition, relations among all important parameters in the optical imaging lens 10 of the eleventh embodiment are as shown in FIG. 52 and FIG. 53.

Figures 47A, 47B, 47C, 47D:
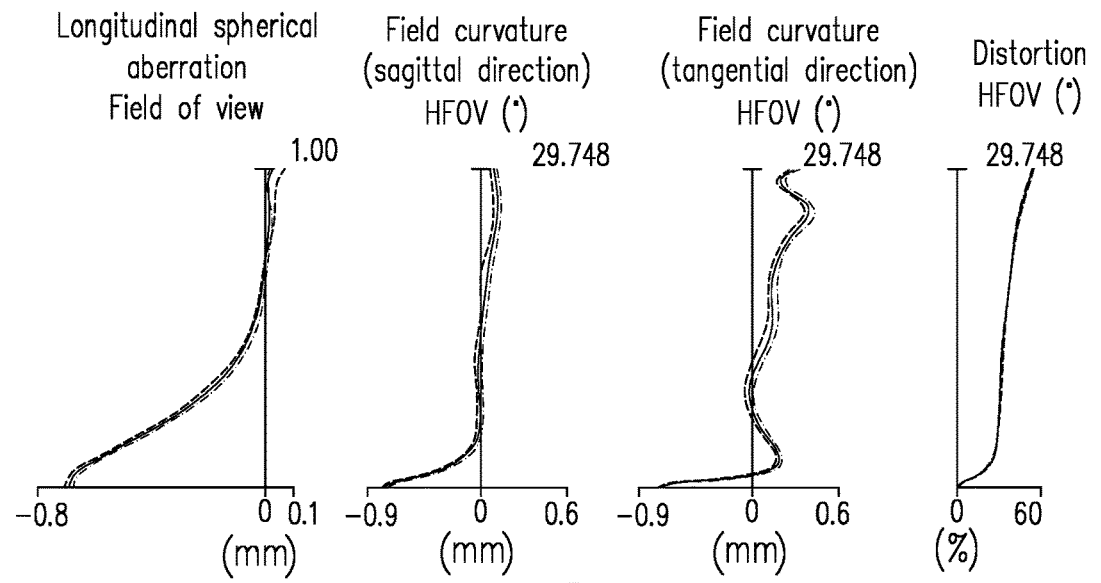
FIG. 47A to FIG. 47D are diagrams of longitudinal spherical aberrations and various aberrations of an optical imaging lens of an eleventh embodiment.

A longitudinal spherical aberration of the present eleventh embodiment is as shown in FIG. 47A, and deflections of imaging points of off-axis rays at different heights are controlled within a range of ±0.8 mm. In the two field curvature aberration diagrams of FIG. 47B and FIG. 47C, focal length variables of three representative wavelengths within an entire field of view range fall within ±0.9 mm. The distortion aberration diagram of FIG. 47D shows that the distortion aberration of the present embodiment is maintained within a range of ±60%.

It can be known from the above instructions that: the eleventh embodiment is easy to fabricate, so that the yield is relatively high.

Referring to FIG. 50 to FIG. 53 cooperatively, FIG. 50 to FIG. 53 illustrate tabular diagrams of various optical parameters of the foregoing first embodiment to eleventh embodiment. With reference to one of the following combinations (a), (b) and (c), the optical imaging lens 10 can effectively correct the spherical aberration and the aberration of an optical system and alleviates the distortion via the design of the surface shape and the refracting power, such as the second lens element 2 has negative refracting power and the periphery region 363 of the image-side surface 36 of the third lens element 3 is concave.

Where
(a) the optical axis region 451 of the object-side surface 45 of the fourth lens element 4 is concave, and the optical axis region 761 of the image-side surface 76 of the seventh lens element 7 is convex;
(b) the optical axis region 451 of the object-side surface 45 of the fourth lens element 4 is concave, the fifth lens element 5 has negative refracting power, and the sixth lens element 6 has negative refracting power; or
(c) the third lens element 3 has positive refracting power and the optical axis region 761 of the image-side surface 76 of the seventh lens element 7 is convex.

In one embodiment, the optical imaging lens 10 satisfies any of the above combinations. The aberration can be alleviated if the optical imaging lens also satisfies the following conditions.

The optical imaging lens 10 may satisfy $|V4-V5|\geq 30.000$, and the preferable range may be $30.000\leq|V4-V5|\leq 40.000$.

In another embodiment, the optical imaging lens 10 satisfies the above conditions. The image height can be increased, the F-number can be reduced, and the short system length can be maintained at the same time if the optical imaging lens also satisfies the following conditions. The optical imaging lens 10 may satisfy $(G67+T7)/(G56+T6)\geq 1.500$, and the preferable range may be $1.500\leq(G67+T7)/(G56+T6)\leq 3.600$.

In addition, the optical imaging lens 10 of the embodiments of the invention satisfies the configurations of the following materials, so that the chromatic aberration can be alleviated. Since different materials have different refracting power, the materials are used with each other to smoothly turn and converge rays, so as to render favorable imaging quality.

The optical imaging lens 10 may satisfy $V2+V3+V4\geq 90.000$, and the preferable range may be $90.000\leq V2+V3+V4\leq 140.000$;

the optical imaging lens 10 may satisfy $V3+V4+V6\geq 90.000$, and the preferable range may be $90.000\leq V3+V4+V6\leq 140.000$;

the optical imaging lens 10 may satisfy $V5+V6\leq 80.000$, and the preferable range may be $35.000\leq V5+V6\leq 80.000$; or the optical imaging lens 10 may satisfy $V2+V5\leq 80.000$, and the preferable range may be $35.000\leq V2+V5\leq 80.000$.

In addition, in order to reduce the system length of the optical imaging lens 10, the air gaps between the lens elements or the thicknesses of the lens elements may be appropriately adjusted, but the complexity of fabrication must be considered, and the imaging quality needs to be guaranteed, so that better configurations may be achieved if numerical limits of the following conditions are satisfied.

The optical imaging lens 10 may satisfy $ImgH/BFL\geq 4.200$, and the preferable range may be $4.200\leq ImgH/BFL\leq 9.000$;

the optical imaging lens 10 may satisfy $(T1+G12)/T2\geq 2.900$, and the preferable range may be $2.900\leq(T1+G12)/T2\leq 9.300$;

the optical imaging lens 10 may satisfy $(T2+T3+T6)/(G12+G45)\leq 3.600$, and the preferable range may be $1.800\leq(T2+T3+T6)/(G12+G45)\leq 3.600$;

the optical imaging lens 10 may satisfy (T7+G78+T8)/T6≥5.000, and the preferable range may be 5.000≤(T7+G78+T8)/T6≤16.500;

the optical imaging lens 10 may satisfy EFL/AAG≥1.500, and the preferable range may be 1.500≤EFL/AAG≤2.800;

the optical imaging lens 10 may satisfy (T2+T3+T4+T5)/G67≤4.000, and the preferable range may be 1.000≤(T2+T3+T4+T5)/G67≤4.000;

the optical imaging lens 10 may satisfy (G23+G34+G45)/T3≥1.500, and the preferable range may be 1.500≤(G23+G34+G45)/T3≤4.000;

the optical imaging lens 10 may satisfy ALT/(T7+G78)≤3.000, and the preferable range may be 1.000≤ALT/(T7+G78)≤3.000;

the optical imaging lens 10 may satisfy TTL/(T1+T7+G78)≤3.300, and the preferable range may be 2.000≤TTL/(T1+T7+G78)≤3.300;

the optical imaging lens 10 may satisfy (G45+G56+T6)/T8≤2.500, and the preferable range may be 1.000≤(G45+G56+T6)/T8≤2.500;

the optical imaging lens 10 may satisfy EFL/(T5+G56+T6)≥5.500, and the preferable range may be 5.500≤EFL/(T5+G56+T6)≤8.800;

the optical imaging lens 10 may satisfy TL/(T3+T4+T7)≤4.500, and the preferable range may be 3.000≤TL/(T3+T4+T7)≤4.500;

the optical imaging lens 10 may satisfy (G23+G78)/T4≥2.000, and the preferable range may be 2.000≤(G23+G78)/T4≤6.300;

the optical imaging lens 10 may satisfy T1/(G12+T3)≥1.600, and the preferable range may be 1.600≤(T1+G23)/T4≤3.000;

the optical imaging lens 10 may satisfy (T1+T2+T3)/(G12+G78)≤2.100, and the preferable range may be 0.500≤(T1+T2+T3)/(G12+G78)≤2.100;

the optical imaging lens 10 may satisfy EFL/(G23+G45+G67)≥5.000, and the preferable range may be 5.000≤EFL/(G23+G45+G67)≤10.000; and the optical imaging lens 10 may satisfy (G12+BFL)/T7≤2.100, and the preferable range may be 0.500≤(G12+BFL)/T7≤2.100.

In addition, any combination relationships of the parameters of the embodiments may be additionally selected to add limits to optical imaging lens, so as to facilitate the optical imaging lens design of the same architecture of the invention. In view of the unpredictability of optical system design, under the architecture of the invention, the optical imaging lens, satisfying the foregoing conditions, of the invention may have a reduced system length, an increased image height, favorable imaging quality or increased assembling yield over the prior art.

The above-listed exemplary limitation relational expressions can also be arbitrarily selectively incorporated in unequal numbers to be applied to the embodiments of the invention, and they are not limited thereto. During the implementation of the invention, in addition to the aforementioned relational expressions, detailed structures, such as the arrangement of concave and convex surfaces, for a single lens element or broadly for a plurality of lens elements to enhance the system performance and/or control of the resolution. It should be noted that these details need to be selectively incorporated in other embodiments of the invention without conflicts.

In conclusion, the optical imaging lens of the embodiments of the invention can achieve the following.

I. The longitudinal spherical aberrations, the astigmatic aberrations and the distortions of all the embodiments of the invention comply with the usage specification. In addition, off-axis rays of three representative wavelengths of red, green and blue at different heights are concentrated near imaging points. It can be seen according to the deflection amplitude of each curve that deflections of the imaging points of the off-axis rays at different heights are all controlled to achieve favorable spherical aberration, optical aberration and distortion suppression capacities. Considering the imaging quality data, the distances among the three representative wavelengths of red, green and blue are also quite close, which indicates that, according to the embodiments of the invention, the concentricity of light rays of different wavelengths and has good chromatic dispersion suppression capability. Based on the above, with the design and use of the lens elements with each other, a favorable imaging quality is achieved.

II. By designing the surface shape and the refracting power, such as providing the second lens element 2 with negative refracting power and making the periphery region 363 of the image-side surface 36 of the third lens element 3 concave, or in combination with one of the following, the optical imaging lens of the embodiments of the invention can effectively correct the spherical aberration and the optical aberration of the optical system and reduce the distortion: (a) the optical axis region 451 of the object-side surface 45 of the fourth lens element 4 is concave and the optical axis region 761 of the image-side surface 76 of the seventh lens element 7 is convex; (b) the optical axis region 451 of the object-side surface 45 of the fourth lens element 4 is concave, the fifth lens element 5 has negative refracting power and the sixth lens element 6 has negative refracting power; or (c) the third lens element 3 has positive refracting power and the optical axis region 761 of the image-side surface 76 of the seventh lens element 7 is convex. If any of the above-mentioned combinations satisfies |V4−V5|≥30.000, the chromatic aberration can be alleviated; and if any of the above-mentioned combinations satisfies (G67+T7)/(G56+T6)≥1.500, the image height can be increased, the F-number can be decreased, and a short system length of the optical imaging lens can be maintained at the same time. The preferable range may be 30.000≤|V4−V5|≤40.000 and 1.500≤(G67+T7)/(G56+T6)≤3.600.

III. In the optical imaging lens of the embodiments of the invention, by satisfying the arrangement of the materials, such as: V2+V3+V4≥90.000 or V3+V4+V6≥90.000 or V5+V6≤80.000 or V2+V5≤80.000, in addition to alleviating the chromatic aberration, since different materials have different refracting power, the materials may be used with each other to smoothly turn and converge the rays, so as to render favorable imaging quality. The preferable range may be 90.000≤V2+V3+V4≤140.000, 90.000≤V3+V4+V6≤140.000, 35.000≤V5+V6≤80.000, 35.000≤V2+V5≤80.000.

IV. An aspheric design is adopted for the lens elements in all the embodiments of the invention, thereby rendering favorable imaging quality.

V. Plastic materials are selected for the lens elements in the respective embodiments of the invention select plastic materials, so as to reduce the weight of the optical imaging lens as well as the cost thereof.

The contents in the embodiments of the invention include but are not limited to a focal length, a thickness of a lens element, an Abbe number, or other optical parameters. For example, in the embodiments of the invention, an optical parameter A and an optical parameter B are disclosed, wherein the ranges of the optical parameters, comparative relation between the optical parameters, and the range of a condition expression covered by a plurality of embodiments are specifically explained as follows:

(1) The ranges of the optical parameters are, for example, $\alpha_2 \leq A \leq \alpha_1$ or $\beta_2 \leq B \leq \beta_1$, where $\alpha_1$ is a maximum value of the optical parameter A among the plurality of embodiments, $\alpha_2$ is a minimum value of the optical parameter A among the plurality of embodiments, $\beta_1$ is a maximum value of the optical parameter B among the plurality of embodiments, and $\beta_2$ is a minimum value of the optical parameter B among the plurality of embodiments.

(2) The comparative relation between the optical parameters is that A is greater than B or A is less than B, for example.

(3) The range of a condition expression covered by a plurality of embodiments is in detail a combination relation or proportional relation obtained by a possible operation of a plurality of optical parameters in each same embodiment. The relation is defined as E, and E is, for example, A+B or A−B or A/B or A*B or $(A*B)^{1/2}$, and E satisfies a condition expression $E \leq \gamma_1$ or $E \geq \gamma_2$ or $\gamma_2 \leq E \leq \gamma_1$, where each of $\gamma_1$ and $\gamma_2$ is a value obtained by an operation of the optical parameter A and the optical parameter B in a same embodiment, $\gamma_1$ is a maximum value among the plurality of the embodiments, and $\gamma_2$ is a minimum value among the plurality of the embodiments.

The ranges of the aforementioned optical parameters, the aforementioned comparative relations between the optical parameters, and a maximum value, a minimum value, and the numerical range between the maximum value and the minimum value of the aforementioned conditions expression are all implementable and all belong to the scope disclosed by the invention. The aforementioned description is for exemplary explanation, but the invention is not limited thereto.

The embodiments of the invention are all implementable. In addition, a combination of partial features in a same embodiment can be selected, and the combination of partial features can achieve the unexpected result of the invention with respect to the prior art. The combination of partial features includes but is not limited to the surface shape of a lens element, a refracting power, a condition expression or the like, or a combination thereof. The description of the embodiments is for explaining the specific embodiments of the principles of the invention, but the invention is not limited thereto. Specifically, the embodiments and the drawings are for exemplifying, but the invention is not limited thereto.

What is claimed is:

1. An optical imaging lens, comprising a first lens element, a second lens element, a third lens element, a fourth lens element, a fifth lens element, a sixth lens element, a seventh lens element and an eighth lens element sequentially arranged along an optical axis from an object side to an image side, wherein each of the first lens element to the eighth lens element comprises an object-side surface facing the object side and allowing imaging rays to pass through and an image-side surface facing the image side and allowing the imaging rays to pass through;

the second lens element has negative refracting power;
the third lens element has positive refracting power, and a periphery region of the image-side surface of the third lens element is concave;
an optical axis region of the object-side surface of the fourth lens element is concave; and
an optical axis region of the image-side surface of the seventh lens element is convex, wherein
lens elements of the optical imaging lens are only the eight lens elements, and satisfy conditions as follows:

$|V4-V5| \geq 30.000$; and $(G67+T7)/(G56+T6) \geq 1.500$, wherein V4 is an Abbe number of the fourth lens element; V5 is an Abbe number of the fifth lens element; G67 is an air gap between the sixth lens element and the seventh lens element on the optical axis; T7 is a thickness of the seventh lens element on the optical axis; G56 is an air gap between the fifth lens element and the sixth lens element on the optical axis; and T6 is a thickness of the sixth lens element on the optical axis,
wherein the air gap between the fifth lens element and the sixth lens element on the optical axis is less than the air gap between the sixth lens element and the seventh lens element on the optical axis.

2. An optical imaging lens, comprising a first lens element, a second lens element, a third lens element, a fourth lens element, a fifth lens element, a sixth lens element, a seventh lens element and an eighth lens element sequentially arranged along an optical axis from an object side to an image side, wherein each of the first lens element to the eighth lens element comprises an object-side surface facing the object side and allowing imaging rays to pass through and an image-side surface facing the image side and allowing the imaging rays to pass through;

the second lens element has negative refracting power;
the third lens element has positive refracting power, and a periphery region of the image-side surface of the third lens element is concave;
an optical axis region of the object-side surface of the fourth lens element is concave;
the fifth lens element has negative refracting power;
the sixth lens element has negative refracting power; and
an optical axis region of the image-side surface of the seventh lens element is convex, wherein
lens elements of the optical imaging lens are only the eight lens elements, and satisfy conditions as follows:

$|V4-V5| \geq 30.000$; and $(G67+T7)/(G56+T6) \geq 1.500$, wherein V4 is an Abbe number of the fourth lens element; V5 is an Abbe number of the fifth lens element; G67 is an air gap between the sixth lens element and the seventh lens element on the optical axis; T7 is a thickness of the seventh lens element on the optical axis; G56 is an air gap between the fifth lens element and the sixth lens element on the optical axis; and T6 is a thickness of the sixth lens element on the optical axis,
wherein the air gap between the fifth lens element and the sixth lens element on the optical axis is less than the air gap between the sixth lens element and the seventh lens element on the optical axis.

3. An optical imaging lens, comprising a first lens element, a second lens element, a third lens element, a fourth lens element, a fifth lens element, a sixth lens element, a seventh lens element and an eighth lens element sequentially arranged along an optical axis from an object side to an image side, wherein each of the first lens element to the eighth lens element comprises an object-side surface facing the object side and allowing imaging rays to pass through and an image-side surface facing the image side and allowing the imaging rays to pass through;

the second lens element has negative refracting power;
the third lens element has positive refracting power, and a periphery region of the image-side surface of the third lens element is concave; and
an optical axis region of the image-side surface of the seventh lens element is convex, wherein lens elements of the optical imaging lens are only the eight lens elements, and satisfy conditions as follows:

$|V4-V5| \geq 30.000$; and (G67+T7)/(G56+T6)≥1.500, wherein V4 is an Abbe number of the fourth lens element; V5 is an Abbe number of the fifth lens element; G67 is an air gap between the sixth lens element and the seventh lens element on the optical axis; T7 is a thickness of the seventh lens element on the optical axis; G56 is an air gap between the fifth lens element and the sixth lens element on the optical axis; and T6 is a thickness of the sixth lens element on the optical axis, wherein the air gap between the fifth lens element and the sixth lens element on the optical axis is less than the air gap between the sixth lens element and the seventh lens element on the optical axis.

4. The optical imaging lens according to claim 3, wherein the optical imaging lens further satisfies a condition as follows: (G23+G78)/T4≥2.000, wherein G23 is an air gap between the second lens element and the third lens element on the optical axis; G78 is an air gap between the seventh lens element and the eighth lens element on the optical axis; and T4 is a thickness of the fourth lens element on the optical axis.

5. The optical imaging lens according to claim 3, wherein the optical imaging lens further satisfies a condition as follows: T1/(G12+T3)≥1.600, wherein T1 is a thickness of the first lens element on the optical axis; G12 is an air gap between the first lens element and the second lens element on the optical axis; and T3 is a thickness of the third lens element on the optical axis.

6. The optical imaging lens according to claim 3, wherein the optical imaging lens further satisfies a condition as follows: (T1+T2+T3)/(G12+G78)≤2.100, wherein T1 is a thickness of the first lens element on the optical axis; T2 is a thickness of the second lens element on the optical axis; T3 is a thickness of the third lens element on the optical axis; G12 is an air gap between the first lens element and the second lens element on the optical axis; and G78 is an air gap between the seventh lens element and the eighth lens element on the optical axis.

7. The optical imaging lens according to claim 3, wherein the optical imaging lens further satisfies a condition as follows: EFL/(G23+G45+G67)≥5.000, wherein EFL is an effective focal length of the optical imaging lens; G23 is an air gap between the second lens element and the third lens element on the optical axis; and G45 is an air gap between the fourth lens element and the fifth lens element on the optical axis.

8. The optical imaging lens according to claim 3, wherein the optical imaging lens further satisfies a condition as follows: (G12+BFL)/T7≤2.100, wherein G12 is an air gap between the first lens element and the second lens element on the optical axis, and BFL is a distance from the image-side surface of the eighth lens element to an image plane on the optical axis.

9. The optical imaging lens according to claim 3, wherein the optical imaging lens further satisfies a condition as follows: ImgH/BFL≥4.200, wherein ImgH is an image height of the optical imaging lens, and BFL is a distance from the image-side surface of the eighth lens element to an image plane on the optical axis.

10. The optical imaging lens according to claim 3, wherein the optical imaging lens further satisfies a condition as follows: (T1+G12)/T2≥2.900, wherein T1 is a thickness of the first lens element on the optical axis; G12 is an air gap between the first lens element and the second lens element on the optical axis; and T2 is a thickness of the second lens element on the optical axis.

11. The optical imaging lens according to claim 3, wherein the optical imaging lens further satisfies a condition as follows: (T2+T3+T6)/(G12+G45)≤3.600, wherein T2 is a thickness of the second lens element on the optical axis; T3 is a thickness of the third lens element on the optical axis; G12 is an air gap between the first lens element and the second lens element on the optical axis; and G45 is an air gap between the fourth lens element and the fifth lens element on the optical axis.

12. The optical imaging lens according to claim 3, wherein the optical imaging lens further satisfies a condition as follows: (T7+G78+T8)/T6≥5.000, wherein G78 is an air gap between the seventh lens element and the eighth lens element on the optical axis, and T8 is a thickness of the eighth lens element on the optical axis.

13. The optical imaging lens according to claim 3, wherein the optical imaging lens further satisfies a condition as follows: EFL/AAG≥1.500, wherein EFL is an effective focal length of the optical imaging lens, and AAG is a sum of seven air gaps of the first lens element to the eighth lens element on the optical axis.

14. The optical imaging lens according to claim 3, wherein the optical imaging lens further satisfies a condition as follows: (T2+T3+T4+T5)/G67≤4.000, wherein T2 is a thickness of the second lens element on the optical axis; T3 is a thickness of the third lens element on the optical axis; T4 is a thickness of the fourth lens element on the optical axis; and T5 is a thickness of the fifth lens element on the optical axis.

15. The optical imaging lens according to claim 3, wherein the optical imaging lens further satisfies a condition as follows: (G23+G34+G45)/T3≥1.500, wherein G23 is an air gap between the second lens element and the third lens element on the optical axis; G34 is an air gap between the third lens element and the fourth lens element on the optical axis; G45 is an air gap between the fourth lens element and the fifth lens element on the optical axis; and T3 is a thickness of the third lens element on the optical axis.

16. The optical imaging lens according to claim 3, wherein the optical imaging lens further satisfies a condition as follows: ALT/(T7+G78)≤3.000, wherein ALT is a sum of the thicknesses of the eight lens elements from the first lens element to the eighth lens element on the optical axis, and G78 is an air gap between the seventh lens element and the eighth lens element on the optical axis.

17. The optical imaging lens according to claim 3, wherein the optical imaging lens further satisfies a condition as follows: TTL/(T1+T7+G78)≤3.300, wherein TTL is a distance from the object-side surface of the first lens element to an image plane on the optical axis; T1 is a thickness of the first lens element on the optical axis; and G78 is an air gap between the seventh lens element and the eighth lens element on the optical axis.

18. The optical imaging lens according to claim 3, wherein the optical imaging lens further satisfies a condition as follows: (G45+G56+T6)/T8≤2.500, wherein G45 is an air gap between the fourth lens element and the fifth lens element on the optical axis, and T8 is a thickness of the eighth lens element on the optical axis.

19. The optical imaging lens according to claim 3, wherein the optical imaging lens further satisfies a condition as follows: EFL/(T5+G56+T6)≥5.500, wherein EFL is an effective focal length of the optical imaging lens, and T5 is a thickness of the fifth lens element on the optical axis.

20. The optical imaging lens according to claim 3, wherein the optical imaging lens further satisfies a condition as follows: TL/(T3+T4+T7)≤4.500, wherein TL is a distance from the object-side surface of the first lens element to the image-side surface of the eighth lens element on the optical axis; T3 is a thickness of the third lens element on the optical axis; and T4 is a thickness of the fourth lens element on the optical axis.

* * * * *